United States Patent
Keisler et al.

(10) Patent No.: US 11,354,352 B1
(45) Date of Patent: Jun. 7, 2022

(54) GEO-VISUAL SEARCH

(71) Applicant: Descartes Labs, Inc., Sante Fe, NM (US)

(72) Inventors: Ryan S. Keisler, Oakland, CA (US); Samuel W. Skillman, Santa Fe, NM (US); Michael S. Warren, Los Alamos, NM (US)

(73) Assignee: Descartes Labs, Inc., Sante Fe, NM (US)

( * ) Notice: Subject to any disclaimer, the term of this patent is extended or adjusted under 35 U.S.C. 154(b) by 288 days.

(21) Appl. No.: 16/285,077

(22) Filed: Feb. 25, 2019

Related U.S. Application Data

(63) Continuation of application No. 15/497,598, filed on Apr. 26, 2017, now Pat. No. 10,248,663.

(60) Provisional application No. 62/466,588, filed on Mar. 3, 2017.

(51) Int. Cl.
*G06F 16/583* (2019.01)
*G06N 3/08* (2006.01)
*G06N 3/04* (2006.01)
*G06V 10/44* (2022.01)

(52) U.S. Cl.
CPC ........... *G06F 16/5854* (2019.01); *G06N 3/04* (2013.01); *G06N 3/08* (2013.01); *G06V 10/44* (2022.01)

(58) Field of Classification Search
CPC ..... G06F 16/5854; G06F 16/583; G06N 3/04; G06N 3/08; G06N 3/0454; G06K 9/4604; G06K 9/00684
See application file for complete search history.

(56) References Cited

U.S. PATENT DOCUMENTS

| | | | |
|---|---|---|---|
| 6,879,980 B1 | 4/2005 | Kothuri | |
| 8,352,494 B1 | 1/2013 | Badoiu | |
| 8,989,434 B1 * | 3/2015 | Reinhardt | G06F 16/29 382/100 |
| 9,063,954 B2 * | 6/2015 | Ioffe | G06V 10/751 |
| 2003/0233403 A1 | 12/2003 | Bae | |
| 2012/0076401 A1 | 3/2012 | Sanchez | |
| 2012/0158762 A1 | 6/2012 | Iwuchukwu | |
| 2013/0065613 A1 * | 3/2013 | Stopel | G06F 16/29 455/456.3 |
| 2014/0012831 A1 * | 1/2014 | Wallen | G06F 16/5866 707/743 |

(Continued)

FOREIGN PATENT DOCUMENTS

EP  3133510 A1 *  2/2017  ............. G06T 11/60

OTHER PUBLICATIONS

Messinger et al., Spectral Image Complexity Estimated Through Local Convex Hull Volume, IEEE, pp. 1-4. (Year: 2010).*

(Continued)

*Primary Examiner* — Cheyne D Ly
(74) *Attorney, Agent, or Firm* — Van Pelt, Yi & James LLP

(57) ABSTRACT

Performing a geo-visual search is disclosed. A query feature vector associated with a query tile is obtained. A lookup is performed at least in part by using a key derived from the query feature vector. A list of candidate feature vectors is obtained based at least in part on the lookup. Based at least in part on a comparison of the query feature vector against at least some of the candidate feature vectors in the obtained list, a tile that is visually similar to the query tile is determined. The determined tile is provided as output.

12 Claims, 33 Drawing Sheets

(56) References Cited

U.S. PATENT DOCUMENTS

2014/0218400 A1* 8/2014 O'Toole .............. G06Q 50/16
 345/634
2014/0250110 A1 9/2014 Yang
2015/0142732 A1 5/2015 Pace
2015/0356088 A1 12/2015 Berkhin

OTHER PUBLICATIONS

Wu et al., Image localization in satellite imagery with feature-based indexing, The International Archives of the Photogrammetry, Remote Sensing and Spatial Information Sciences. Vol. XXXVII. Part B3a. Beijing 2008, pp. 197-202. (Year: 2008).*

NourElDin Laban, Motaz ElSaban, Ayman Nasr, and Hoda Onsi. "System refinement for content based satellite image retrieval." The Egyptian Journal of Remote Sensing and Space Science 15, No. 1 (2012): 91-97.

Saikat Basu, Sangram Ganguly, Supratik Mukhopadhyay, Robert DiBiano, Manohar Karki, and Ramakrishna Nemani. "Deepsat: a learning framework for satellite imagery." In Proceedings of the 23rd SIGSPATIAL international conference on advances in geographic information systems, p. 37. ACM, 2015.

Shawn Newsam, and Yang Yang. "Comparing global and interest point descriptors for similarity retrieval in remote sensed imagery." In Proceedings of the 15th annual ACM international symposium on Advances in geographic information systems, p. 9. ACM, 2007.

Yikun Li, and Timo R. Bretschneider. "Semantic-sensitive satellite image retrieval." IEEE Transactions on Geoscience and Remote Sensing 45, No. 4 (2007): 853-860.

Yogita Mistry, D. T. Ingole, and M. D. Ingole. "Content based image retrieval using hybrid features and various distance metric." Journal of Electrical Systems and Information Technology (2017).

Author Unknown, "Terrapattern", from http://www.terrapatem.com, captured Mar. 7, 2017.

Karpathy et al., "Open AI: Generative Models", Research #1, Jun. 16, 2016.

Krizhevsky et al., "ImageNet Classification with Deep Convolutional Neural Networks", 2012.

Lin et al., "Deep Learning of Binary Hash Codes for Fast Image Retrieval", 2015.

Liong et al., "Deep Hashing for Compact Binary Codes Learning", CVPR2015, 2015.

Philip A. Tresadern, "Visual Analysis of Articulated Motion", Department of Engineering Science, University of Oxford, 2006.

Salakhutdinov et al., "Semantic Hashing", 2007.

* cited by examiner

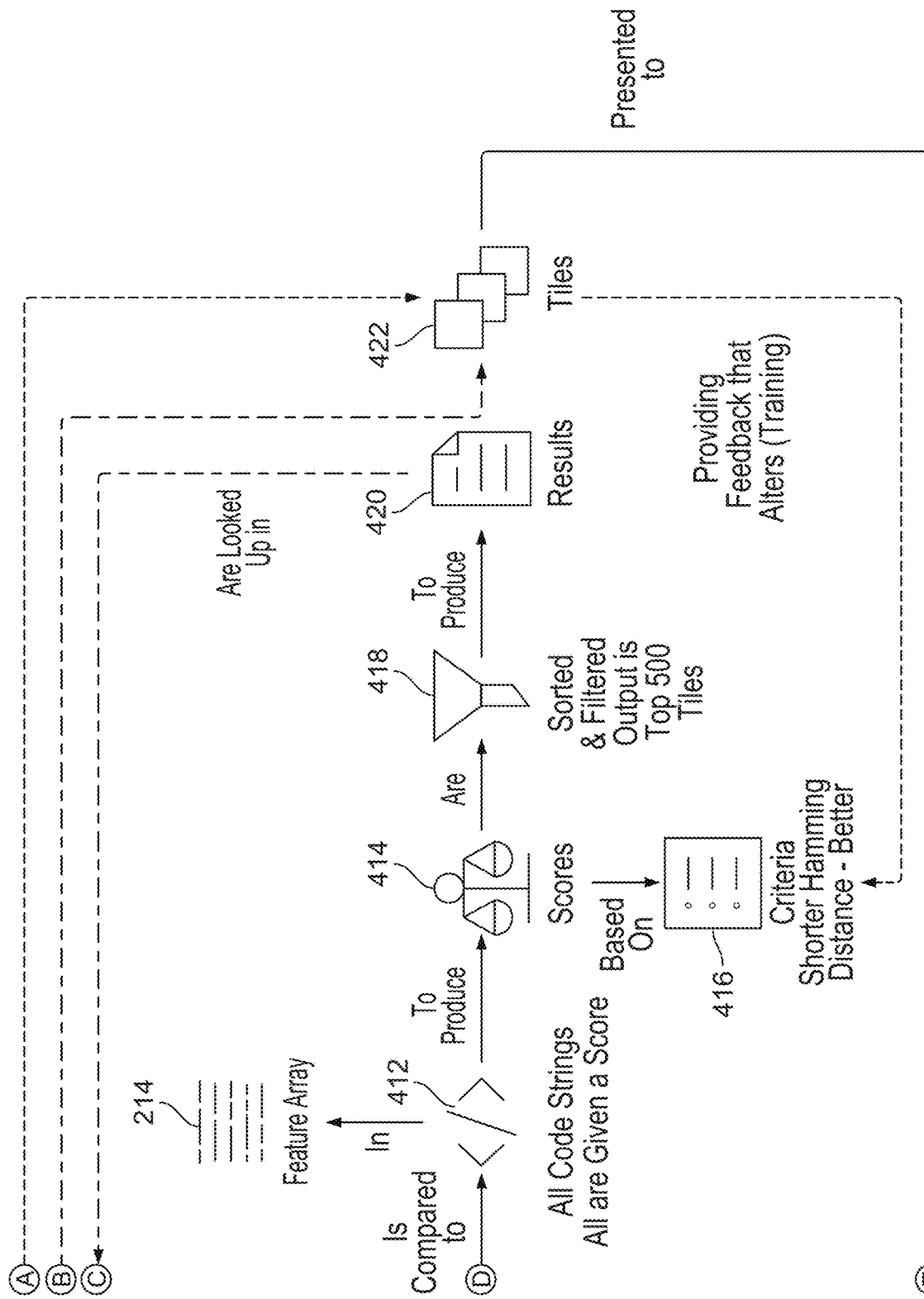

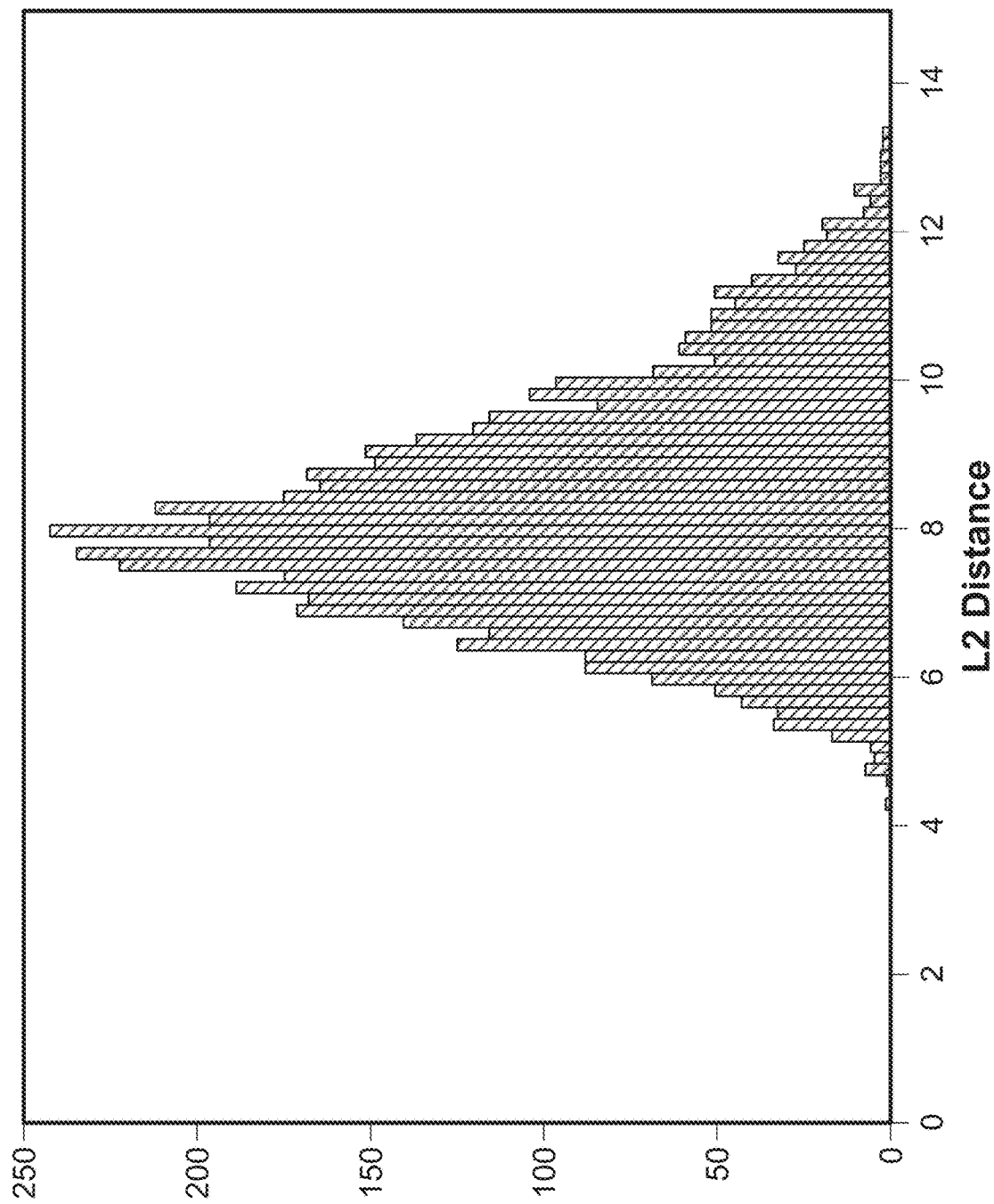

GEO-VISUAL SEARCH

CROSS REFERENCE TO OTHER APPLICATIONS

This application is a continuation of co-pending U.S. patent application Ser. No. 15/497,598 entitled GEO-VISUAL SEARCH filed Apr. 26, 2017 which claims priority to U.S. Provisional Patent Application No. 62/466,588 entitled GEO-VISUAL SEARCH filed Mar. 3, 2017, both of which are incorporated herein by reference for all purposes.

BACKGROUND OF THE INVENTION

Performing a search over observational data sets such as satellite imagery can be challenging due to factors such as the size of such observational data sets, and the manner in which they are encoded/captured. Accordingly, there is an ongoing need for systems and techniques capable of efficiently processing imagery data.

BRIEF DESCRIPTION OF THE DRAWINGS

Various embodiments of the invention are disclosed in the following detailed description and the accompanying drawings.

FIG. 18 illustrates an example embodiment of a histogram of feature distances.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Described herein are techniques for performing geo-visual search. Using the techniques described herein, visually similar portions of imagery (e.g., satellite imagery) may be identified. While example embodiments involving identifying similar portions of the surface of (portions of) the Earth are described for illustrative purposes, the techniques described herein may be variously adapted to accommodate performing visual search for similar neighbors on any other type of surface, as appropriate.

Collecting Imagery

Figure 1:
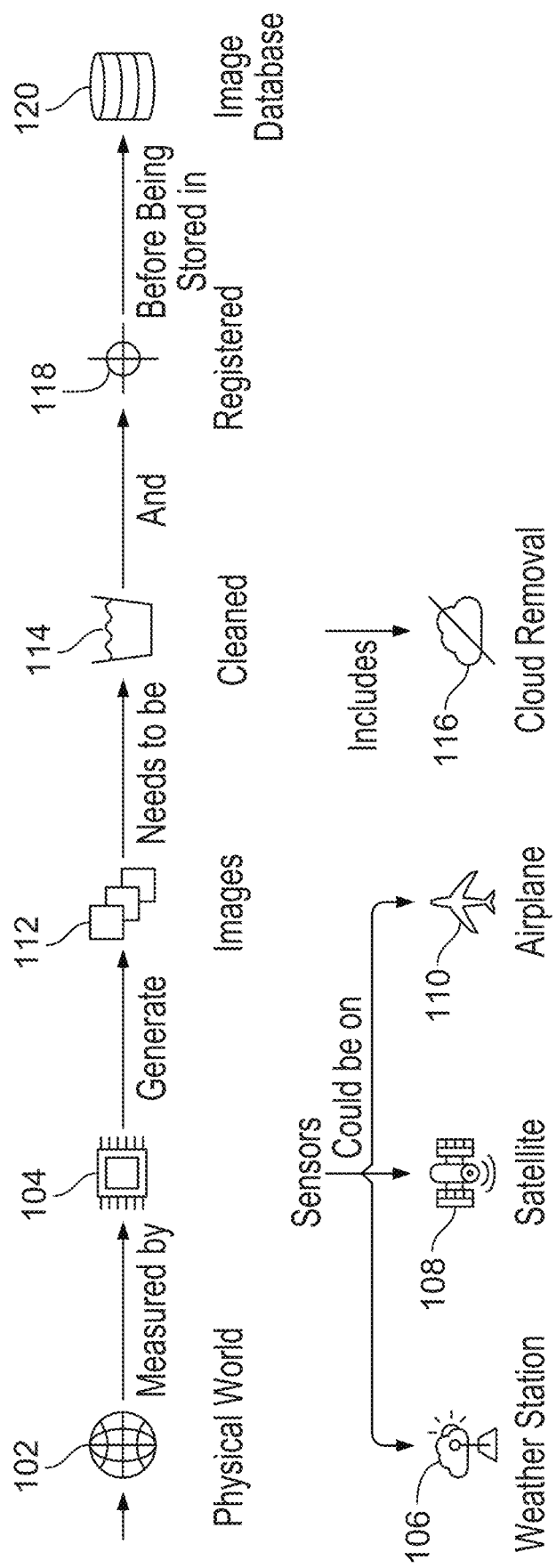
FIG. 1 illustrates an example embodiment of a process for collecting raw imagery.

FIG. 1 illustrates an example embodiment of a process for collecting raw imagery. As shown in this example, the physical world 102 (e.g., the surface of the earth) may be measured by sensors (104) on sources such as weather stations (106), satellites (108), and airplanes (110). The collected sensor data may be used to generate (aerial)

images (112). In some embodiments, the generated images are further cleaned (114), for example, to remove clouds (116). The (cleaned) generated images may then be registered (118) before being stored to an image database (120) (e.g., Google Cloud Storage) as raw observational data/ imagery (e.g., raw aerial imagery of the surface of (a portion of) the earth).

Tiling and Feature Extraction

In some embodiments, the raw (aerial) imagery stored at 120 of FIG. 1 is used to generate a corpus or catalog of image tiles (also referred to herein as "chip" images). As will be described in further detail below, in some embodiments, feature extraction is performed on the generated tiles/chip images to determine, for each chip image, a feature vector that represents the visual information in the given image. In some embodiments, visual similarity between tiles is determined based on a comparison of corresponding feature vectors (e.g., using hamming/Euclidean distance). In some embodiments, the feature extraction is performed using a neural net, further details of which will be described below.

Figure 2A:
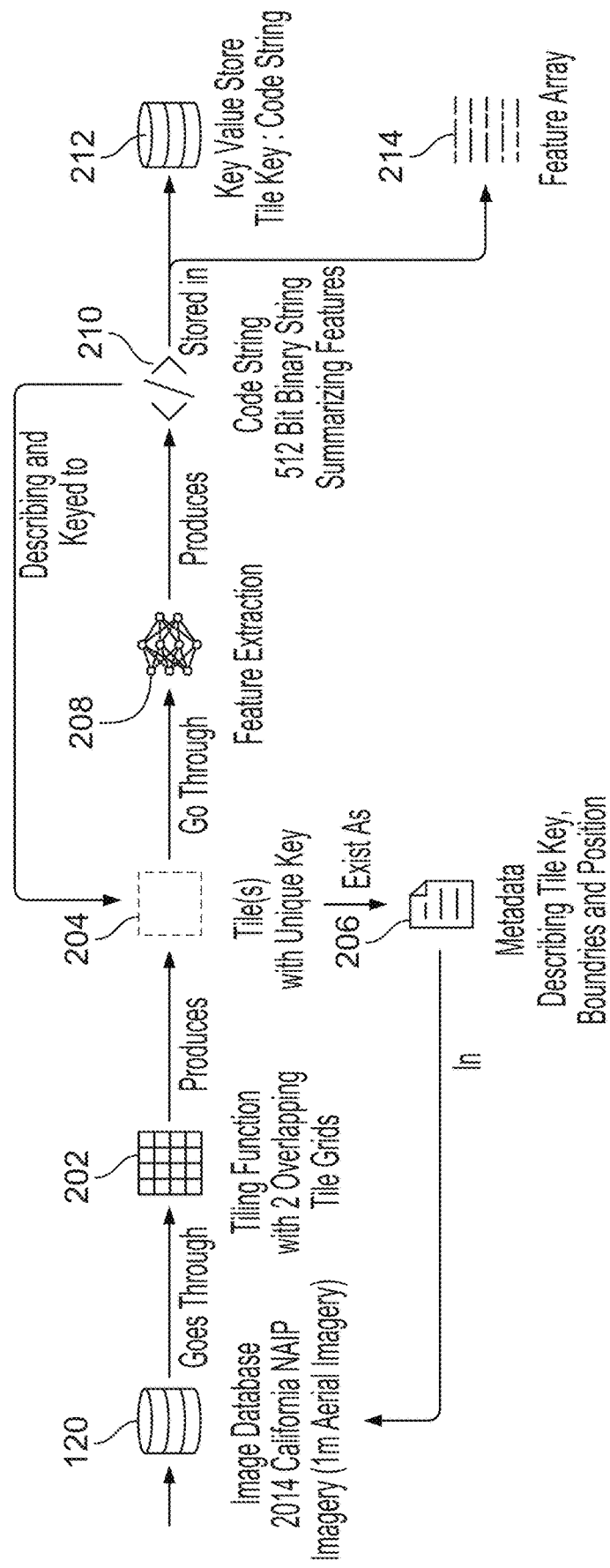
FIG. 2A illustrates an example embodiment of a process for tiling and feature extraction.

FIG. 2A illustrates an example embodiment of a process for tiling and feature extraction. In this example, the example image database 120 of FIG. 1 is accessed to obtain access to raw aerial imagery collected and processed as described above. One example of aerial imagery is 2014 California NAIP imagery, at an example resolution of 1 meter (e.g., 1 m aerial imagery).

In this example, at 202, a tiling function is performed. In some embodiments, the tiling function is performed with two overlapping grids. In one example embodiment, the tiling function is implemented in a language such as Python. As one example, the tiling function is performed as follows.

In some embodiments, a grid definition is obtained. The grid definition may be used to define a grid over a surface. For example, the grid definition may be used to break up or divide up a surface of interest into a set of grid elements (e.g., rectangular, square, or elements of any other shapes, as appropriate). In some embodiments, the grid definition includes a definition of the dimensions or geometry of the elements in the grid. As one example, the grid may be defined by two numbers that define a grid geometry (e.g., grid on a surface of interest such as the Earth's surface), where each element of the grid may be centered on a specific latitude and longitude. The first grid definition value may be a number of pixels on each side of a grid element (e.g., in the case of a square grid). In this example, the second grid definition value includes a pixel resolution that indicates the physical distance covered by one pixel (e.g., where one pixel maps to five meters, or any other pixel-to-distance mapping as appropriate). The values of the grid definition may then be used to define a grid overlay or scaffolding over a surface of interest. The surfaces over which the grid is defined may be of various sizes and shapes (e.g., the entire surface of the Earth, the surface of India, a portion of the Earth's surface that covers a particular town, etc.). In some embodiments, the grid may be shifted. In some embodiments, surfaces may be subdivided into what is referred to herein as "wafers," where an area/surface of interest may be defined as the intersection of a set of wafers. In some embodiments, wafers cover multiple grid elements.

In the example described above, the two above example grid definition values define a grid, such as the dimensions and spacing of the underlying grid elements in the grid. In some embodiments, the definition of the spacing between grid elements also defines the spacing between tile images that are used to cover a surface. For example the delta between the centers of adjacent grid elements defines/ corresponds to the spacing between the centers of tile images. As will be described in further detail below, in some embodiments, a tile image is generated for each grid element, where the center of the tile image corresponds to the center of the grid element (e.g., the geo-coordinates for the center of the grid element and the center of the corresponding tile are the same). In some embodiments, there is no overlap between grid elements of the underlying grid, while the tile images may or may not overlap depending on how the size of the tile images are defined, as will be described in further detail below (e.g., if a tile is defined to be larger in size than the dimensions of a grid element, then overlap will occur).

In some embodiments, a tile (chip) definition is obtained. In some embodiments, a tile is generated for each grid element according to the tile definition. In some embodiments, the tile definition includes a value indicating the number of pixels on a side of an image tile (e.g., if a square tile is to be generated—tiles of other shapes may be defined as well). In some embodiments, there is a one-to-one correspondence between underlying grid elements and tile images. The dimensions of image tiles may be arbitrarily defined.

In some embodiments, based on the dimensions of the tile image as compared to the dimensions of the grid element, image tiles may be non-overlapping or overlapping (while the distance between the centers of tile images may still match the distance between the centers of grid elements). For example, if the dimensions of the tile image are the same or smaller than the dimensions of a grid element, then the tile images will be non-overlapping. One example is if the extent (boundaries) of a tile goes beyond the extent of the dimensions of a grid element (e.g., a tile image is defined to be larger than a grid element), then the tiles will overlap. An example of overlapping tiles is described in conjunction with FIG. 2B.

Figure 2B:
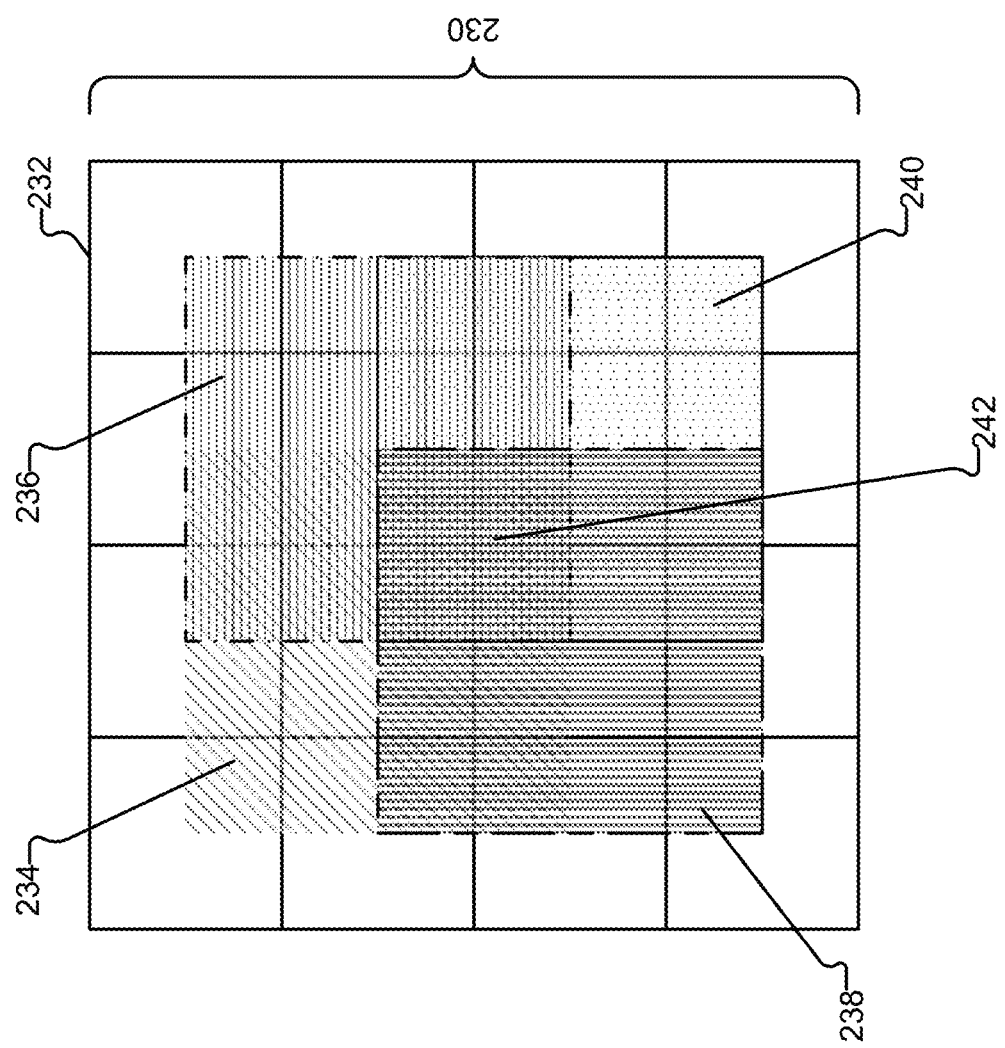
FIG. 2B illustrates an example embodiment of overlapping tiles.

FIG. 2B illustrates an example embodiment of overlapping tiles. Shown in the example of FIG. 2B is grid portion 230 (a portion of an underlying grid defined, for example, according to a grid definition such as that described above). In this example, suppose that a grid element (e.g., grid element 232) is defined to be 64×64 pixels. A tile image (e.g., tile images 234, 236, 238, and 240) in this example is defined to be 128×128 pixels. As shown, each of tiles 234-240 is centered on the center of a grid element. In this example, tile images are defined to be 4 times as large as a grid element. This results in a 4× overlap (e.g., where the amount of tile overlap may be determined by chip pixel area divided by grid element pixel area), where a surface will be covered by 4× as many images as compared to if there were no overlap in tile images. For example, region 242 is overlapped by the four tiles 234-240.

Continuing with the example of FIG. 2A, in some embodiments, tiles (204) are produced as a result of the tiling function performed at 202. For example, as described above, in some embodiments, based on the grid and tile definitions (e.g., the three values used to define the grid and tile definitions), tiles are defined. The geometry definition of the three grid/tile values may be used to adjust the tiling of a surface of interest (e.g., the values may be used to determine how a surface will be tiled, or how tiles will land on a surface). Thus, using the grid/tile definitions describe above, uniform tiles that cover a surface may be generated from raw observational (e.g., aerial/weather) imagery/sensor data. For example, suppose that access to raw satellite imagery of the entire Earth is obtained. Uniform tiles that cover the surface of the Earth may be generated from the raw satellite imagery using the techniques described herein. Thus, in some embodiments, based on the obtained grid definition, a grid is overlaid over a surface such as that of a portion of the Earth (or any other surface, as appropriate, such as on another planet).

As will be described in further detail below, the grid may also be used to determine, at query time, a tile corresponding to a location selected by a user (e.g., on a map rendered in a user interface).

As described above, in some embodiments, for each grid element in the grid, a corresponding tile image is generated. One example of generating a tile image is as follows. The center coordinates (lat/long) of a grid element are obtained. The latitude and longitude coordinates of the corners and/or boundaries of a corresponding tile image may then be determined according to the tile definition (e.g., the coordinates of the corners may be determined based on the center coordinates and the definitions of the number of pixels (with corresponding pixel to physical dimension mapping) on each side of a tile). Based on the determined latitude and longitude coordinates of the tile image, the tile image may be generated by extracting a relevant portion from the raw imagery, for example, by extracting, cropping, and/or stitching together an image tile from the raw imagery (e.g., obtained from a data store such as Google Cloud storage used to store the raw imagery).

The tiles may be represented as metadata (206) describing the tile key, boundaries, and position of a given tile. In some embodiments, based on the metadata describing the tile, the tile is generated by extracting a relevant portion from the raw imagery stored in image database 120.

In some embodiments, the information extracted for a tile includes, for each pixel of the tile, raw image/observational data captured for that pixel, which may include channel information (e.g., RGB, infrared, or any other spectral band, as appropriate), for a given pixel. For example, in some embodiments, a tile image is composed of a set of pixels represented by a grid of data, where each pixel has corresponding data associated with different channels and/or spectral bands such as red, green, and blue brightness/intensity values. The values may also indicate whether a pixel is on or off, the pixel's dimness, etc. In the case of satellite imagery, other types of data in other spectral bands may be available for each pixel in the tile image, such as near infrared intensity sensor data. The values may be on various scales (e.g., 0 to 1 for brightness, with real number values).

Thus, for example, if R(ed), G(reen), B(lue) data for a tile defined as 128 pixels by 128 pixels is obtained, each pixel will include 3 channel values (one for red, one for blue, and one for green). In one example embodiment, the tile is represented, with its raw image data, as a NumPy array (e.g., as a 128×128×3 array).

At 208, for each tile, feature extraction is performed on the raw pixel/spectral data for the tile. In some embodiments, feature extraction is performed using a (partial) convolutional neural net (e.g., net 308 of FIG. 3). Further details regarding (pre-)training of a neural net are described in conjunction with FIG. 3.

In some embodiments, the feature extraction is configured to extract visual features from the tile, based on the raw spectral data of the tile. For example, the feature extraction takes an input data space (e.g., raw image data space) and transforms the image by extracting features from the input data space. As one example, raw brightness values in the raw pixel image data may be transformed into another type of brightness indicating how strong a particular visual feature is in the image.

For a given tile, which, as one example, may be originally represented by a 128×128×3 dimensional array of raw spectral data for the given tile, the feature extraction causes the tile to be transformed, in some embodiments, into a code string 210 (also referred to herein as a "feature vector") that is a representation of the visual features of the tile. The visual feature vector, in some embodiments, is an approximation of the visual information that is in an image inputted into the feature extraction process. In one example embodiment, the feature vector is implemented as a binary string (also referred to herein as a "binary code") that summarizes the features of the tile (e.g., roundness, circle-ness, square-ness, a measure of how much of a diagonal line is coming from bottom left to top right of the tile, or any other component or attribute or feature as appropriate). As one example, the 128×128×3 sized array of raw pixel data may be transformed into a 512 bit binary string/code indicating the presence/absence of visual features. In some embodiments, each bit of the feature vector corresponds to a visual feature of the imagery in the tile. Feature vectors of other sizes (e.g., larger or smaller than 512) may be defined. In some embodiments, the number of dimensions in the space defined by the feature vector (e.g., vector length) may be selected based on criteria that trade off providing rich visual information and compression of the tile representation (e.g., a 1024 size vector will describe more visual features, but will be larger in size than a 512 size vector).

Thus, as shown in the example described above, extracting features may include extracting features from the input, raw image space, to a higher level, but lower dimensionality space. This may provide various performance benefits and improvements in computation and memory usage (e.g., a smaller amount of data used to store the visual information in an image tile, where processing on the smaller amounts of data is more computationally efficient as well).

For example, in the example tile image described above defined to be 128 pixels by 128 pixels, where each pixel has 3 channels of data, the image tile has 49,152 data points. This may result in a high initial space (where a large amount of data is used to represent the tile image). It would be difficult to perform computations if each tile image were represented by such a large amount of data.

As described above, using the example feature extraction described herein, the image tile has been transformed/compressed from being represented by ~50,000 data values (which may be real numbers, (32 bit) floats, etc.), to being represented by 512 bits, a lower dimensionality that is orders of magnitude smaller in size, thereby reducing the amount of data used to represent the visual information of a tile (e.g., the image data for a tile has been transformed into a higher level semantic space with a smaller number of characteristics that are kept track of (as compared, for example, to maintaining spectral data for every individual pixel of a tile)). In some embodiments, reduction of the amount of information used to represent an image allows, for example, feature vectors for a large amount of tiles to be stored in memory, allowing computations to run more quickly (e.g., the feature vector, which is generated from the raw image data, describes the visual features/components of the image tile in a manner that requires less storage space than the raw image data for the tile). Further, comparison of the relatively smaller binary codes allows for more efficient visual neighbor searching, as will be described in further detail below. The transformation of the tile image into a representation of visual features may also improve the likelihood of finding/identifying visually similar results.

As will be described in further detail below, in some embodiments, the determination of whether a tile is visually similar to a query tile image is based on a comparison of feature vectors (e.g., by determining whether the tiles include the same or similar visual features, which may be extracted, for example, using a neural network, as described herein).

As described above, feature vectors are generated (using feature extraction 208) for each tile that is generated (based, for example, on the grid/tile definitions described above). In some embodiments, the feature vectors are stored to a key value store (212) and feature array (214). In some embodiments, the key value store comprises a data store in which the keys are unique keys for generated tiles (e.g., unique string identifiers), and the corresponding values are the feature vectors for the tiles (uniquely identified by their unique string identifiers). In some embodiments, feature array 214 comprises an array of feature vectors (and corresponding tile keys/chip IDs) that is used to perform a search for visual neighbors. In various embodiments, the feature array (or any other appropriate data store) may be structured or implemented or otherwise configured differently based on the type of search that is performed (e.g., brute force nearest neighbor search, hash-based nearest neighbor search, or exemplar-based nearest neighbor search, which will be described in further detail below).

In some embodiments, the tiling and feature extraction of FIG. 2A is performed as pre-processing to generate a corpus or catalog of tiles/chip images and corresponding feature vectors.

Figure 2C:
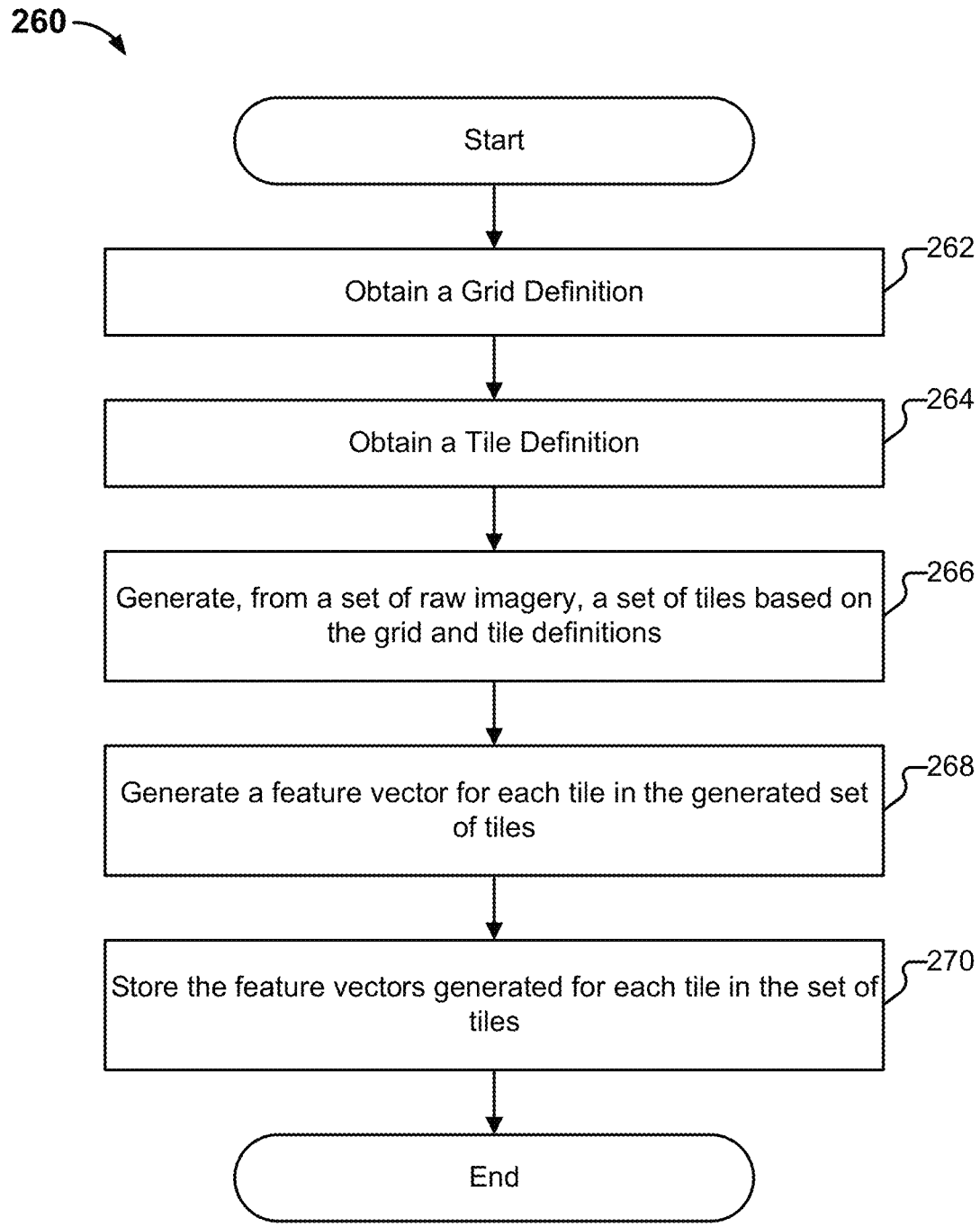
FIG. 2C is a flow diagram illustrating an example embodiment of a process for generating tiles and performing feature extraction.

FIG. 2C is a flow diagram illustrating an example embodiment of a process for generating tiles and performing feature extraction. In some embodiments, process 260 is an example embodiment of the process described in conjunction with FIG. 2A. In some embodiments, process 260 is executed by geo-visual search platform 500 of FIG. 5. The process begins at 262 when a grid definition is obtained. For example, as described above, the grid definition may include values indicating the dimensions of grid elements (e.g., the number of pixels on each side of the grid element), as well as the physical distance represented by a pixel (e.g., 1 pixel maps to 1 meter). Thus, the pixel dimension of a grid element may correspond to a physical size, which may depend on the resolution of the imagery.

At 264, a tile definition is obtained. In some embodiments, as described above, the tile definition includes a value indicating the size of an image tile (e.g., the number of pixels on each side of a tile). The size of the tile may be larger, smaller, or the same as the size of a grid element, resulting in overlapping or non-overlapping tiles (e.g., tiles that overlap by covering the same portion of a surface).

At 266, a set of tiles is generated from a set of raw imagery based on the grid and tile definitions. As one example, a surface is divided according to the grid definition. Tiles for each grid element are generated. In some embodiments, based on the latitude and longitude coordinates of various points of the tile, the tile is extracted from raw aerial imagery/sensor data. For example, based on the latitude and longitude coordinates of the center of the tile (which may map to the center of a grid element) and the pixel/physical distance definitions for the grid/tile, the latitude and longitude coordinates of the corners of the tile may also be obtained. Raw imaging data for the tile may be obtained from a data store of raw imagery (e.g., by cropping, extracting, or otherwise deriving the image data relevant or corresponding to the tile from an overall corpus of raw image data). The tiles may be derived from a set of raw imagery that has been selected based on selected local projections that take into account geometry effects. In some embodiments, the larger raw imagery data is obtained from a storage system such as Google Cloud storage. These larger images, obtained from sources such as satellites, may not be in a grid system (e.g., satellite imagery may be in various shapes that are not regular/uniform in size/dimensions). The raw imagery data, which may be encoded, for example using a format such as the JPEG-2000 file format, may be in different sizes and resolutions. The image tiles may be generated from the larger satellite imagery by cutting pieces from the larger images such that an image tile is obtained. Thus, given a geometry of a chip/tile (based, for example, on tile definition), and given a set of raw images or list of files, the appropriate geometry for the tile is obtained from the raw images/list of files.

In some embodiments, a tile includes a corresponding set of raw image data extracted from a larger set of raw data. For example, the tile may include corresponding metadata information about the brightness/intensity of each pixel in the tile along different channels (e.g., RGB, infrared, or any other satellite bands as appropriate). In some embodiments, the raw image data for a tile is represented using an array data structure (e.g., an in-memory NumPy array implemented in Python, using the numerical Python package "NumPy"), or any other appropriate data structure, that includes the raw data (e.g., channel/spectral data) for each pixel of the image tile. The data for a pixel may include the brightness of the pixel in different bands (e.g., RGB), whether the pixel was on or off, the number of photons that hit a sensor during the time the image was taken, etc.

In one example embodiment, the tile generation is implemented as a Python script. In some embodiments, each generated tile is assigned a unique tile identifier. The generated tiles (e.g., with raw pixel data) may or may not be stored. For example, the tiles generated for feature extraction may not be stored. When rendering a surface or map in a user interface, the tiles may be generated dynamically (e.g., it may be more efficient to generate the tiles when the user is interacting with a browser interface).

At 268, a feature vector is generated for each tile in the set of tiles. In some embodiments, the feature vector corresponding to a given tile is generated by performing feature extraction of the raw image data for the tile. For example, the array of raw image data for a tile is passed as input to a neural net (e.g., convolutional neural network), which is configured to extract visual features of the tile from the array of raw image data and generate as output a feature vector. The feature vector may represent the visual information in a tile. In some embodiments, the features extracted by the neural network may be encoded in the values of the feature vector. In some embodiments, the neural network is pre-trained and tuned for the type of image data used to generate the tiles (e.g., raw satellite imagery). In some embodiments, the feature extraction is performed using a multi-node computing cluster.

Each value in a feature vector may indicate the degree to which a type of visual feature/component is present in the image. In some embodiments, the output of the neural network is a feature vector that includes a set of real value numbers such as floating point numbers.

In some embodiments, the feature vector is implemented as a binary code including a set of bits, where each bit indicates the presence or absence of a type of visual feature or component in the image.

As one example, if the output of the neural network is a set of real value numbers, as described above, binarization may be performed to convert the real numbers into binary bits (e.g., into a binary code). For example, for each floating point value, a threshold is used to binarize the value (e.g., if the value is above 0.5, then it becomes a "1," where if the value is below the threshold, it becomes a "0"). In some embodiments, the neural network is configured to output values (e.g., floating point values) that are already close to either 0 or 1, such that the neural network is already encoding 1 bit of information (even if the outputted information may be in a form such as a 32-bit floating point). In this example, this reduces the size of the feature vector from storing, a set of floating point numbers (e.g., five hundred and twelve 32-bit values), to storing a set of bits (e.g., 512 bits).

At 270, the feature vectors generated for each tile in the set of tiles are stored. For example, the image tile identifiers and corresponding feature vectors are stored to a data store such as key value store 212 of FIG. 2A. In one example embodiment, the data store is implemented as an in-memory Redis database. The Redis database may be implemented on a separate compute instance/server that is configured to have a large amount of memory (e.g., 400 GB). As described above, the original raw image data used to describe a tile may include a large amount of data (as there may be raw sensor data for each pixel in a tile). Using the feature extraction described herein, a tile may be described/represented in a more compact/compressed representation that still provides rich visual information about the tile (e.g., a 512 bit vector versus the number of bits needed to store raw image pixel data values). This allows, for example, the data representing the tiles to fit into an in-memory data store such as a Redis database (where the per-pixel raw image data for every tile may not otherwise fit), further allowing for efficient querying. Thus, if a large number of tiles is generated (e.g., 2 billion tiles), all the tiles may be stored in the in-memory database, where, in one example embodiment, the identifier for a tile is stored as a key in a data store along with a corresponding N-bit feature vector/binary code as a value corresponding to the key.

Training

Figure 3:
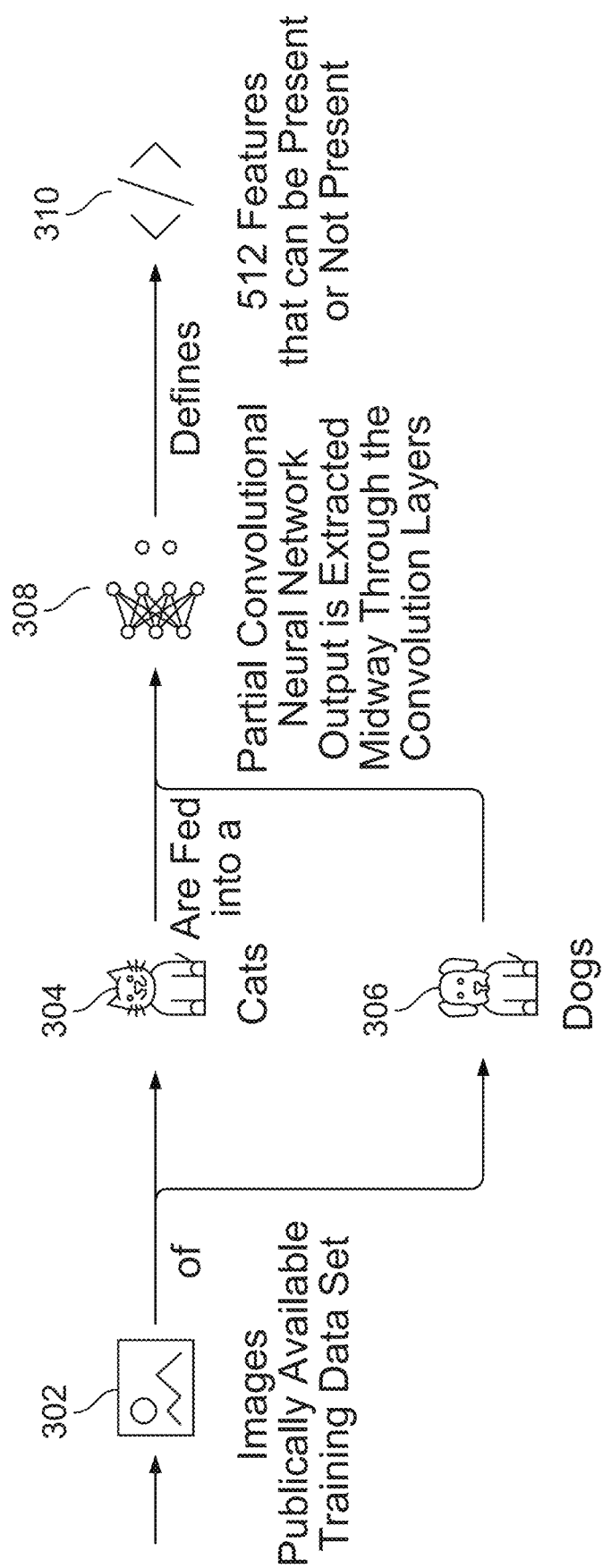
FIG. 3 illustrates an example embodiment of a process for training of a neural network and feature definition.

FIG. 3 illustrates an example embodiment of a process for training of a neural network and feature definition. In the example shown, a neural network (308) is trained for use in performing feature extraction (e.g., as described in conjunction with FIG. 2A). In some embodiments, a new neural network is generated. In other embodiments, an existing neural network is modified/tuned for geo-visual search. For purposes of illustration, modification of an existing neural network is described in conjunction with FIG. 3.

In this example, a set of images (302) is obtained. The images 302 in this example include a publically available training data set of cats (304) and dogs (306). The data set may also extend to include other natural images. The images 304 and 306 are passed through a convolutional neural network (308). In one example embodiment, the neural network is a module that is in a framework such as the TensorFlow framework (an example of an open source machine learning library from Google). In this example of FIG. 3, a neural network trained to classify whether an image is of a cat or a dog is modified, for example, by removing one or more layers from the original neural network (e.g., the final layer used to classify or label whether the image is of a cat or a dog).

In this example, the neural network includes a series of layers that perform computations at higher and higher levels of abstraction. For example, the neural network may work on pixels initially, determine fine edges from those pixels, find a set of edges that define corners, etc. (e.g., that define cat ears, cat faces, and so on). This determination may build up as the computation progresses through the layers, where the output of a node in one layer may go to one or more nodes in the next layer. In one example embodiment, the final output of the neural network is a series of values (e.g., one thousand numbers) that represents the probability of the inputted image (represented by its raw image data) being of a certain type/classification (e.g., probability that the image is of a cat, of a dog, etc.).

As described above, in some embodiments, when modifying the existing neural net, the last several layers may be taken off (e.g., the layer that outputs a classification of whether the image is of a cat or dog, the layers used to determine whether there are cat ears, etc.).

In this example, output is extracted midway through the convolutional layers of the original neural network (resulting in a "partial" convolutional neural network 308). For example, the output that is produced out of an intermediate layer (e.g., penultimate layer) may be taken. In some embodiments, additional layers may be added on from the intermediary extraction point. In one example embodiment, removal, addition, and/or rewiring of layers in the neural network may be performed using a framework such as TensorFlow. As one example, when training the neural net, layers used to determine the likelihood of the image including objects such as wind turbines, churches, etc. may be added. In some embodiments, the modified neural network may then be trained using a ground truth set of images that includes various elements of interest, such as wind turbines and churches. The neural net, in some embodiments, is trained to recognize these images as such. After the training, those two layers for classifying/labeling images may be removed.

In this example, the extracted output from neural net 308 defines a feature vector (310) that indicates whether a type of feature (in a set of features) is present (or not present), or in other embodiments, the degree/likelihood to which a type of feature/component is present. Thus, using the techniques described herein, a neural net trained to extract features (e.g., roundness, corner-ness, square-ness in a manner that may be class/label agnostic) from imagery such as aerial (e.g., satellite) imagery may be obtained, for example, for the context of geo-visual search.

In some embodiments, the outputted values of the neural network are real numbers (e.g., represented as 32 bit floating point values) that may be of any value. In some embodiments, as described above, binarization is performed to cause the values to be transformed to binary values (e.g., 0 or 1). This results in a feature vector that is not only 512 values, but 512 binary values that is a 512 bit feature vector (512 length binary code). The binarization may result in compression in the size of the feature vector, taking up a smaller amount of storage space.

Thus, in this example, by performing feature extraction, the image tile, originally represented by a large number of values (e.g., ~50,000 data values for an image tile with 128 pixel×128 pixel×3 channels of data) that may be, for example, 1 megabyte in size, is compressed down to less than a kilobyte of data (e.g., 512 bit feature vector). While the amount of data used to represent the image tile has been reduced, as the feature vector represents the features of the image tile, rich visual information about the image tile has been stored in a comparably smaller amount of data. As another example, the raw input image has been mapped to a single point in a 512 dimensional space (e.g., where each dimension of the space is a feature, and the 512 bit values of the feature vector define a particular point in the 512-dimensional space). As another example, if a 3 bit feature vector were used, where the bits represent circle-ness, square-ness, and triangle-ness, then the input image tile would be compressed into a 3-dimensional space with each axis corresponding to one of the three features. The specific three values in the feature vector generated for the image would define a coordinate, or a single point, in this new 3-dimensional space. Thus, the input image tile has been mapped into a new space (e.g., of visual features).

In some embodiments, images that are determined to be visually similar are those images that, when transformed using the feature extraction described above, map to the same neighborhood in the dimensional space (e.g., are visual neighbors) defined by the features of the feature vector. As another example, when identifying what other tiles are similar to a query image tile, the image tiles that are in the local neighborhood of the query image may be identified. In some embodiments, the closeness of the feature vectors of the image tiles (e.g., based on criteria such as hamming/Euclidean distance) indicates their visual similarity.

Described below are example techniques for finding visually similar images based on nearest neighbor searches. Using the techniques described herein, an efficient search over a large corpus of images (e.g., 2 billion images) to identify visual neighbors may be performed.

The example processing of FIGS. 1-3, as described above, may be performed as pre-processing to generate a corpus of tiles/chip images and corresponding feature vectors, which may be stored to various data stores such as key value store 212.

Processing a Query/Performing Geo-Visual Search

Figure 4A:
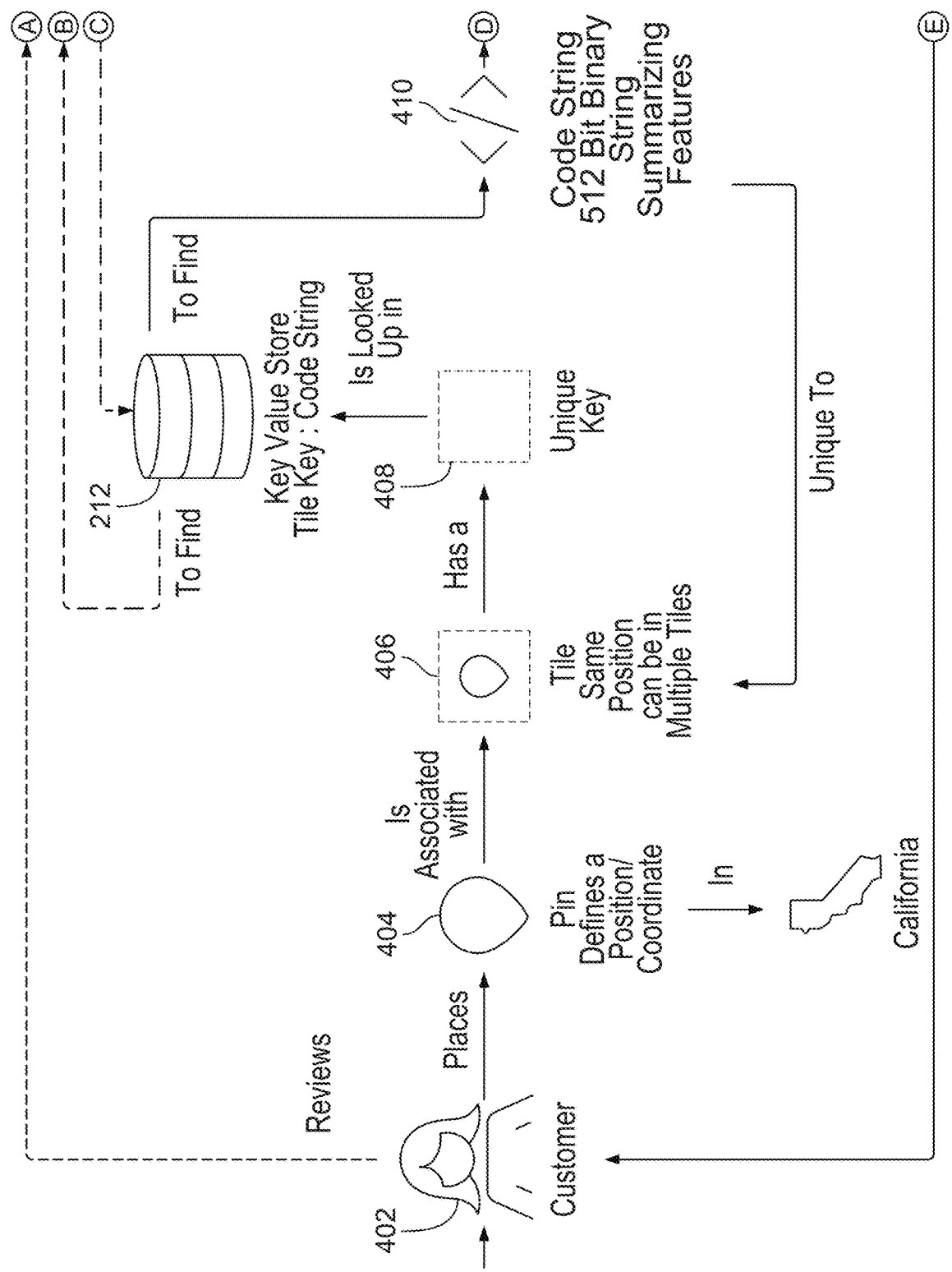
FIG. 4A is a flow diagram illustrating an example embodiment of a process for performing a user query/geo-visual search.

FIG. 4A is a flow diagram illustrating an example embodiment of a process for performing a user query/geo-visual search. In this example, a user (402), Alice, interacts, through her browser (e.g., her laptop, desktop, mobile device, etc.), with a rendered map. In some embodiments, the map in the user interface shows a portion of the surface of the Earth that is generated from aerial imagery. In some embodiments, the rendered map is generated using the image tiles extracted from satellite imagery, as described above.

At 404, Alice interacts with the rendered map, for example, by dropping a pin or clicking on a location in the rendered map. For example, suppose that Alice is viewing a map of California and drops a pin on a location/position/coordinate in California. In some embodiments, a script (e.g., implemented in JavaScript) is configured to determine the geographical coordinates (e.g., latitude/longitude) of the position on the map selected by Alice.

At 406, a corresponding tile (previously generated, for example, using the tiling and feature extraction process described above in conjunction with FIGS. 2A and 2C), is obtained. In this example, the unique key 408 for the corresponding tile 406 is obtained and used to perform a lookup of a data store such as key value store 212. Using the unique key 408 as a lookup key, the corresponding code string (visual feature vector/binary code) (410) for the unique key (tile identifier) is obtained.

At 412, the feature vector for the selected tile (also referred to herein as the "query feature vector") is compared to other feature vectors in the corpus of tiles that were previously processed, as described above. In some embodiments, the query feature vector is configured against candidate feature vectors stored in a data store such as feature array 214 to determine tiles that are the nearest neighbors (e.g., nearest visual neighbors) to the query tile. In some embodiments, the comparison of the query feature vector against a candidate feature vector is scored at 414. As one example, the hamming distance (e.g., number of bits that are different) between the query feature vector and a candidate feature vector (if, for example, the feature vectors are implemented as binary codes) is determined and used as a criteria (416) to determine a score to indicate how close the query feature vector is to a given candidate feature vector. For example, a shorter hamming distance indicates a better, or closer match between a query feature vector and a given candidate feature vector (e.g., fewer differences in visual features). For example, the hamming distance indicates the number of (visual) features that are different (not in common/not shared) between the two feature vectors/binary codes.

At 418, the candidate tiles are sorted and filtered based, for example, on the hamming distance between the candidate feature vectors and the query feature vector (e.g., the tile keys are sorted and filtered based on how close their feature vectors are to the query feature vector). In this example, the top N tiles (e.g., top 500 tiles) that are the closest visual neighbors to the query tile (e.g., having the shortest hamming distance to the query feature vector) are provided as output. Thus, the top 500 tiles that are the nearest neighbor of the query tile by similarity of visual features are returned as results (420) of the geo-visual search.

In this example, the top 500 tiles that are provided as results (represented by their unique tile identifiers) are looked up to obtain information about the tiles, which are then presented to the user, Alice, (e.g., in the user interface) at 422. For example, a thumbnail of a returned tile may be obtained. In some embodiments, a sorted list of thumbnails for the top 500 returned tiles (or a subset of the returned tiles, e.g., the top 10) is displayed in the user interface. As another example, the coordinates of the returned tiles (e.g., the lat/long of the center of a returned tile) are obtained. In some embodiments, using the obtained coordinates, visual indications, such as pins, indicating the locations of the returned tiles are placed on a rendered map, allowing Alice to view, on the map, the locations of areas that are visually similar to the location selected by Alice.

In some embodiments, Alice may provide feedback about the returned results, which may be used to re-rank/re-order the results, alter training (e.g., the criteria for determining scores 414 when comparing feature vectors), etc. Further example details regarding providing feedback are described below.

In the above example of FIG. 4A, the query feature vector/code string is compared against a candidate set of feature vectors (e.g., an array of feature vectors 214) to determine the tiles that are closest, based on visual similarity, to the query tile selected by the user, Alice. The candidate set of feature vectors may be obtained from the feature vectors generated for the corpus of tiles, which may be of a very large number (e.g., on the order of billions of tiles). Thus, comparison of feature vectors to determine nearest neighbors may be challenging, requiring large amounts of memory and computational processing power. Various techniques may be used to perform the comparison of feature vectors to determine nearest neighbors that may, for example, trade off precision and efficiency. Examples of such techniques may include a brute force nearest neighbor search, a hash-based nearest neighbor search, and an exemplar nearest neighbor search, which will be described in further detail below.

Further Details Regarding Nearest Neighbor Search

As described above, in some embodiments, a nearest neighbor search based on feature vectors is performed to determine tiles (e.g., in a corpus of tiles) that are visually similar (e.g., to a query tile). Examples of various types of searches are described in further detail below.

Brute Force Nearest Neighbor Search

In one example embodiment, a brute force nearest neighbor search is performed as follows. The query feature vector is compared to the feature vectors for every tile image in the corpus (e.g., of all tile images, generated, for example, using the example processes described above in conjunction with FIGS. 2A and 2C). In some embodiments, the corpus includes binarized visual feature vectors generated for the tile images (e.g., 2 billion feature vectors for 2 billion images). The 2 billion tile images will be searched over to identify those that are the most visually similar to the query tile image, based on a comparison of the query feature vector to the feature vectors of the tiles in the corpus.

In this example of a brute force search, when comparing the query feature vector against a candidate feature vector (e.g., a feature vector in the corpus), all of the bits of the feature vectors are compared against each other to determine a hamming distance. The comparison is performed by brute force, where the query feature vector is compared against every candidate feature vector in the corpus. The brute force search may result in an exact solution being determined (e.g., since every tile in the corpus was searched over), but may be inefficient, as every candidate tile in the corpus must be compared with the query tile. In one example embodiment, the brute force nearest neighbor search is implemented in a programming language such as C.

In some embodiments, the corpus of tiles is then filtered/sorted according to the comparison. For example, the corpus of tiles are sorted based on hamming distance, as described above. The top N number of results that have the shortest hamming distance to the query vector for the query tile is obtained. As the query feature vector is compared against the feature vectors for every tile in the corpus of feature vectors, an exact solution to the closest neighbors (most visually similar image tiles) is determined, but may be less efficient (e.g., slower) than the other search techniques described herein.

Hash-Based Nearest Neighbor Search

In some embodiments, the hash-based search provides a more efficient approach (e.g., as compared to brute force) that provides an approximate solution to identifying visually similar tiles. As described above, a feature vector may include a vector of binary values, where the feature vector is of a certain length corresponding to the number of features whose presence/absence is detected/extracted from a tile.

Generating a Hash-Based Index

In this example, a hash-based search may be performed at a database level. For example, in one example embodiment, another in-memory Redis database (or any other type of database, as appropriate, such as a data store managed by Google Cloud Database) is instantiated. In some embodiments, instead of storing a mapping of tile identifiers to corresponding feature vectors, as in the example of key value store 212 of FIG. 2A, a database is instantiated that includes a mapping of a portion of values of feature vectors (e.g., the first/starting 32 bits of the 512 bits in a feature vector) to a list of chip/tile identifiers that share that same subset/chunk of bits (e.g., a list of tile identifiers that share the same starting 32 bits in their feature vectors). In this example, tile identifiers are indexed/hashed based on a common portion of their feature vectors. In some embodiments, the different 32 bit feature vector portions/chunks are used as indices. In various embodiments, feature vectors may be compressed in other ways, such as via compression.

Hashes of different portions/chunks of feature vectors may be used as keys when generating, for example, a lookup table of key value pairs. For example, as described above, in some embodiments, those tiles whose corresponding feature vectors start with the same 32 bit sequence are grouped together, where the 32 bit sequence is used as a key, and the list of identifiers of the tiles whose feature vectors share the same starting 32 bit sequence is stored as the corresponding value to the key. Other chunks of feature vectors may also be used, as will be described in further detail below.

In some embodiments, during query time, the use of such prefixes/indexes provides an approximate way of finding visual neighbors to a query tile, because the images sharing the same 32 bit prefix will have at least that portion of the visual feature components in common (e.g., images having the same starting 32 bits is an indication of some similarity between the images).

In one example embodiment, pre-emptible VMs are used to perform the computations used in the pre-processing/indexing described above. The computations may be distributed to multiple compute nodes. In some embodiments, the results are then returned to one or two database (e.g., Redis) instances (e.g., database 212).

Figure 4B:
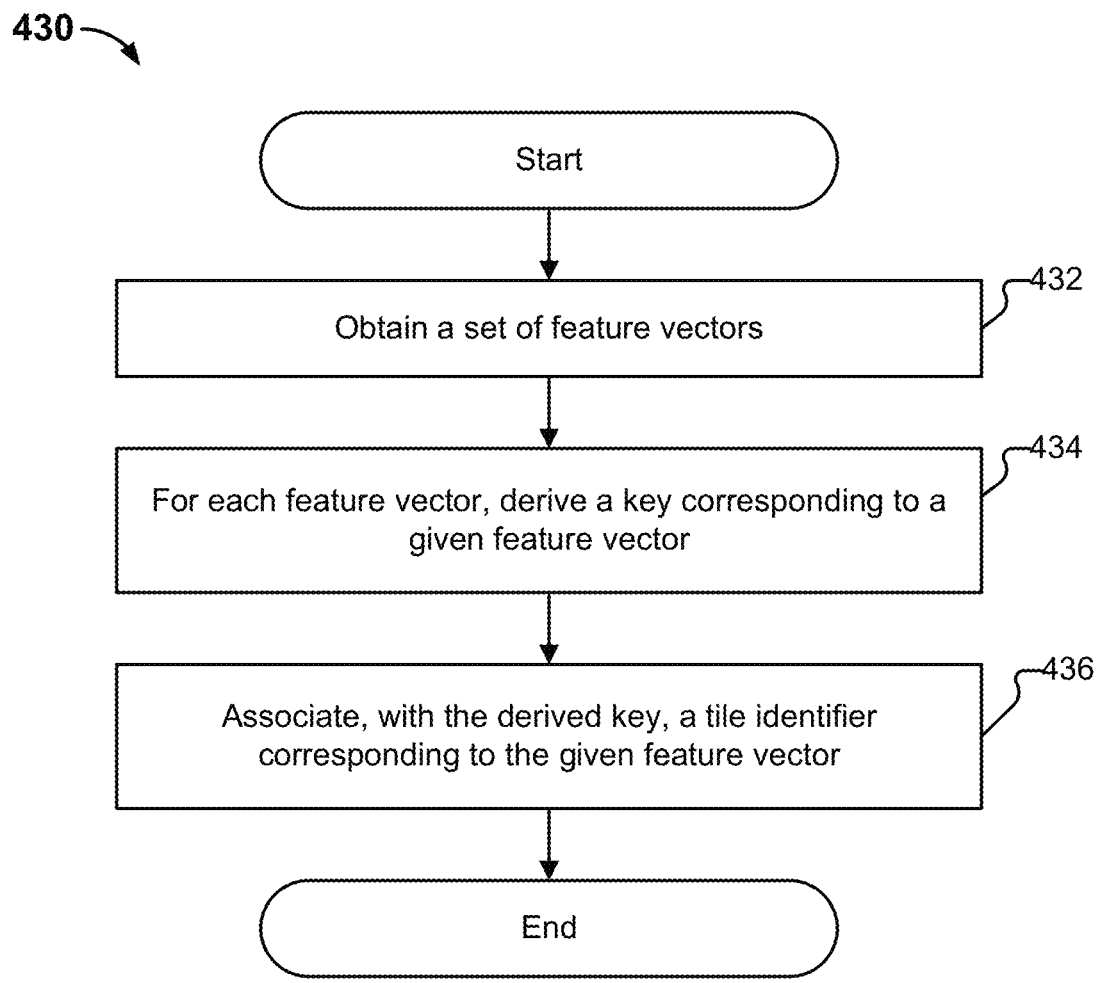
FIG. 4B is a flow diagram illustrating an example embodiment of a process for generating a lookup table.

FIG. 4B is a flow diagram illustrating an example embodiment of a process for generating a lookup table of visual neighbors. Any other data structure (e.g., an array data structure) may be generated as appropriate. In some embodiments, process 430 is executed by geo-visual search platform 500 of FIG. 5. The process begins at 432 when a set of feature vectors is obtained. For example, a corpus (or a portion of a corpus) of feature vectors is accessed. At 434, for each feature vector obtained at 432, an index (e.g., key) into the lookup table is derived. In some embodiments, a given feature vector in the corpus is passed through a hash function, or any other function/processing as appropriate, to determine a key in the lookup table. For example, a portion of the given feature vector (e.g., starting 32 bits) are obtained and used as a key in the lookup table. Multiple feature vectors may map to the same key. At 436, a tile identifier corresponding to the given feature vector is associated with or otherwise mapped, in the lookup table, to the derived key. For example, the tile identifier for the given feature vector is stored as a value for the key (e.g., as a key-value pair in a key-value store). In some embodiments, the tile identifier (or any other spatial identifier, as appropriate) corresponding to the given feature vector is included in a list of tile identifiers corresponding to the key (e.g., where many feature vectors may map to the same key/index). In some embodiments, process 430 results in the generation of a lookup table or hash table or key value store, where a key is the result of hashing a feature vector, and the corresponding value for the key is the list of tile identifiers whose feature vectors share the same key (and therefore, some visual similarity). As will be described in further detail below, multiple lookup/hash tables or key value stores may be generated, with different functions used to generate different keys from the feature vectors for different lookup tables.

Performing a Hash-Based Nearest Neighbor Search

In some embodiments, during query time, the query feature vector for the query tile is obtained. In this example, the starting 32 bits of the 512 bit query feature vector are obtained (e.g., the query feature vector is hashed such that it is mapped to its starting 32 bit variable values). In some embodiments, the query hash is used to access the previously generated hash-based index (e.g., by performing a lookup of the lookup table described above using the starting 32 bits of the query feature vector as a key). The list of tiles that have the same starting 32 bits as the query feature vector for the query tile are obtained. The obtained list of tiles that share the common portion of their feature vectors is obtained as a candidate list of neighboring tiles.

The feature vectors for the candidate tiles may then be obtained (e.g., from key value store 212, by using the obtained list of tile identifiers to obtain the corresponding feature vectors). In some embodiments, a comparison of the query feature vector to each of the feature vectors for each of the tiles in the candidate list is performed. For example, as described above, the hamming distance between the feature vectors of each of the candidate tiles and the query feature vector is determined. The candidate tiles whose feature vectors are nearest to the query feature vector are returned as visually similar results.

In the above example in which 32 bit prefixes are used as keys, it may occur that some tiles in the corpus that are close to the query tile may not be returned. For example, if the first two bits of a feature vector of a tile in the corpus were transposed as compared to the first two bits of the query vector, but the rest of the bits were the same, the closely matched tile might be missed, because its first 32 bits are different from the first 32 bits of the query feature vector. In some embodiments, other chunks/keys and/or multiple types of chunks/keys maybe used to index tiles. As one example, a sliding window of bits is used, and multiple searches are performed. For example, tiles may be indexed/partitioned/grouped together based on different portions/chunks of the feature vector (e.g., middle 32 bits, last 32 bits, random 27 bit chunk, etc.).

In one example embodiment, a 512 bit feature vector is divided into sixteen, 32-bit chunks. In this example, 16 different lookup tables are generated, each of which indexes tiles in the corpus based on the corresponding chunk division. In some embodiments, the process described above at search time is repeated 16 times (once for each table), and the results (e.g., candidate lists of tiles) of the 16 lookups are aggregated together (e.g., where the union of all of the obtained lists is performed to generate a single, longer candidate list). The query feature vector is then compared against the feature vectors for the unioned set of candidate tiles to determine the nearest visual neighbors to the query tile.

In the above example, 16, non-overlapping 32 bit chunks of feature vectors were checked. Various portions of feature vectors (e.g., which may be overlapping) of different lengths and positions may be processed to identify candidate neighbors. For example, rather than creating 16, 32-bt chunks, a feature vector may be divided into 100, overlapping chunks. Lookup tables may be generated for each of the 100 chunks, where the query feature vector is divided up in a corresponding manner, and a search of each lookup table is performed, as described above, to obtain a candidate list of tiles against which to compare the query tile (e.g., by aggregating/union-ing the lists of tile identifiers returned as results from the querying of the different tables using different keys derived from the query feature vector). Any other functions for deriving keys and generating lookup tables may be used, as applicable.

In some embodiments, a cloud-based data store may be used to increase the efficiency of high volume/frequency accessing key-value lookup tables.

Figure 4C:
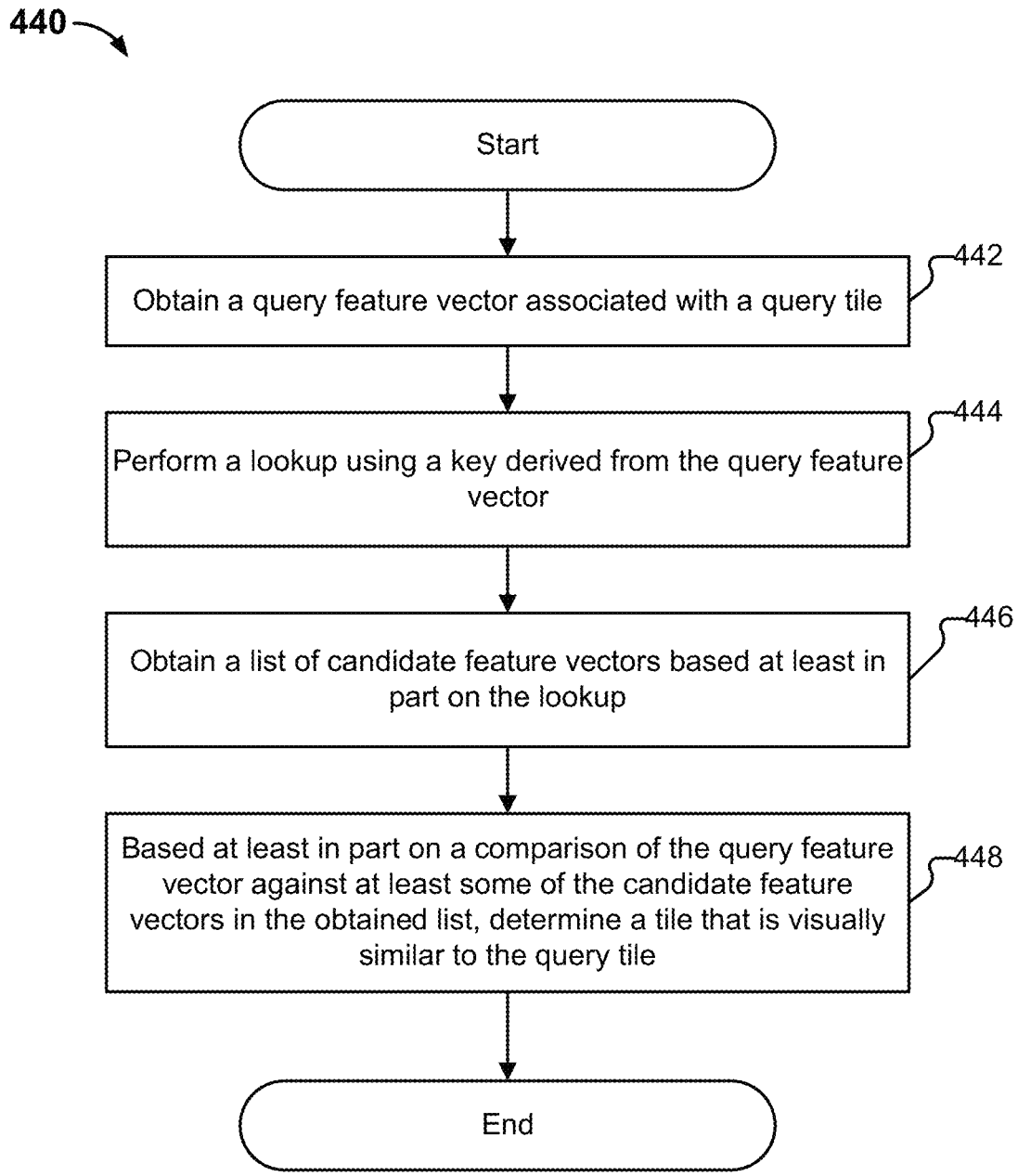
FIG. 4C is a flow diagram illustrating an example embodiment of a process for performing a hash-based nearest neighbor search.

FIG. 4C is a flow diagram illustrating an example embodiment of a process for performing a hash-based nearest neighbor search. In some embodiments, process 440 is executed by geo-visual search platform 500 of FIG. 5. The process begins at 442 when a query feature vector associated with a query tile is obtained. An example of obtaining a query feature is described in process steps 482-484 in conjunction with process 480 of FIG. 4F (described in further detail below).

At 444, a lookup using a key derived from the query feature vector is performed. For example, the query feature vector is mapped to a key. In one example embodiment, a key is derived from the query feature vector. As one example, deriving of the key may include applying a hash function to the query feature vector to obtain the key. As another example, a portion of the query feature vector (e.g., starting 32 bits) is extracted or obtained to be used as a key. The obtained key is then used to perform a lookup, for example, in a lookup table or key value store (e.g., generated using process 430, as described above). At 446, a list of tile identifiers corresponding to the key is retrieved, where the obtained list of tile identifiers is used as a candidate list of tiles from which visual neighbors of the query tile are determined. In some embodiments, the feature vectors corresponding to the candidate tile identifiers in the list are obtained (e.g., by searching a data store such as key value stores 212 of FIG. 2A and 512 of FIG. 5 using the tile identifiers and obtaining in return the feature vectors corresponding to the tile identifiers used in the lookup).

At 448, based at least in part on a comparison of the query feature vector against at least some of the obtained candidate feature vectors corresponding to the candidate list of tiles, a tile that is visually similar to the query tile is determined. In one embodiment, a comparison (e.g., brute force comparison) of the query feature vector against the obtained candidate list or set of feature vectors is performed. In some embodiments, the comparison includes determining a distance (e.g., hamming distance) between the query feature vector and each of the candidate feature vectors. In one example, the closest (e.g., based on hamming distance) feature vectors in the obtained list are identified. The identified nearest visual neighbors may then be provided as output (e.g., displayed in a map, as thumbnails, etc., as described herein). Further details regarding outputting results of the search are described below.

As described above, multiple lookup tables may be generated. In some embodiments, multiple keys (e.g., each corresponding to a particular lookup table) are derived from the query feature vector. The candidate list of tile identifiers/corresponding candidate feature vectors may then be obtained by aggregating (e.g., by union-ing) the lists of tile identifiers obtained from the various lookups (using the multiple keys derived from the query feature vector) of the multiple, previously generated, lookup tables.

Exemplar Nearest Neighbor Search

Another example type of search is an exemplar-based nearest neighbor search. In this example, during search time, a query tile is compared against a set of previously-selected example tiles (also referred to herein as "exemplars"). In some embodiments, each of the exemplar tiles has been associated with a corresponding list of tiles (e.g., identified by tile ID) that have been previously determined (e.g., as part of pre-processing prior to query time) to be similar to the given exemplar. If the query tile is determined to be visually similar to a particular exemplar (or subset of exemplars), the list of tiles previously determined to be similar to the particular exemplar is obtained as a candidate list of tiles. The query tile is then compared against the candidate list of tiles corresponding to the particular exemplar to determine which tiles in the candidate list of tiles is visually similar to the query tile.

Generating Exemplars

An example of performing pre-processing for an exemplar-based search, including the generation of exemplars, is as follows. In this example, exemplars involving the surface of the United States are described for illustrative purposes. The techniques described herein may be variously adapted to accommodate any other geographic region or surface.

In some embodiments, the exemplars are a subset of the tiles in the corpus of all tile images (e.g., a subset of 100 thousand tiles in a corpus of 2 billion tiles). In one example embodiment, the subset of tiles in the corpus is obtained as followed. In some embodiments, a random number (e.g., 50K) of lat/long coordinates/points is selected (e.g., 50K points in the United States are randomly selected). The randomly selected points are then combined with a number (e.g., 50K) of curated points of interest. The points of interest may include curated infrastructure points, as well as points with geological features of interest such coastlines, streams, ponds, scree (e.g., scattered rock to obtain various types of different textures), etc. Other examples of points of interest may include man-made structures (e.g., pools, wind turbines, parking structures, malls, etc.).

In some embodiments, the locations (e.g., coordinates) of points of interest are identified using a service or tool such as OpenStreetMap (referred to herein as "OSM"). In some embodiments, OSM provides a data set that includes locations that are tagged with metadata that, for example, describes what is at that location (identifiable by its geo-coordinates). The metadata may include an open source set of user contributed tags that describe places/locations. For example, users may view or evaluate satellite or other aerial imagery, draw a polygon around a parking lot, and then tag the polygon as a parking lot. The coordinates of the location of the polygon may then be associated with a parking lot tag. As other examples, the data set may include a list of information indicating that there is a wind turbine at a particular location, that there is a building at another location, a mall at another location, etc. The data set may be browsed, for example, to identify locations of points of interest that are tagged as particular types or classes. In some embodiments, a list of classes/types (e.g., parking lot, stream, pond, etc.) is searched for. A random assortment of types/classes may also be selected for searching.

In some embodiments, such a data set as the OSM data set is obtained as a downloaded file. The data set, in some embodiments, is then placed into a separate database for efficient querying. In one example embodiment, a Python API is used to interface with the downloaded data set.

The data set, in some embodiments, is then queried for the locations of points of interest that are of one or more types/classes (e.g., curated/selected types/classes of interest). In one example embodiment of querying the database, a query may be submitted to the data set requesting 100 random instances of locations that are tagged as parking lots (example of a class/type). In some embodiments, the OSM data set is searched to identify polygons that have been tagged as a parking lot. For a parking lot polygon that is identified, the associated lat/long pair for the parking lot is obtained. Thus, if, for example, 100 random instances of parking lots are requested, the latitude and longitude coordinates for 100 random locations that have been tagged as parking lots are returned. Random instances of locations that are tagged as various types/classes of points of interest (e.g., church, scree, coastline, parking lot, streams, etc.) may be obtained.

In this example, one hundred thousand exemplar lat/long pairs have been obtained, fifty thousand of which were randomly selected, the other fifty thousand of which were returned from a curated search for points of interest, for example, by searching a data set such as that provided by OSM, as described above.

In some embodiments, the exemplar coordinates (e.g., lat/long pairs) are passed as input to a script that is configured to provide as output, for each lat/long pair, a tile identifier corresponding to the lat/long pair (e.g., unique string identifier for the lat/long pair). As one example, a grid element (defined, for example, using the grid definition described above) that includes the lat/long for a given exemplar is identified (or the grid element that is most centered on the lat/long). The tile images (identified by their unique tile identifiers) associated with the identified grid elements are obtained. In another example embodiment, a tile includes as metadata (e.g., metadata 206) the coordinates of its position (e.g., center of the tile). Tiles are then identified directly by performing a search by exemplar coordinates. In some embodiments, the feature vectors corresponding to the obtained exemplar tile identifiers are then obtained (e.g., by querying key value store 212 of FIG. 2A). The feature vectors for each of the exemplar tile identifiers may then be obtained.

In some embodiments, for each exemplar feature vector, a search (e.g., brute force search) over all feature vectors in the corpus of tile images is performed (e.g., using Python) to determine the closest visual neighbors to the exemplar tile (e.g., closest thirty thousand neighbors). For example, for the 2 billion tiles that were generated, a single file with 2 billion, 512-bit, feature vectors is obtained. In one example embodiment, given an exemplar feature vector, a program (e.g., implemented in C or Python) processes the file of feature vectors to determine the closest neighbors (e.g., based on hamming distance) for each of the exemplars. For example, the program returns the thirty thousand tiles' closest visual neighbors to the exemplar tile (based on closeness between the feature vectors of the tiles).

In some embodiments, for each exemplar, the determined 30K nearest neighbors are stored (e.g., to a data store such as Google Cloud Storage, a Redis database, etc.). In one example embodiment, the exemplars/corresponding nearest neighbors are stored in two files. In some embodiments, the first file includes the feature vectors for the 30K most visually similar tiles to a given exemplar tile. In some embodiments, the second file includes the tile identifiers for the 30K tiles. Thus, in this example, for each of the 100K exemplars, the 30K nearest visual neighbors have been identified and stored, which may be used for performing an efficient search at query time.

Figure 4D:
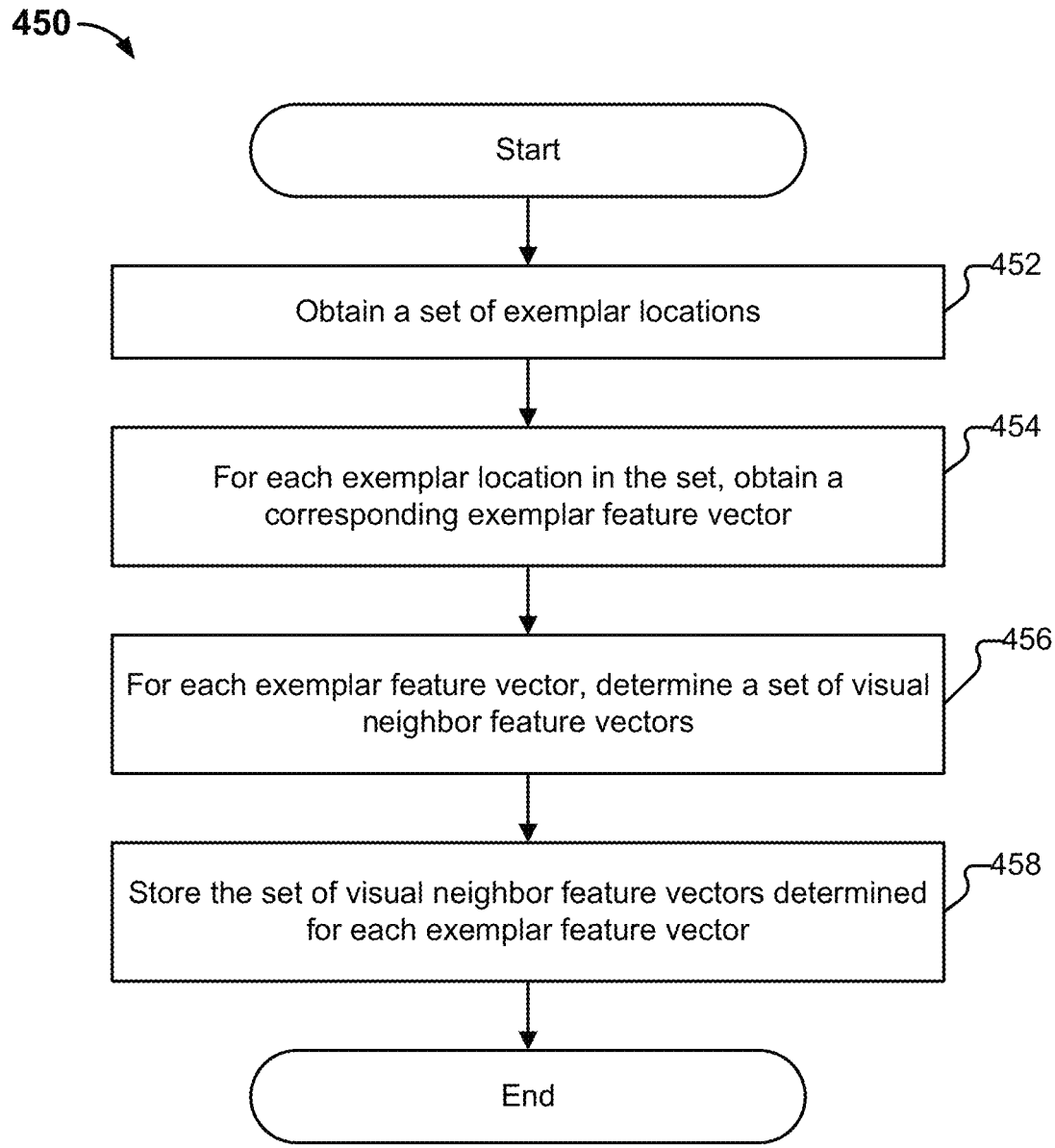
FIG. 4D is a flow diagram illustrating an example embodiment of a process for generating exemplars.

FIG. 4D is a flow diagram illustrating an example embodiment of a process for generating exemplars. In some embodiments, process 450 is executed by geo-visual search platform 500 of FIG. 5. The process begins at 452 when a set of exemplar locations is obtained. As described above, the exemplar locations may include a set of exemplar coordinates (e.g., latitude/longitude coordinates) of locations. Examples of exemplar locations include coordinates of randomly selected locations and/or curated locations, as described above.

At 454, a corresponding exemplar feature vector is obtained for each exemplar location in the set of exemplar locations. As one example, for each exemplar lat/long, a corresponding tile identifier is obtained (e.g., by determining a grid element encompassing the given lat/long and identifying the tile corresponding to the grid element). The feature vector (e.g., binary code) corresponding to the tile identifier (e.g., previously generated using feature extraction, as described above) may then be obtained (e.g., from a corpus stored in a data store such as a Redis database).

At 456, for each exemplar feature vector, a set of visual neighbor feature vectors is determined. For example, each exemplar feature vector is compared against the feature vectors corresponding to tiles in a corpus of tiles (e.g., corpus of all tiles previously generated, as described above). In some embodiments, the feature vector comparison includes determining a distance between the feature vectors (e.g., hamming distance), where, for example, the shorter the distance between feature vectors, the more visually similar they are determined to be. The closest visual neighbors (e.g., based on distance) to each of the exemplar feature vectors are determined.

At 458, the set of visual neighbor feature vectors determined for each exemplar feature vector is stored. As described above, in some embodiments, a set of files is stored to a data store such as Google Storage. For example, for a given exemplar, two files are stored, as described above. The first file may include the tile identifiers of the tiles determined to be visually closest to the exemplar. The second file may include the corresponding feature vectors of the tiles in the first file.

Performing a Nearest Neighbor Search using Exemplars

In some embodiments, the exemplars and previously determined nearest neighbors are used, at query time, to perform an efficient nearest neighbor search (e.g., to determine image tiles that are visually similar to a query image tile) as follows.

Suppose that a user is viewing a map rendered in a browser user interface. The user clicks on a position/location of the map of interest. The user would like to see other portions of the map that are visually similar to the clicked on location. As described above, in some embodiments, the lat/long pair corresponding to the location of the click is identified (e.g., using a script implemented in JavaScript). In some embodiments, a portion (e.g., element) of the grid (e.g., as described above) that encompasses the clicked on lat/long is identified. In some embodiments, the identifier of the tile corresponding to the identified grid element is obtained. In some embodiments, the identified tile is a query tile for which visually similar tiles are to be searched for/returned.

In some embodiments, a data store such as key value data store 212 is accessed to determine the feature vector (e.g., previously determined, as described above) that corresponds to the query tile (e.g., identified by its corresponding unique identifier).

In some embodiments, a search (e.g., a brute force search) is performed over the 100K exemplar feature vectors to identify which of the exemplar feature vectors are closest (e.g., by hamming distance) to the query feature vector (e.g., to determine which of the exemplar tiles are most visually similar to the query tile). The search is performed, for example, by comparing the query feature vector against each of the exemplar feature vectors. In some embodiments, the closest exemplar feature vector (and corresponding exemplar tile ID) is identified. In other embodiments, a subset of the exemplar vectors, such as the top N (e.g., top 1000) exemplar feature vectors (and corresponding exemplar tile IDs) are identified and obtained.

For each of the returned/identified exemplar(s) that are determined to have been visually similar to the query tile (based on feature vector comparison, as described above), the list of tiles (e.g., 30K tiles) previously determined to have been visually similar to a given exemplar tile is obtained. This results, for example, in a candidate list of tile identifiers. In some embodiments, for each candidate tile identifier, the corresponding feature vector generated for a given candidate tile identifier is obtained. In some embodiments, the identification of the closest exemplars uniquely determined what pairs of files (such as those described above when generating exemplars) are to be obtained, such that an interim lookup does not need to be performed.

Thus, for example, if the top 1000 exemplars that are the most visually similar to the query tile are obtained (e.g., based on a brute force comparison of the query tile to the exemplar tiles), and each exemplar is associated with a corresponding list of 30,000 neighbor tiles, the candidate list, in this example, will include 30 million feature vectors. In some embodiments, an aggregation (e.g., union) of the different candidate lists of tiles obtained for each of the identified exemplars is performed to generate a single, larger set of candidate tiles over which a visual neighbor search is to be performed.

In this example, a search of the 30 million candidate feature vectors for those tiles that are visually similar to the query tile is performed. As the candidate list of feature vectors over which comparisons are to be performed is reduced (e.g., rather than, for example, searching over all two billion tiles that are available in the corpus), the search for visually similar searches is more efficient.

A filtered/sorted set of results from the candidate list may then be returned as output, as described herein. For example, the candidate list of feature vectors is searched over to identify, from the obtained list, the subset of tiles that are closest to the query tile (e.g., based on hamming distance).

Thus, as described in the above example, prior to querying, exemplars are established, which include different points in the N-dimensional space used to define the visual features of image tiles. As described above, in some embodiments, a subset of exemplars determined to be similar to a query tile is obtained. For each exemplar in the subset of exemplars, a previously determined list of tiles determined to be visually similar to a given exemplar is obtained in some embodiments. The lists of tiles corresponding to the exemplars may be aggregated together (e.g., unioned) to obtain a candidate list of tiles to be searched over. In some embodiments, the query tile is then compared against the candidate list of tiles to determine what tiles in the candidate list are the most visually similar. In some embodiments, the size of the candidate list is adjustable (e.g., by adjusting the number of neighboring tiles of an exemplar that are stored).

Figure 4E:
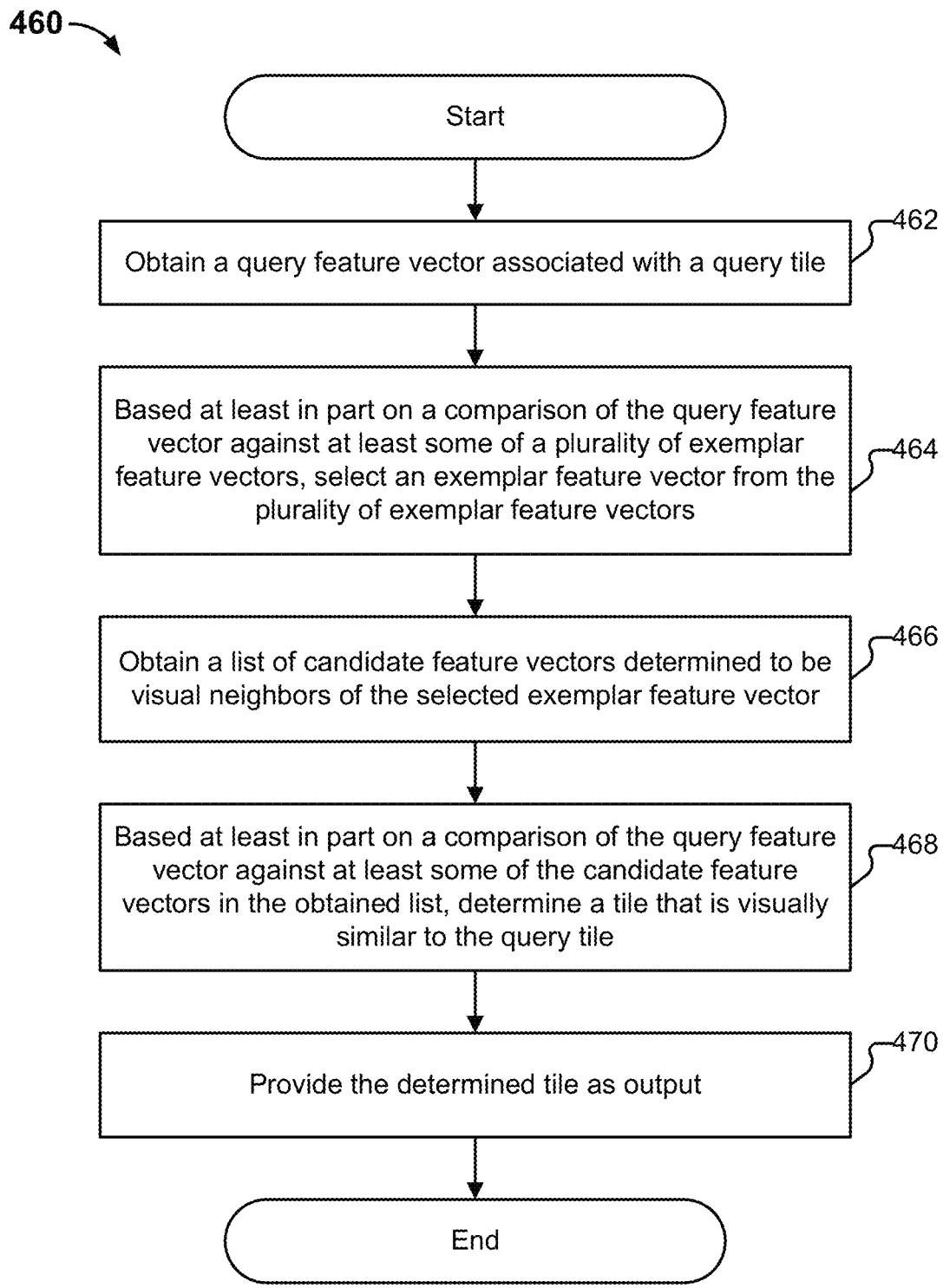
FIG. 4E is a flow diagram illustrating an example embodiment of a process for performing an exemplar-based nearest neighbor search.

FIG. 4E is a flow diagram illustrating an example embodiment of a process for performing an exemplar-based nearest neighbor search. In some embodiments, process 460 is executed by geo-visual search platform 500 of FIG. 5. The process begins at 462 when a query feature vector associated with a query tile is obtained. For example, as described in process steps 482-484 in conjunction with process 480 of FIG. 4F (described in further detail below), a user may click on a location (represented by a corresponding set of lat/long coordinates) in a rendered map. The tile corresponding to the user selected location (e.g., query tile) is determined (e.g., by determining a grid element including the clicked on location and obtaining an identifier of the tile corresponding to the grid element). A feature vector (e.g., query feature vector) corresponding to the query tile is obtained. In some embodiments, the feature vector is a binary code representing the visual features/information in the query tile, as described above.

At 464, based at least in part on a comparison of the query feature vector against at least some of a plurality of exemplar feature vectors, an exemplar feature vector is selected from the plurality of exemplar feature vectors. In some embodiments, a set of exemplar feature vectors (e.g., multiple exemplar feature vectors) is obtained. In some embodiments, the set of candidate exemplar feature vectors was previously determined using process 450 of FIG. 4D. In one example, a comparison (e.g., brute force comparison) of the query feature vector against the set of exemplar feature vectors is performed. In some embodiments, the comparison includes determining, for each exemplar feature vector, the distance (e.g., hamming distance) between a given exemplar feature vector and the query feature vector. Based on the comparison, the top N exemplar feature vectors (e.g., the N exemplar feature vectors that have the shortest distance to the query feature vector) are obtained/selected from the set of candidate exemplar feature vectors.

At 466, a list of candidate feature vectors determined to be visual neighbors of the selected exemplar feature vector is obtained. For example, for each of the top N identified exemplar feature vectors, a list of the closest neighbors to a given identified/selected exemplar feature vector (e.g., previously determined using process 450 of FIG. 4D) is obtained. For example, if the 30K closest neighbors for an exemplar feature vector were previously determined, a candidate list of N*30K feature vectors is obtained. In one example embodiment, for the top N exemplars, the exemplar files stored in a data store such as Google Storage, as described above, are obtained. For each of the top N exemplars, the tile identifiers for the 30K previously determined closest neighbors of the exemplar are obtained. The feature vectors for the tile identifiers may be obtained and aggregated into a candidate list of feature vectors (e.g., where the aggregate list of candidate feature vectors is the union of the lists of feature vectors corresponding to each of the selected nearest exemplar feature vectors).

At 468, based at least in part on a comparison of the query feature vector against at least some of the candidate feature vectors in the obtained list, a tile that is visually similar to the query tile is determined. In one example embodiment, a comparison (e.g., brute force comparison) of the query feature vector against the N*30K candidate list of feature vectors is performed. In some embodiments, the comparison includes determining a distance (e.g., hamming distance) between the query feature vector and each of the candidate feature vectors. In one example, the top M candidate feature vectors in the N*30K list are obtained (e.g., top M feature vectors that are the closest neighbors to the query feature vector based, for example, on shortest hamming distance). In some embodiments, the tile identifiers corresponding to the closest top M feature vectors are obtained.

At 470, the determined tile is provided as output. For example, the identified M tile identifiers are returned as output (e.g., displayed in a map, as thumbnails, etc., as described herein). Further details regarding outputting results of the search are described below.

Figure 4F:
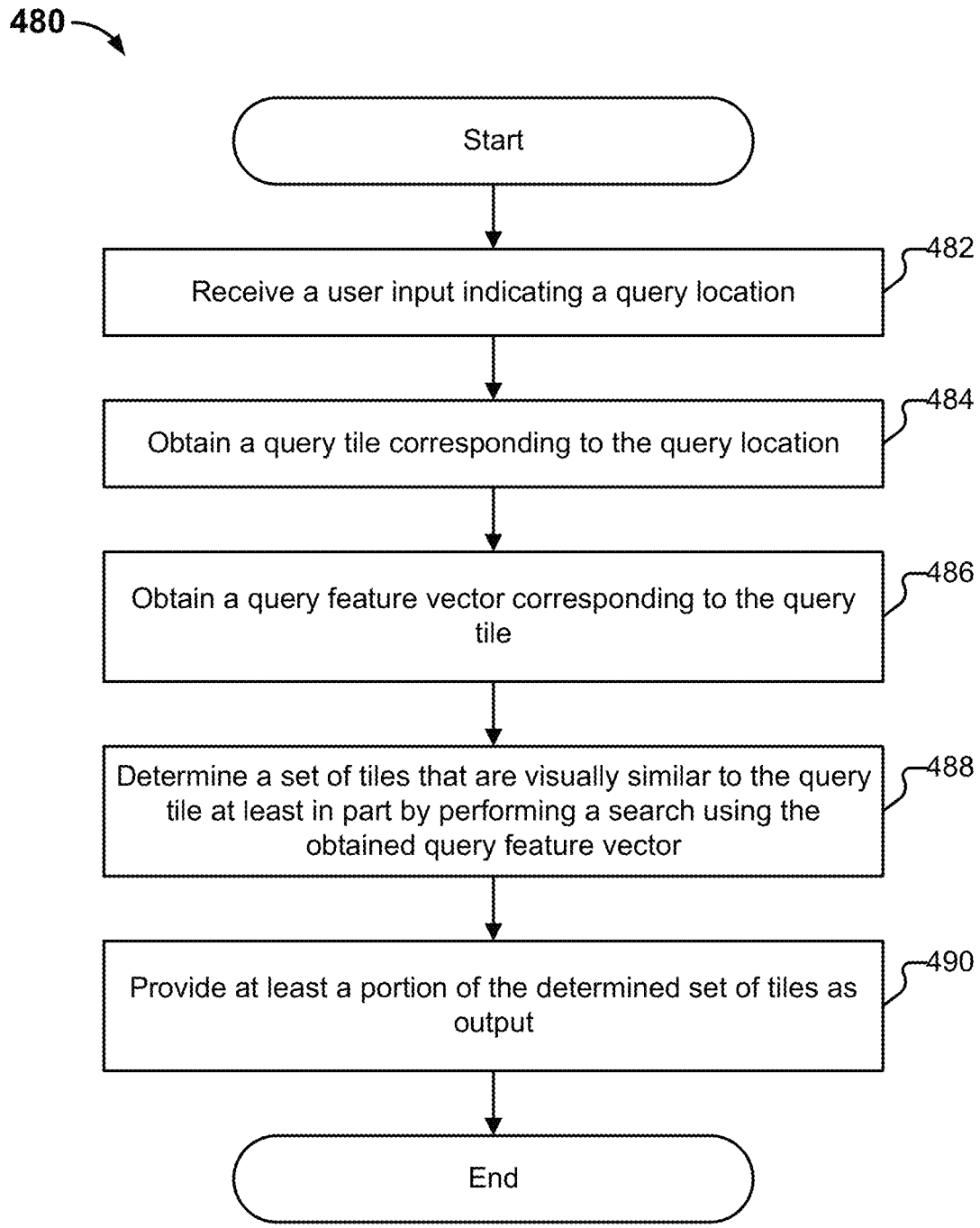
FIG. 4F is a flow diagram illustrating an example embodiment of a process for performing a geo-visual search.

FIG. 4F is a flow diagram illustrating an example embodiment of a process for performing a geo-visual search. In some embodiments, process 480 is an example embodiment of the process described in FIG. 4A. In some embodiments, process 480 is executed by geo-visual search platform 500 of FIG. 5. The process begins at 482 when a user input indicating a query location is received. For example, a map (e.g., of the surface of the portion of the Earth) is rendered in a user interface (e.g., a browser user interface). In some embodiments, the map is generated from aerial imagery collected from various sources (e.g., weather stations, satellites, airplanes, etc.). In some embodiments, the surface that is rendered in the map is covered by a set of tiles that are generated according to the grid/tile definitions described above (e.g., in conjunction with FIGS. 2A and 2B). As one example, suppose that via the user interface, the user selects a location (also referred to herein as a "query location") on the map. In some embodiments, when the user clicks on a location on the rendered map, a query/search is triggered for other locations that are visually similar to the location that the user clicked on.

At 484, a query tile corresponding to the user selected query location is obtained. In some embodiments, an underlying grid element (e.g., generated according to a grid definition, as described above) encompassing the user selected query location is determined. In some embodiments, the tile image corresponding to the identified underlying grid element is obtained. For example, the (center) position (coordinates) of the grid element is determined. A tile with the same corresponding position is identified. In some embodiments, the location of the click corresponds to a particular latitude and longitude coordinates (which may be identified, for example, using code such as JavaScript code). The location/position of the click uniquely determines or identifies an underlying grid element (e.g., if the user clicks anywhere in a region encompassed by a grid element, then the grid element is activated or selected). The identifier for the image tile corresponding to the determined grid element is then obtained. In some embodiments, a unique identifier (e.g., key) for the tile image corresponding to the location clicked on by the user is obtained (referred to herein as a "query tile image").

At 486, a query feature vector corresponding to the query tile is obtained. For example, the identifier for the query tile is used to access a key value data store (e.g., an in-memory database such as a Redis database), in which the identifier for the query tile is used as a key, and where the corresponding value is the feature vector (e.g., binary code) generated for the tile (e.g., using the process described above in conjunction with FIGS. 2A and 2C). In some embodiments, the query feature vector is a binarized visual feature vector (e.g., binary code) representing the visual information in the query tile image. Each bit in the feature vector may correspond to a type of visual feature, and the value of the bit may indicate whether or not the corresponding type of feature (e.g., roundness, square-ness, circle-ness, etc.) is present in a tile.

At 488, a set of tiles that are visually similar to the query tile is determined at least in part by performing a search using the obtained query feature vector. This may include searching a corpus (or a portion) of the tiles such as those generated in FIGS. 2A and 2C, as described above (e.g., represented by corresponding generated feature vectors). In some embodiments, the visual similarity of a candidate tile to the query tile is determined based on a distance (e.g., hamming or Euclidean distance) between the feature vector of the candidate tile and the feature vector of the query tile (e.g., finding the tiles whose feature vectors are "neighbors" or in the local neighborhood of the query feature vector). The determination of visual similarity between two tiles may be determined based on a comparison of their feature vectors (e.g., the shorter the hamming distance between the feature vectors of the two tiles, the more visually similar the two tiles are determined to be).

The search for finding nearest neighbors among a corpus of tiles represented by feature vectors may be performed in a variety of ways in various embodiments. One example of performing a search is performing a brute force nearest neighbor search, as described above. Another example of performing a search is performing a hash-based nearest neighbor search, as described above (e.g., using process 440 of FIG. 4C). Another example of performing a search is performing an exemplar-based nearest neighbor search, as described above (e.g., using process 460 of FIG. 4E). In some embodiments, tree-based searches may also be performed.

At 490, at least a portion of the tiles determined to be visual neighbors to the query tile is provided as output. For example, thumbnails for the top N number of nearest neighbor tiles (e.g., most visually similar to the query tile) are shown in the user interface. As another example, pins at the locations of the M number of nearest visual neighbor tiles (e.g., subset of the top N ranked nearest neighbor tiles) are rendered on the map in the user interface (e.g., pins are placed at the center latitude and longitude coordinates of the tiles).

As one example of the output provided at 490, suppose that a user is viewing a map in a browser window, such as viewing an area at the Texas/Oklahoma border. The user clicks on a point/location/position on the map that includes a wind turbine. After the user clicks on the point, the geo-visual search described herein is performed to determine other locations (e.g., on the surface of the Earth) that are visually similar to the location clicked on by the user. Suppose that the top 1,000 image tiles that are visually closest to the image tile that the user clicked on are returned. Thumbnails of the top 10 nearest neighbor images may be displayed. As another example, the geolocations of the 1,000 images may be displayed on the map in the browser interface. For example, as the user zooms out of the map, pins are dropped on the map at the location of each tile in the returned visual neighbor results. In this example, this may result in the visualization of clusters of wind turbines on a map. Thus, using the techniques described herein, a user may click anywhere on a map, and other locations that are visually similar may be returned as results (e.g., after clicking on some portion of the map, other portions of the map that include the same or similar visual features as what was clicked on will be surfaced and/or visually indicated).

In some embodiments, the UI presents options for a user to provide feedback about the results. Based on the feedback, the results may be re-ranked. In the above example, after the user clicks on a location (image tile) that includes a wind turbine, the processing described herein is performed, and other locations that are visually similar are returned as results. In some embodiments, via the user interface, the user may provide an indication of how good (or bad) a result is (e.g., by selecting a thumbs up or thumbs down button for a returned image tile, or selecting "yes" or "no" to indicate whether the tile was good (e.g., visually similar to what the user was searching for)).

In some embodiments, based on the indication of goodness provided by the user feedback (which may be done for a subset of the results), the overall returned set of results may be reordered/rearranged.

For example, suppose that of the 1000 results that are returned, thumbnails for the top 10 of the results are displayed. In this example, suppose that the user indicates, for 8 of those displayed thumbnails, whether they are positive (good results) or negative (bad results). The remaining 992 results may be re-ranked/re-ordered based on how close/far way they are to the user indicated good/bad results (e.g., a remaining result that has a small distance to the good results is moved up the ranking, while a remaining result that has a small distance to the bad results is moved down the ranking).

In one example embodiment, suppose that the user has indicated that 5 of the images are positive. For each of the remaining 992 results that are returned, the average hamming distance between a given remaining result and the 5 positive tiles is determined. The remaining 992 results are then re-ranked/re-organized based on their average hamming distance to the image tiles indicated to be positive (e.g., those remaining results whose average hamming distance to the positive results is small, indicating visual similarity to positive results, are moved up the ranking). Those results that have large distances to the positive results may be moved down the ranking (e.g., because they are determined to be visually dissimilar to results indicated to be good).

In some embodiments, a similar re-ranking process may be performed based on the tiles indicated to be negative. Each remaining tile (e.g., for which feedback was not received) is compared to the group of negative images to determine the average distance between a given remaining tile and the tiles in the group of negative image tile results. Those with a small distance to the negative tiles are pushed down the ranking (e.g., because they are determined to be visually similar to the negative results), while those with a large distance to the negative tiles may be moved up the ranking.

The good/bad results may also be used together when determining whether to reorder a result in the returned set of results. For example, for a given image result to be re-ranked, the average distance of the given result to both the good results and the bad results is determined. Both computed average distances are used to re-order the given result. For example, the difference between the average distance between the given result and the positive results and the average distance between the given result and the negative results are determined and combined (e.g., the average distance of the given result to the negative results is subtracted from the average distance of the given result to the positive results). This difference is determined for each result to be re-ranked. The results are then re-ordered based on the computed differences (e.g., the more positive the difference indicating that the result is further away from good results and closer to the bad results, and should be moved down the ranking, and the more negative the difference indicating that the result is further away from bad results and closer to the good results, and should be moved up the ranking).

In some embodiments, merging of results is performed. This may include deduplication of tile images. For example, if tiles are returned that are geographically nearby to each other (e.g., adjacent and/or overlapping), the tiles may be merged together (e.g., by returning a stitched together version of overlapping tile results that is a larger, merged tile). As another example, for overlapping tiles that are returned, the center most tile in the group may be displayed as the result (while filtering out the other overlapping images).

As described above, in some embodiments, a list of visually similar neighbors to an input query image may be returned using the techniques described herein. In some embodiments, further actionable intelligence may be performed, where, for example, a list of image results that contain an object of interest is returned (e.g., by culling through a list of visually similar image results to find those images that include an object of interest). In some embodiments, object detection may be used to determine what object was in a query image tile in order to return query images that include the same object. As another example, suppose that an image includes a list of cars. In some embodiments, a convolutional neural network may be used to determine bounding boxes around the cars in the image. In some embodiments, if a user clicked on a tile that had a particular object of interest, the user can use the feedback mechanism described above to indicate that results that include the particular object of interest are good, where the remaining results are re-ranked accordingly. In some embodiments, such images where user feedback is provided may be used to perform fine tuning/training of a neural network for object detection.

In some embodiments, the geo-visual search techniques described herein may be used to facilitate various types of analysis. As one example, suppose that a user has an unconventionally-looking/shaped golf course for which they would like to find other similarly looking golf courses. By using the search techniques described herein, other geolocations that are visually similar may be identified. While object detection may not have been previously trained for such golf courses, the results of visually similar locations may be used, for example, as a rough candidate list upon which further analysis (e.g., machine learning) may be performed (e.g., where the search for visually similar images may be used as a pre-filter for further processing).

Visual Time Series

As described in the above example embodiments, raw aerial imagery may be converted into uniform tiles covering a surface, with feature vectors generated for each tile. The tiles may or may not overlap. Thus, in some embodiments, rather than a tile being represented by per-pixel information, the tile is represented by a smaller number of values that represent the visual information/features in the tile. The visual features of a location may change over time. In some embodiments, raw aerial imagery may be obtained over time, such as on a daily basis, where different stripes of imagery covering different surfaces may be obtained each day. The stripes of imagery may be contaminated by clouds. In some embodiments, when performing a geo-visual search as described herein, a search is performed over a cloud-free image of a surface, where the raw imagery is aggregated over many time slices.

As raw imagery of different time slices may be obtained, in some embodiments, such temporal information may be used to determine, for example, changes in visual features of locations. For example, using the feature vectors, a rolling timestream of visual information may be obtained. Using temporal data, users may, for example, look for changes that they are interested in. These changes may be identified, in some embodiments, by monitoring temporal visual information, where an ongoing timestream of extracted visual features is spatially pinned down (e.g., for a particular location/coordinates, the visual features of the particular location may be maintained/monitored over time). Thus, changes over time (e.g., at a location, as determined by changes to visual features) may be determined. For example, using available time slices of imagery and the feature vectors described herein, a user may view, for a particular region on the surface of the Earth, the difference in the number of windmills between the current time and sometime in the past.

In the above examples, the tiles over a surface such as that of the Earth were indexed by visual similarity. In other embodiments, the tiles/image data may be searched over other types of constraints, such as spatial and/or temporal constraints. This may be performed, for example, by indexing image data using other types of constraints (e.g., spatial/temporal), allowing a user to, for example, constrain a search to a particular portion of the world, particular times of the day (e.g., at night), etc.

Figure 5:
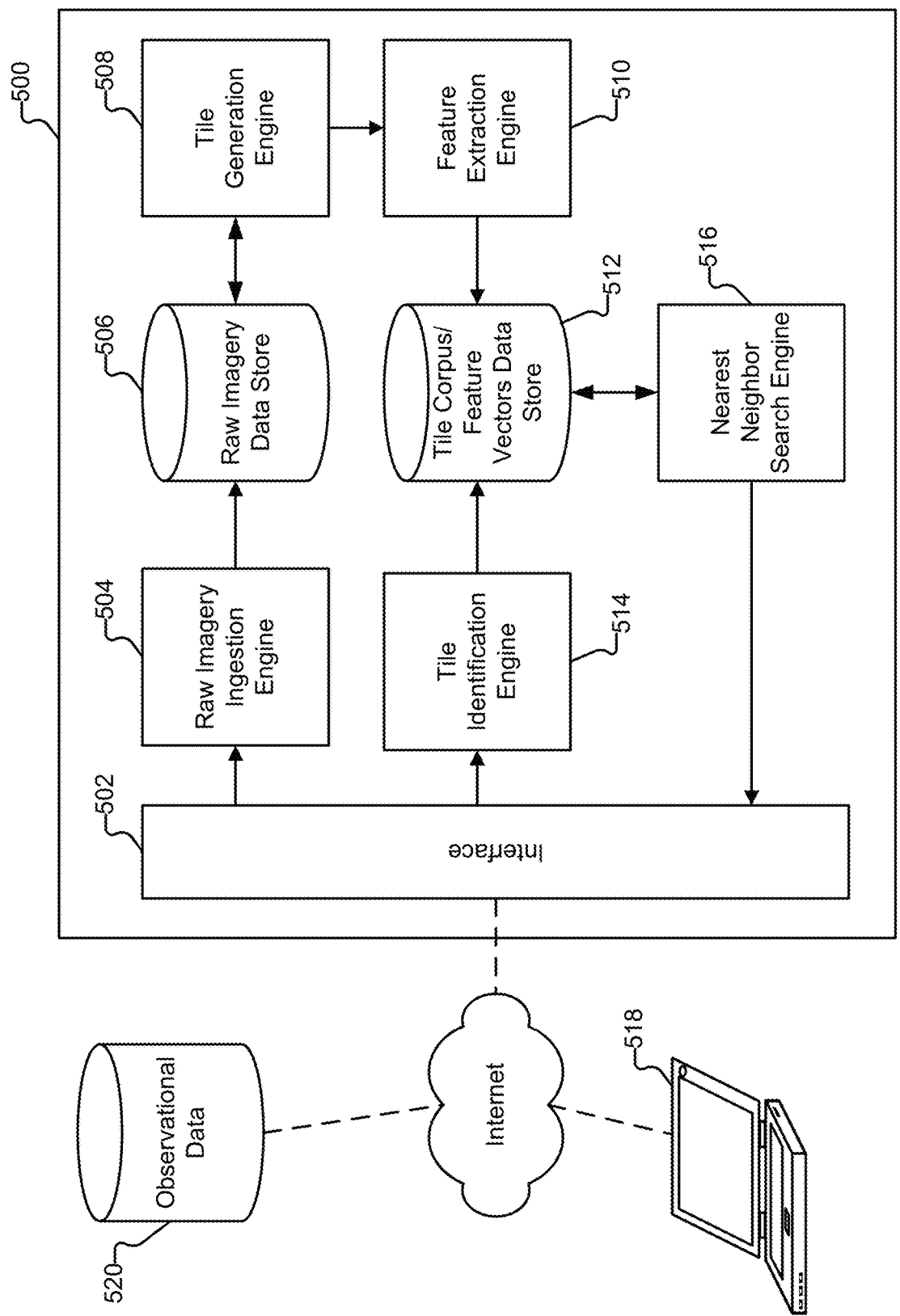
FIG. 5 illustrates an example embodiment of a system for performing a geo-visual search.

FIG. 5 illustrates an example embodiment of a system for performing a geo-visual search in accordance with techniques described herein. In this example, geo-visual search platform 500 is configured to receive, via interface 502, observational data (e.g., aerial imagery/sensor data collected from sources such as weather stations, satellites, planes, etc., as described in conjunction with FIG. 1) over a network such as the Internet from various sources of observational data 520. The observational data (e.g., raw aerial imagery) is processed by raw imagery ingestion engine 504. In some embodiments, raw imagery ingestion engine 504 is configured to perform processing such as that described in conjunction with FIG. 1. The raw imagery is stored in a raw imagery data store 506 (e.g., data store 120 of FIG. 1).

Tile generation engine 508 is configured to generate tiles. Feature extraction engine 510 is configured to perform feature extraction on a generated tile, such as by generating feature vectors using a neural network, as described in various embodiments herein. In this example, the tiles (identified by unique tile identifiers) and corresponding feature vectors are stored to data store 512 (in some embodiments, an example of data store 512 is key value store 212 of FIG. 2A). Examples of the processing performed by tile generation engine 508 and feature extraction engine 510 are described in conjunction with FIGS. 2A and 2C.

In some embodiments, tile identification engine 514 is configured to determine, for an input set of coordinates (e.g., latitude/longitude), a corresponding tile identifier (e.g., from data store 512). As described above, the input set of coordinates may be obtained based on a determination of the coordinates clicked on by a user via a map rendered via a browser interface (e.g., when a user interacts with a UI rendered on laptop 518, a desktop, a mobile device, or any other device as appropriate). Nearest neighbor search engine 516, in some embodiments, is configured to perform a search of nearest visual neighbors to a queried-for tile based on a determination of visual similarity. As described herein, the determination of visual similarity may be based on a comparison of feature vectors (e.g., binarized to binary codes), where the shorter the distance between two feature vectors, the closer they are in visual similarity. Examples of the processing performed by nearest neighbor search engine 516 include, as described above, brute force searches for visual nearest neighbors, hash-based searches for visual nearest neighbors, and exemplar searches for visual nearest neighbors. An example of the processing performed by tile identification engine 514 and nearest neighbor search engine 516 includes the processing described in conjunction with FIGS. 4A-4F. Pre-processing (e.g., generation of a hash-based index (e.g., using process 430 of FIG. 4B), definition/generation of exemplars (e.g., using process 450 of FIG. 4D), etc.), as described in various embodiments herein, may also be performed by nearest neighbor search engine 516. In some embodiments, the results of the search performed by nearest neighbor search engine 516 are provided as output via interface 502 (e.g., to be displayed/rendered on a user interface, as described in various embodiments herein). In some embodiments, platform 500 is implemented using a cloud platform such as Amazon AWS, Google Cloud Platform (GCP), etc.

Additional Details Regarding Geo-Visual Search

In some embodiments, given the confluence of i) festivus-powered base maps (NAIP, custom Landsat composites, etc.) and ii) access to Google's Cloud ML service, computer vision experiments may be run, such as those that are deep learning-based, on imagery (e.g., observational data such as aerial imagery obtained from sources such as satellites and airplanes of a surface such as the surface of the Earth).

In various embodiments, various directions may be pursued. One example of a CV task is the extraction of high-level visual features. As a first example step, in some embodiments, high-level features are generated over a "large" area, for example, by passing imagery through a pre-trained net, followed by, in some embodiments, visualization of nearest neighbors.

Example Satellite-Imagery-Specific Features

In some embodiments, features may be generated using a pre-trained net. Examples of nets that may be used include those associated with ImageNet, which include, for example, Inception in TensorFlow (an example implementation of which may be found at https://github.com/tensorflow/models/tree/master/inception) and ResNet in TensorFlow (an example implementation of which may be found at https://github.com/ry/tensorflow-resnet). In some embodiments, these nets were trained on "normal" imagery, not satellite imagery, and may or may not provide good representations of satellite imagery. In some embodiments, to improve the features, a satellite image-specific net is obtained, which, in some embodiments, may be obtained through unsupervised or supervised learning.

Example Unsupervised Learning

In some embodiments, unsupervised learning may include the use of generative models. In some embodiments, unsupervised learning includes learning how to go from a random, low-dimensional vector to an image that looks like it came from a main corpus. In some embodiments, while performing unsupervised learning, a representation of the data distribution may be learned, and useful features may be generated. In some embodiments, a system is built that is able to generate artificial satellite imagery. In some embodiments, such a system may be used to generate very good features.

One example of a net is the "Deep Convolutional Generative Adversarial Networks" (DCGAN) in TensorFlow, an example implementation of which may be found at https://github.com/carpedm20/DCGAN-tensorflow.

Example Supervised Learning on Open Street Maps

In some embodiments, OpenStreetMap is a large (vector) geospatial dataset, which may be used, in some embodiments, as a training dataset for a satellite-imagery-specific net. In some embodiments, OSM includes various classes. While OSM may be noisy and may not be complete, OSM may be used to train a net that is capable of generating features for satellite imagery.

Figure 6:
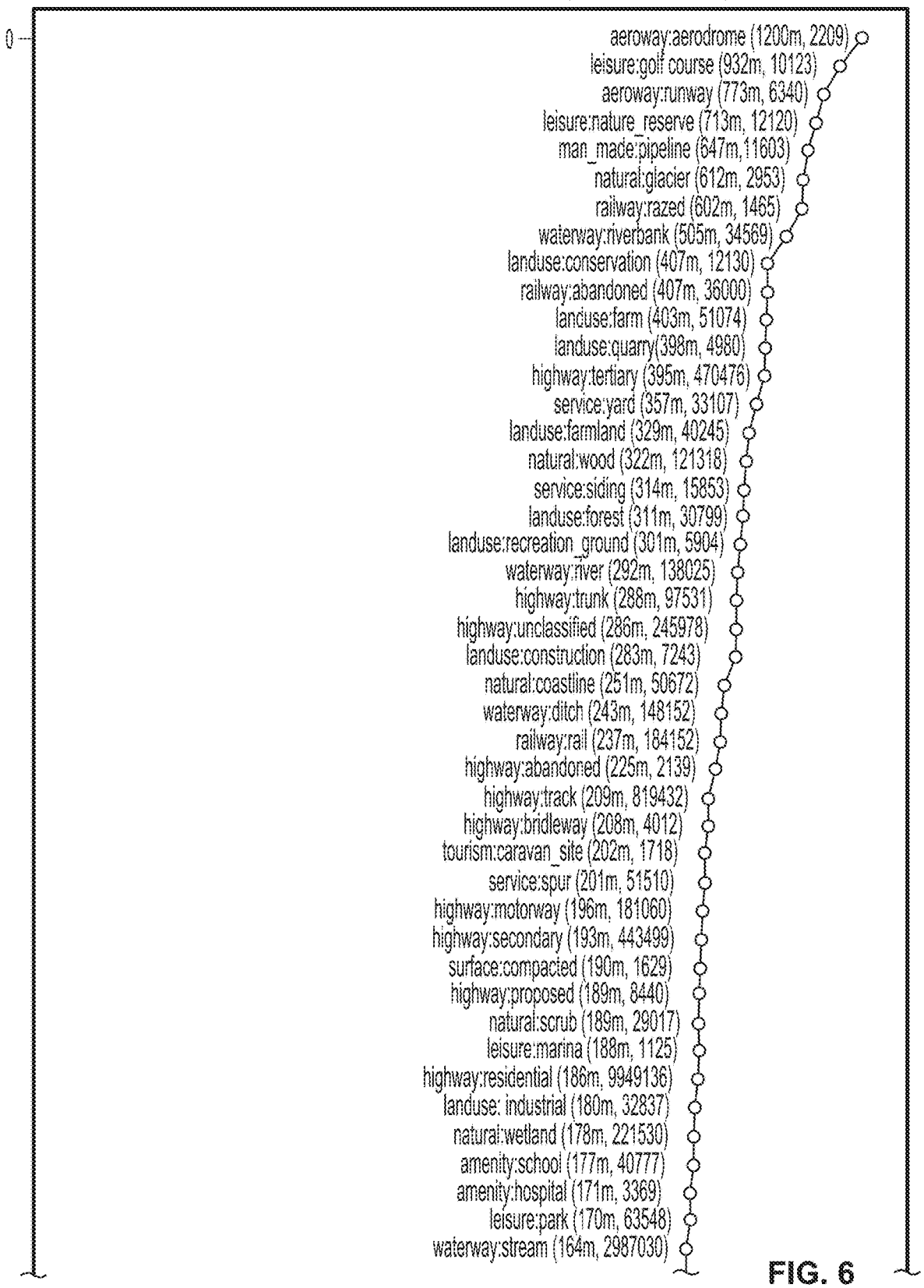
FIG. 6 illustrates an example embodiment of object classes.
Figure 6:
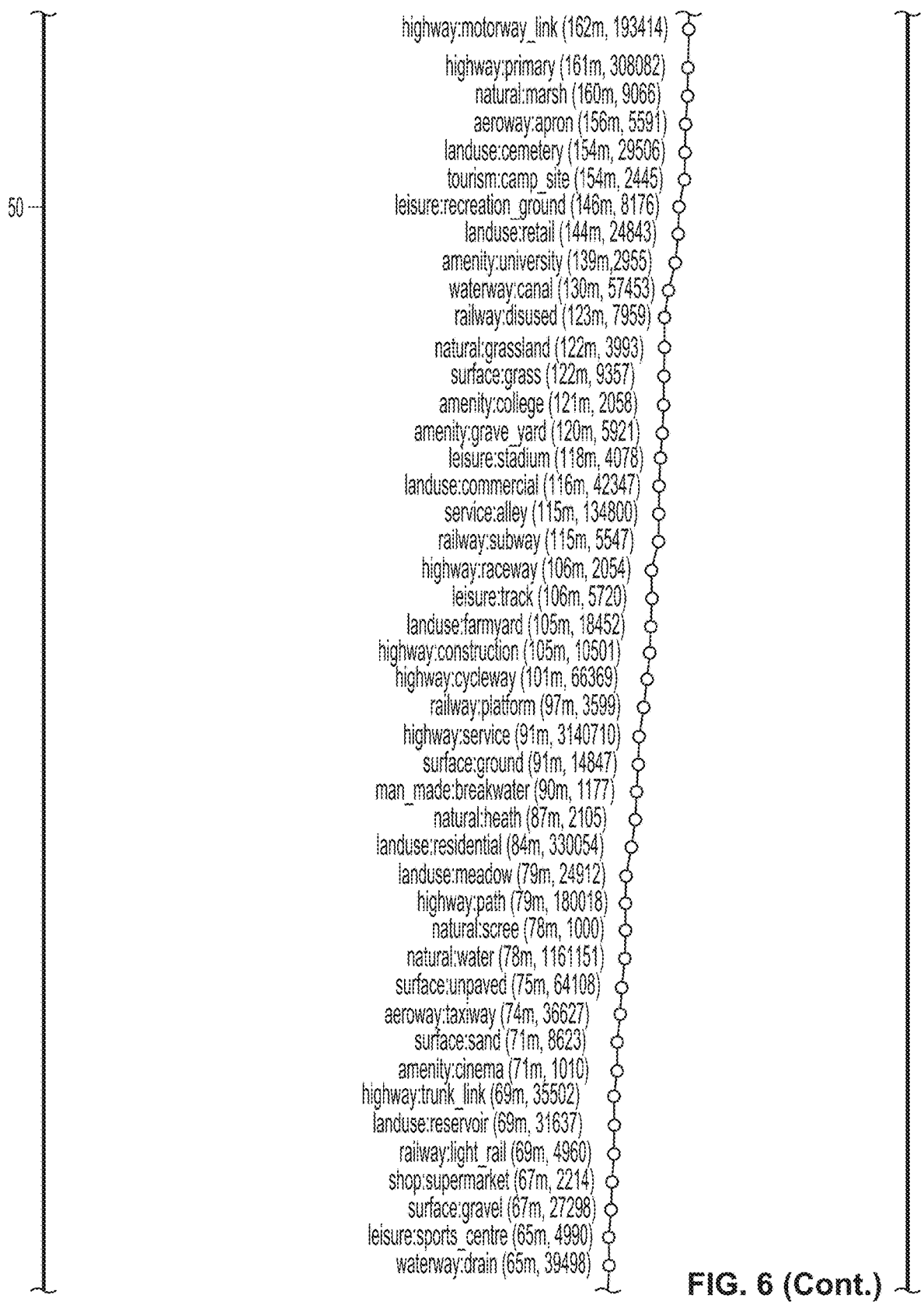
Figure 6:
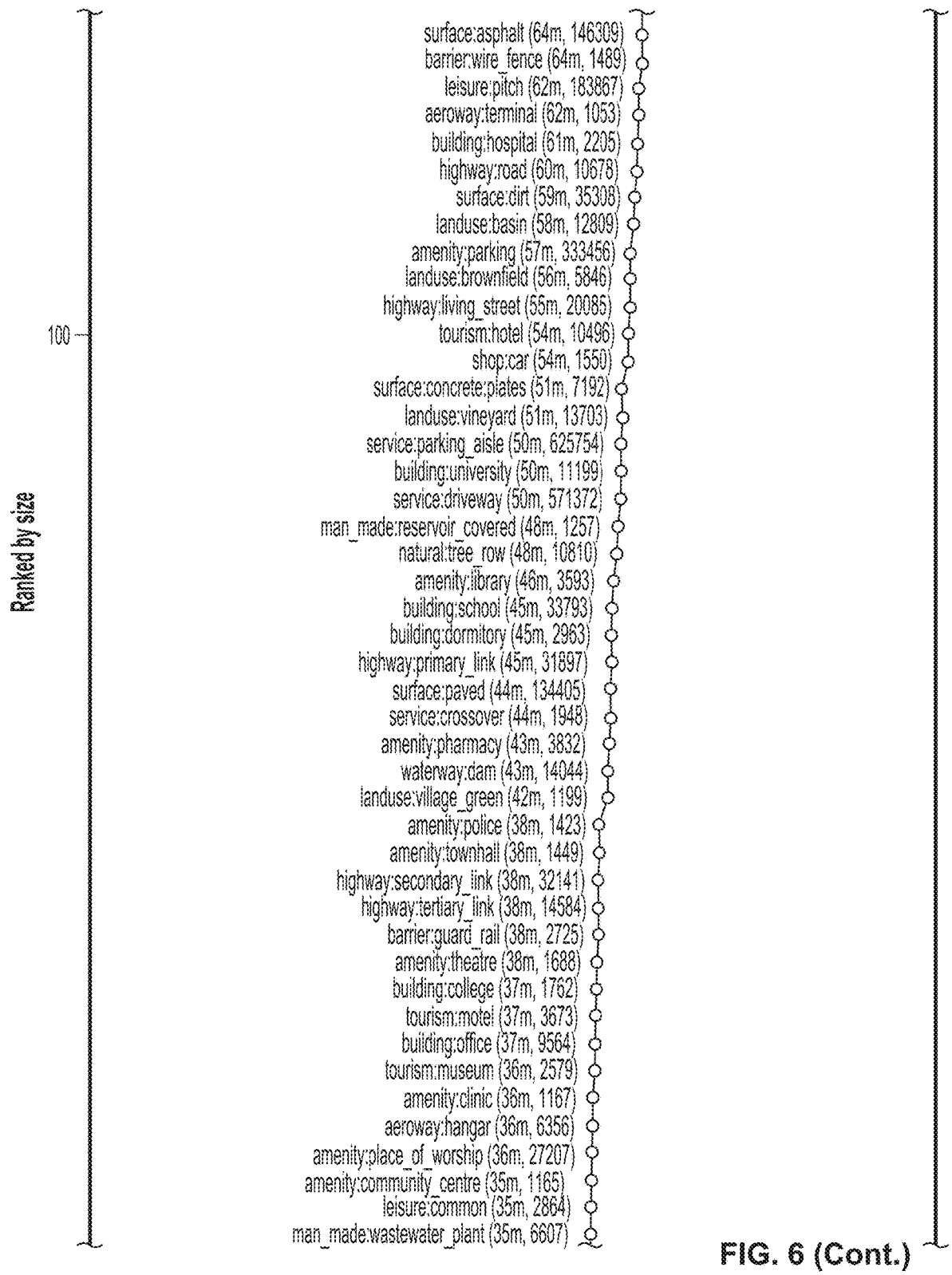
Figure 6:
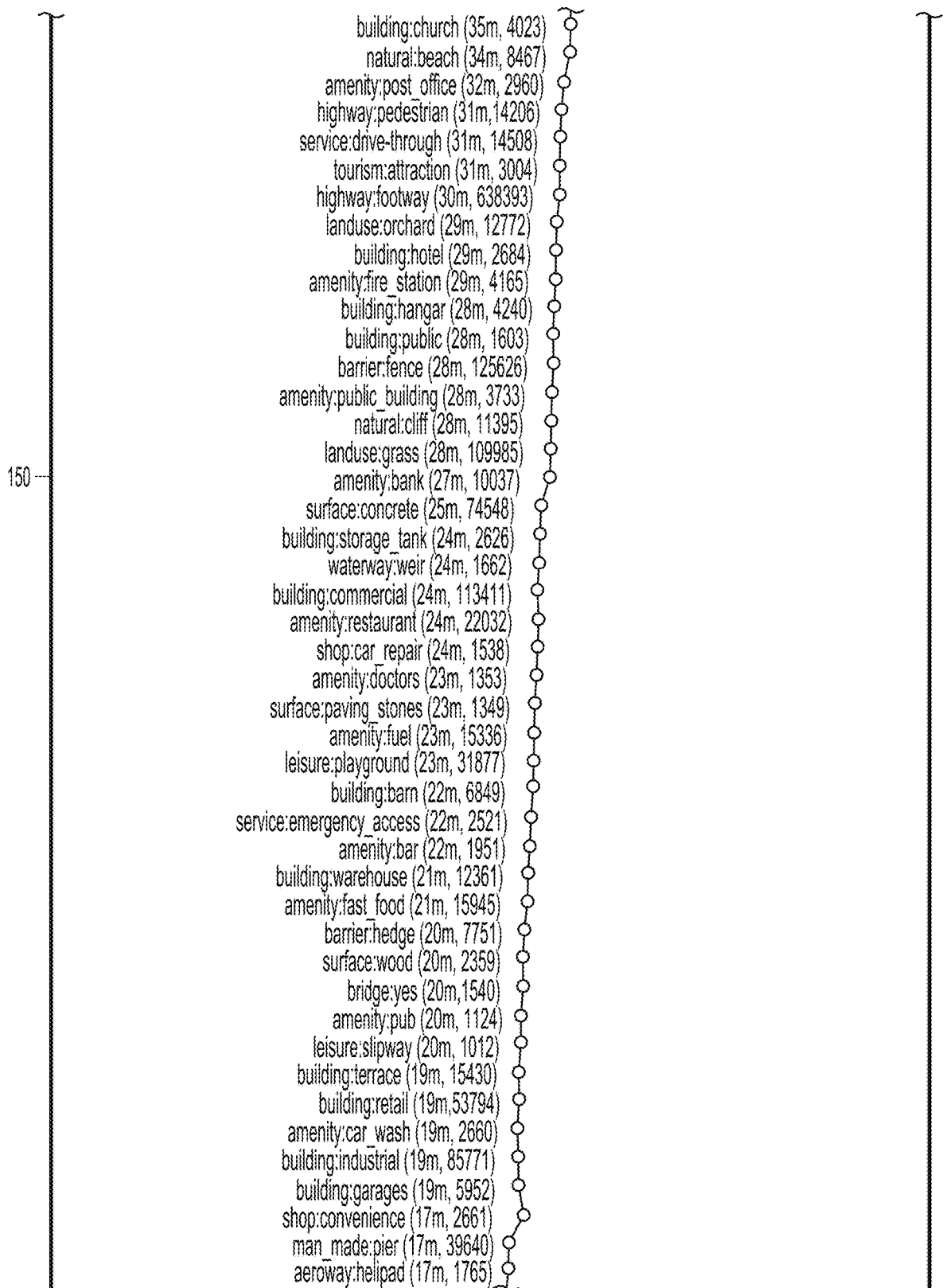
Figure 6:
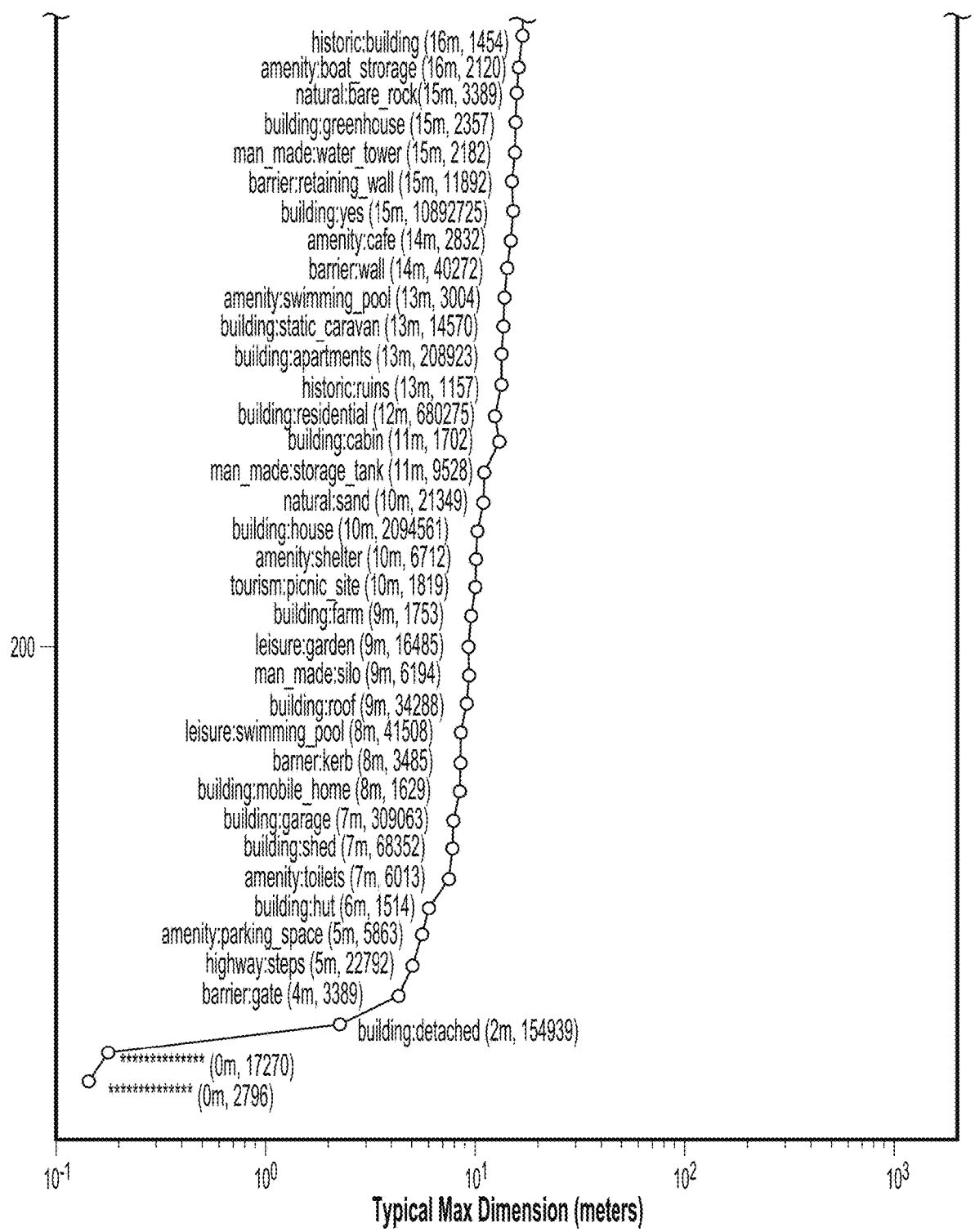

FIG. 6 illustrates an example embodiment of object classes from OSM. In this example, the object classes are shown ranked by their typical size. In some embodiments, the ranking of the object classes may be used as a guide to determine which OSM object classes may be resolved (and be trained on) with different spatial resolutions (e.g., using a Python script including code for determining the sizes of objects in Open Street Map). In some embodiments, the script uses all "ways" in, for example, August 2016 USA OSM.

Example Fast Search Over Binary Codes

As one example, a net is used to go from an image (e.g., 256×256×3 8-bit numbers) to a feature vector (e.g., 2048 32-bit floats). In some embodiments, this may be taken one step further by reducing the image to a short binary code (e.g., 64 bits). In some embodiments, comparing 64-bit codes (hashes) allows for much faster nearest-neighbor searches than comparing large feature vectors. In some embodiments, exact nearest-neighbor searches (e.g., brute force search, as described above) on short binary codes are feasible with a simple linear scan (e.g., Hamming distance), and approximate nearest neighbor techniques (e.g., hash-based and exemplar-based nearest neighbor searches, as described above) may be even faster.

In various embodiments, these "visually-similar hashes" may be generated either by:
  generating features, then compressing them to 64 bits using an autoencoder (e.g., features→hidden layer-→lossy features). In some embodiments, semantic hashing is performed.
  In some embodiments, the binary codes may be incorporated into the original net.

Example Determination of Software Packages and Clouds

Examples of open-source deep learning packages include Tensorflow, Caffe, Torch, and Theano. In one example embodiment, the use of TensorFlow (TF) allows for the potential use of the Google Cloud ML service, which, in some embodiments, runs exclusively on TF models.

In some embodiments, different clouds, such as GCP and AWS, may be used. The following are three example options.

1. CPUs on GCP. In some embodiments, the models may run slower on a CPU than a GPU, but access to a large number of CPUs may be obtained. In some embodiments, a favorable cost (e.g., measured in currency such as dollars) per result may be obtained.

2. GPUs/TPUs on GCP, via, for example, Cloud ML service. In some embodiments, there may be extra overhead in utilizing Cloud ML.

3. AWS, run TF on GPUs. In some embodiments, if data is stored in GCP, this example option may be used if CPUs are too expensive or there are challenges in using, for example, the Google Cloud ML interface.

Example Number of Images

For illustrative purposes, assuming, in one embodiment, images with 256×256 dimensions, and zero overlap between images, the following example numbers of images shown in Table 1 below may be determined.

TABLE 1

| Region | Dataset | Number of Images |
| --- | --- | --- |
| New Mexico (0.3M km2) | Landsat 15 m | 30k |
| New Mexico (0.3M km2) | NAIP 1 m | 4.6M |
| California (0.4M km2) | NAIP 1 m | 6M |
| CONUS (8M km2) | Landsat 15 m | 0.55M |
| CONUS (8M km2) | Planet 3 m | 13.3M |
| CONUS (8M km2) | NAIP 1 m | 120M |
| Global Land (150M km2) | Landsat 15 m | 10M |
| Global Land (150M km2) | RapidEye 5 m | 90M |
| Global Land (150M km2) | Planet 3 m | 250M |

In another example, assuming images with 128×128 dimensions, and half overlap in each dimension, the number of images, as shown below in the example of Table 2, increases by a factor of 16.

TABLE 2

| Region | Dataset | Number of Images |
|---|---|---|
| New Mexico (0.3M km2) | Landsat 15 m | 0.48M |
| New Mexico (0.3M km2) | NAIP 1 m | 73M |
| California (0.4M km2) | NAIP 1 m | 100M |
| CONUS (8M km2) | Landsat 15 m | 8.8M |
| CONUS (8M km2) | Planet 3 m | 210M |
| CONUS (8M km2) | NAIP 1 m | 1.9B |
| Global Land (150M km2) | Landsat 15 m | 160M |
| Global Land (150M km2) | RapidEye 5 m | 1.4B |
| Global Land (150M km2) | Planet 3 m | 4B |

Example Timing and Cost

GPU

In one example embodiment, consider a specific net, the 50-layer ResNet. In some embodiments, the ResNet architecture is available online in TensorFlow. In some embodiments, the time for a pass forward and backward on a new GPU may be 12 ms/image. An example implementation of a ResNet may be found at http://torch.ch/blog/2016/02/04/resnets.html. Suppose, for example, that on a commodity GPU with non-expert setup, it is 2× worse, and that the time of a forward pass is 40% of forward+backward. Then a forward pass on a GPU would be 10 ms per image per forward pass.

CPU

In some embodiments, TensorFlow may be run with multithreading on various GCP instances. On a 64 vCPU machine, about 50 ms per image per forward pass may be obtained, which may be about 5× worse than a GPU.

Cost Analysis

In the following example cost estimation/analysis, assume that the cost of an hour of a preemptible 64 vCPU is $0.64. Assume, in this example, that the approximate cost of a reserved GPU-hour is $0.65. In this example, the CPU throughput is ~5× slower, meaning that GPU/TPUs are ~5λ more cost effective.

Given the above example costs, the cost to push 1M images through may be calculated, in some embodiments, as follows:

CPU: (1M images)*(50 ms/image)*($0.64/hour)≈$9

GPU: (1M images)*(10 ms/image)*($0.64/hour)≈$2

Given the above example costs, the cost to push a Planet 3 m global land composite through may be calculated, in some embodiments, as follows:

CPU: (250M images)*(50 ms/image)*($0.64/hour) ≈$2200

GPU: (250M images)*(10 ms/image)*($0.64/hour) ≈$440

The above are example costs of a single forward pass on these datasets. In various embodiments, training may be more or less, depending, for example, on what fraction of the dataset training is performed on, and how many backforward passes are made. In some embodiments, larger projects, such as working with a Planet 3 m global land composite, may move the cost needle, but for other projects, the cost may be relatively inexpensive. In some embodiments, while the use of CPUs may be acceptable, the use of services such as Google Cloud ML may be determined based on non-cost reasons such as scalability, ease of use, etc.

In some embodiments, there is also an overhead to loading imagery, which may impact costs. In some embodiments, the overhead may be made negligible relative to the neural net computation time for a CPU-only machine, as well as a GPU machine. In one example embodiment, the CPUs paired with the GPU run ahead and fetch the imagery before passing it to the GPU.

Example Baseline Experiment

The following is an example embodiment of a baseline experiment:

As one example, suppose that the state of New Mexico is divided into ~30 k 256×256 RGB image tiles. In some embodiments, the image tiles are obtained by accessing Landsat 8 imagery. In some embodiments, this imagery may be accessed through mapserver (e.g., via curl).

In some embodiments, features are generated by passing images through, for example, a deep, pre-trained, convolutional net. In one example embodiment, the penultimate layer (2048 outputs) of ResNet50 is used.

In one example embodiment, a keras with a TensorFlow backend is used, running, for example, on a GCP 64 vCPU instance.

In some embodiments, one-off visualization of the results using nearest-neighbor search over features is performed (e.g., using scikit-learn tree). For example, nearest neighbors in that feature space are found for a set of example query images. The results may then be visualized.

Example Results

In each of the example FIGS. 7-14 described below, the top-left image is the query image, and the other eight images are the nearest neighbors in the 2048-dimensional feature space.

Figure 7:
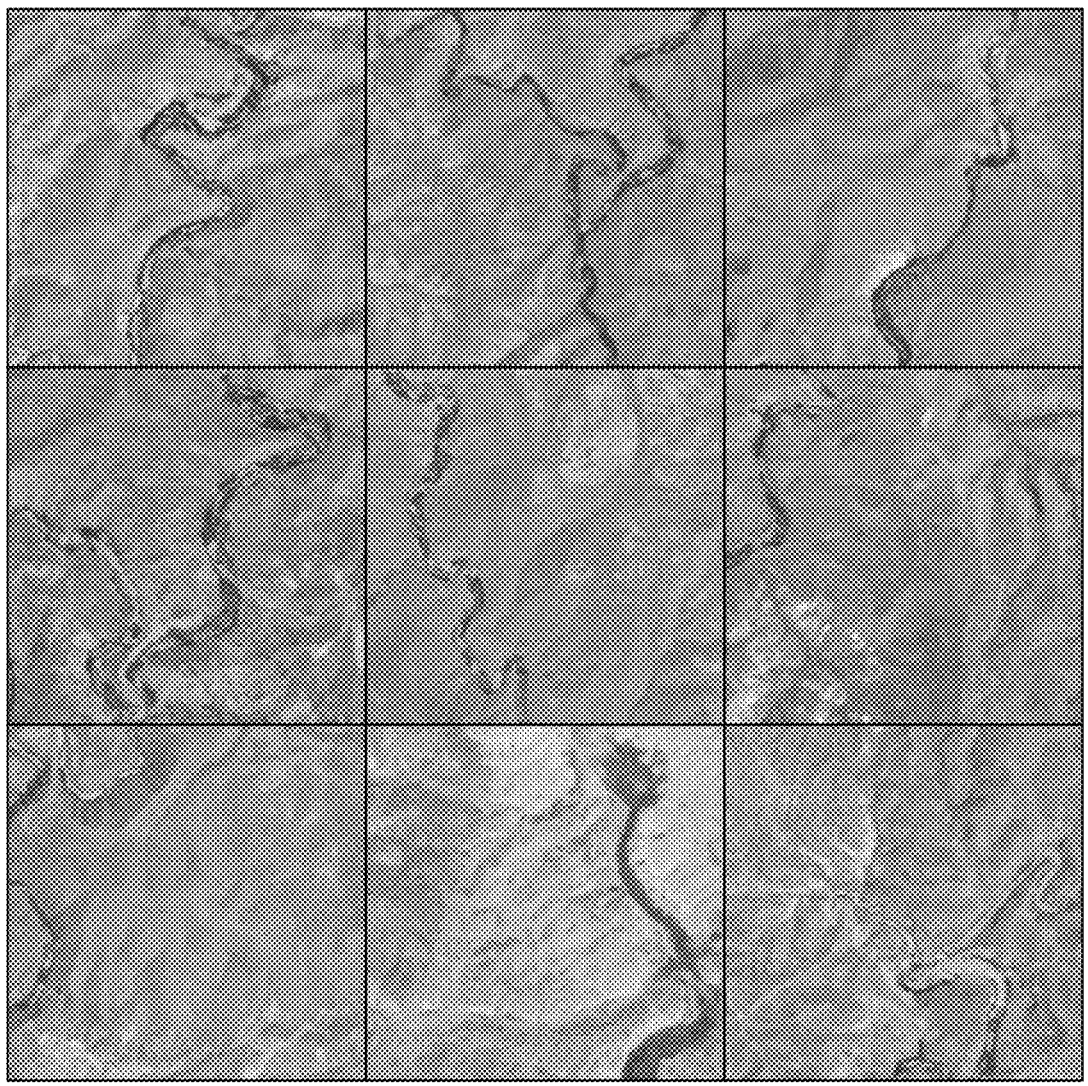
FIG. 7 illustrates an example embodiment of results associated with winding green rivers.

FIG. 7 illustrates an example embodiment of results associated with winding green rivers.

Figure 8:
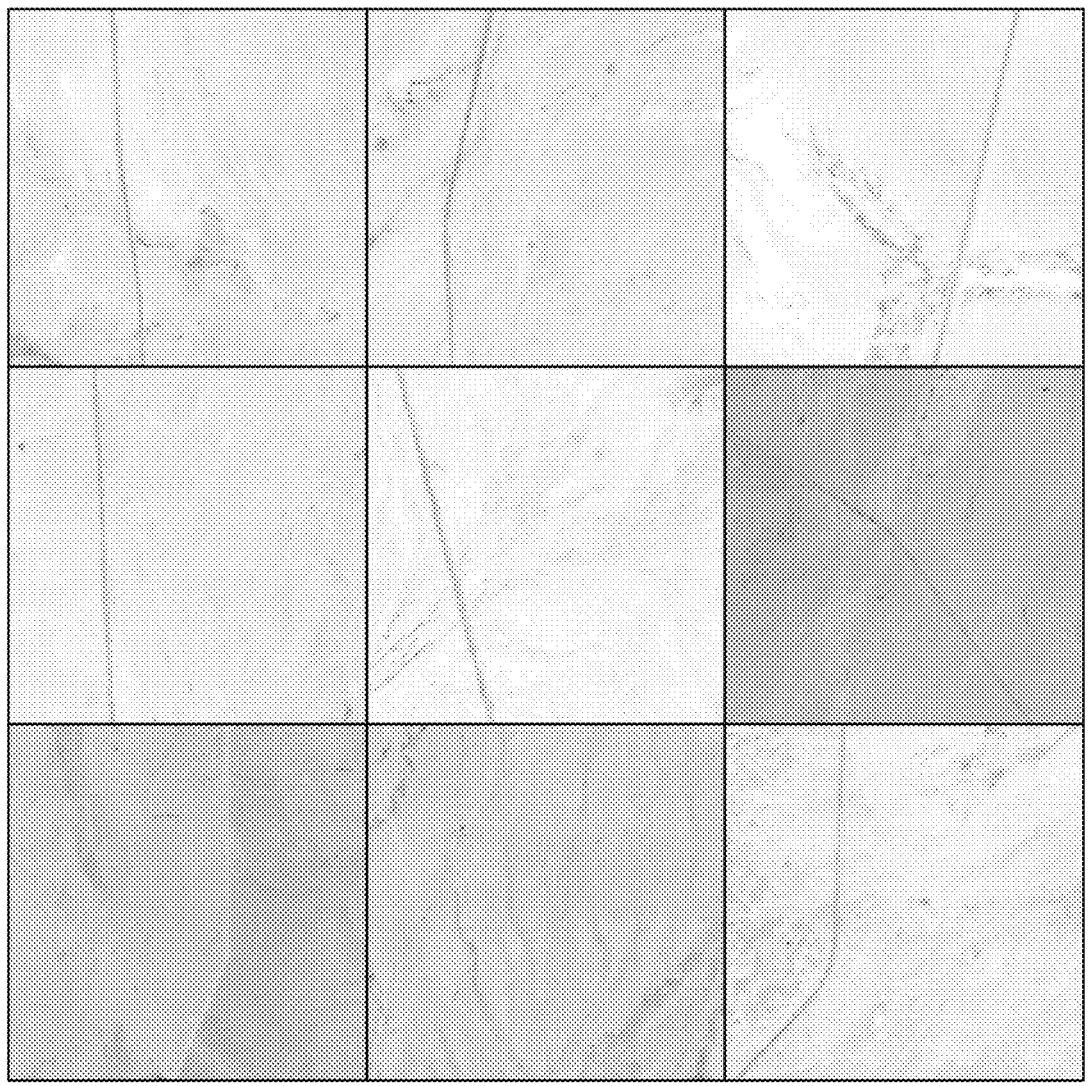
FIG. 8 illustrates an example embodiment of results associated with roads in the deserts.

FIG. 8 illustrates an example embodiment of results associated with roads in the deserts.

Figure 9:
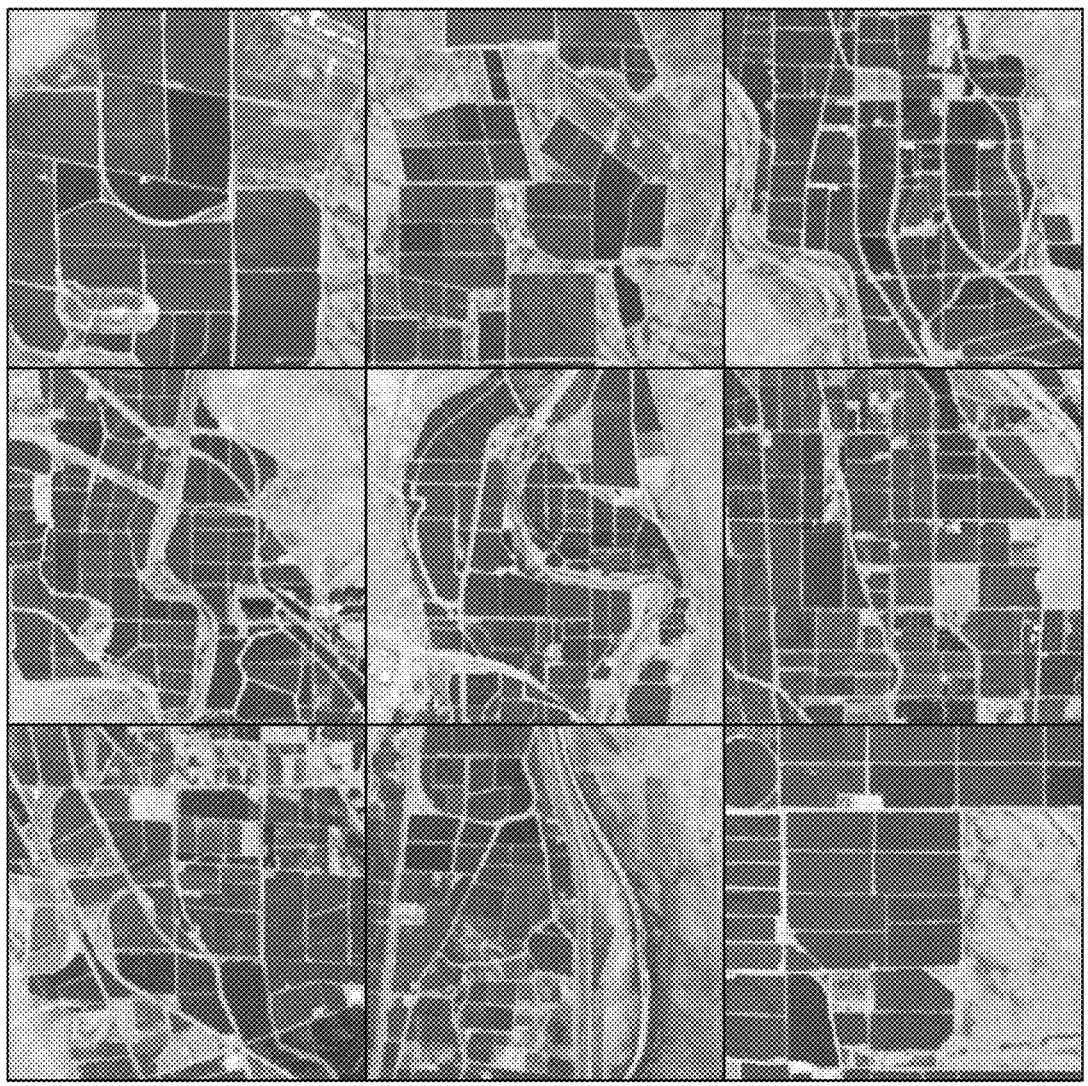
FIG. 9 illustrates an example embodiment of results associated with irrigated fields.

FIG. 9 illustrates an example embodiment of results associated with irrigated fields.

Figure 10:
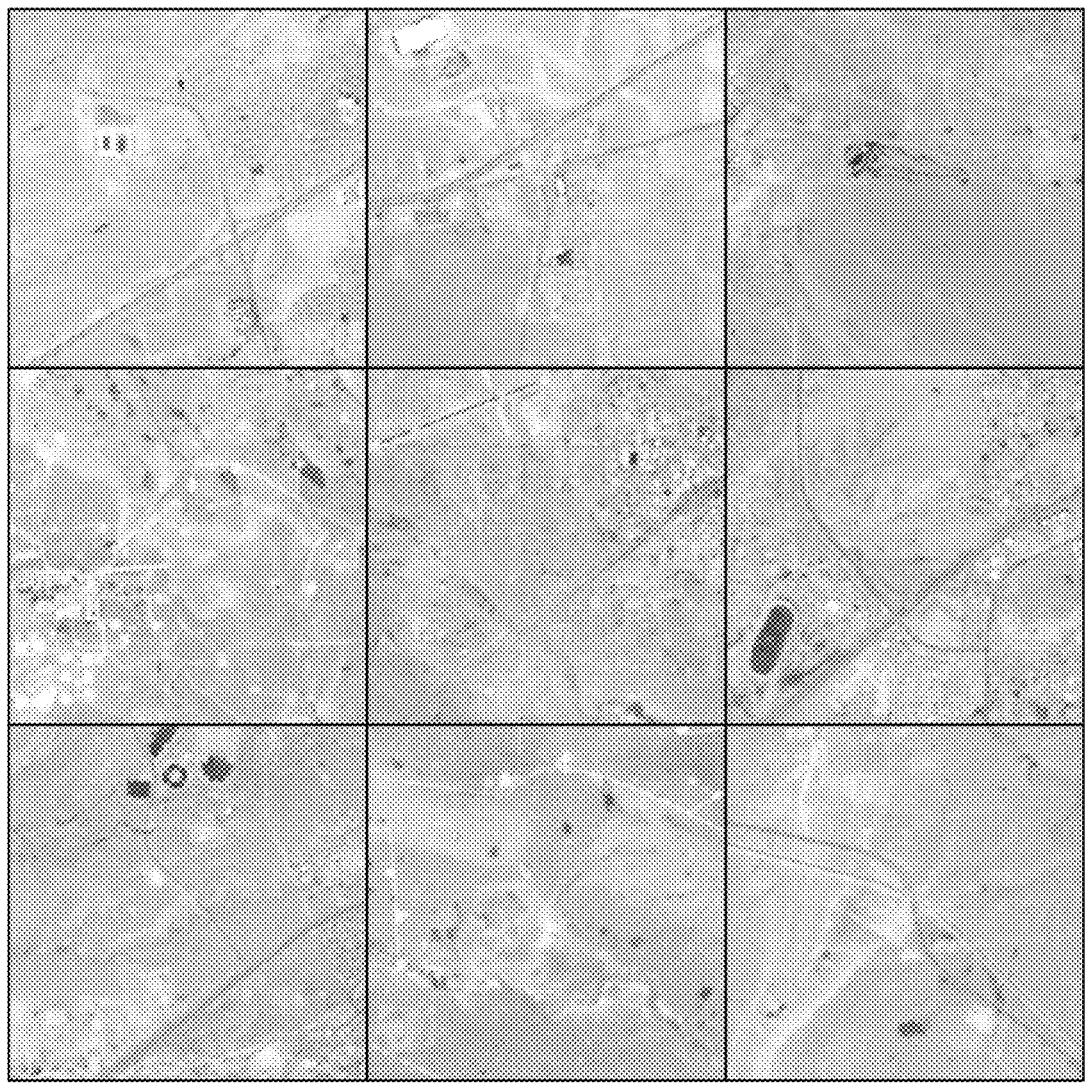
FIG. 10 illustrates an example embodiment of results associated with highway intersections.

FIG. 10 illustrates an example embodiment of results associated with highway intersections.

Figure 11:
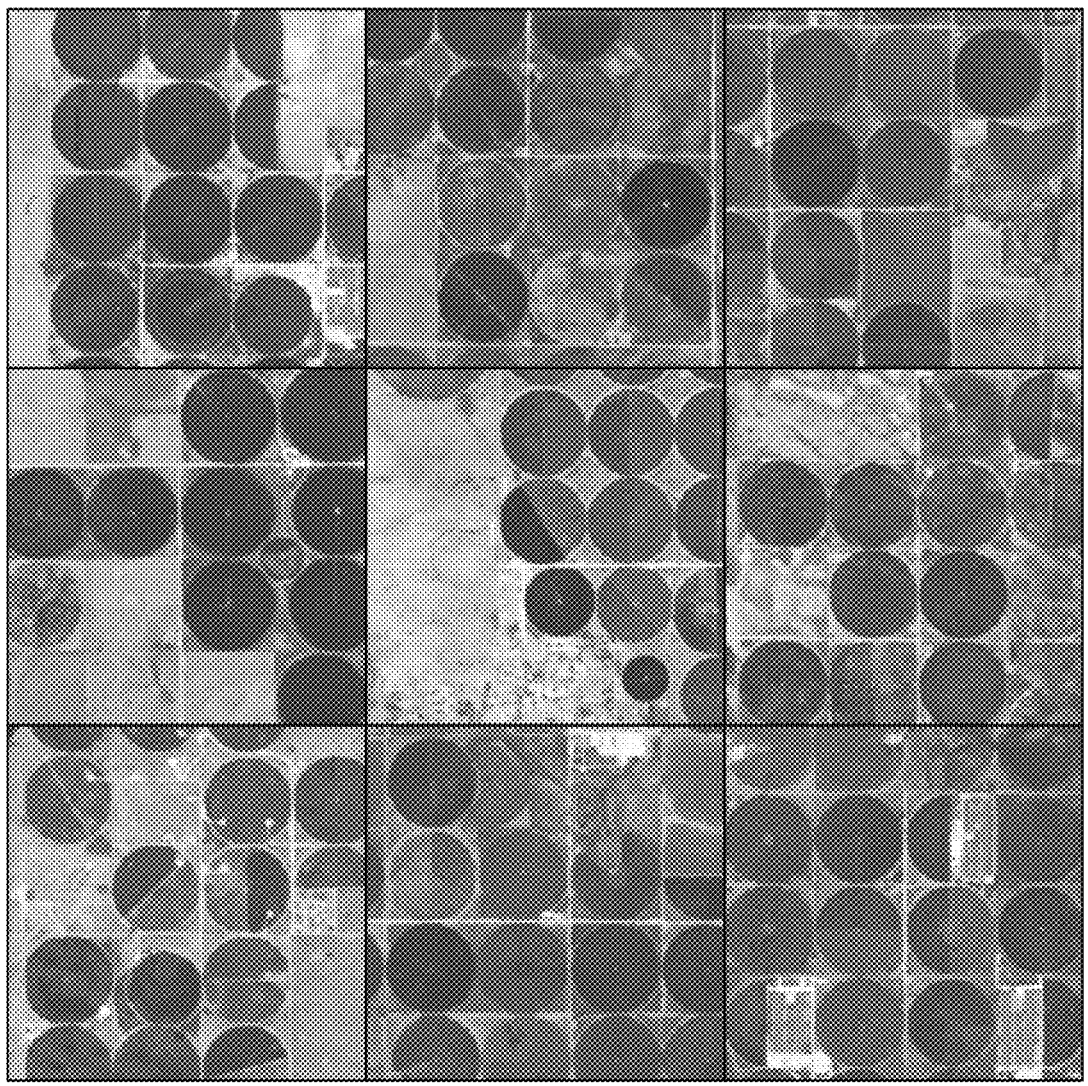
FIG. 11 illustrates an example embodiment of results associated with center-pivot ag.

FIG. 11 illustrates an example embodiment of results associated with center-pivot ag.

Figure 12:
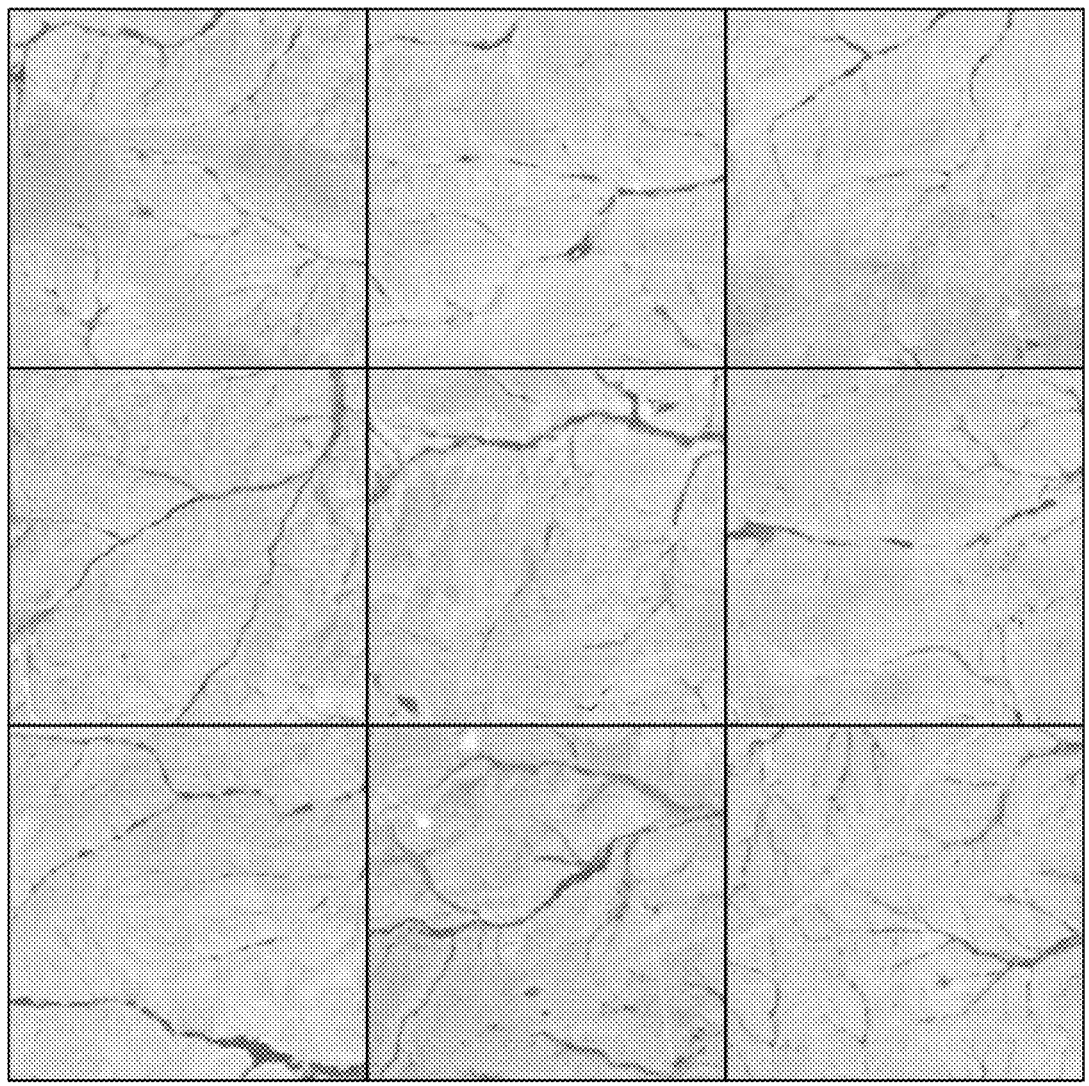
FIG. 12 illustrates an example embodiment of results associated with valleys with roads.

FIG. 12 illustrates an example embodiment of results associated with valleys with roads.

Figure 13:
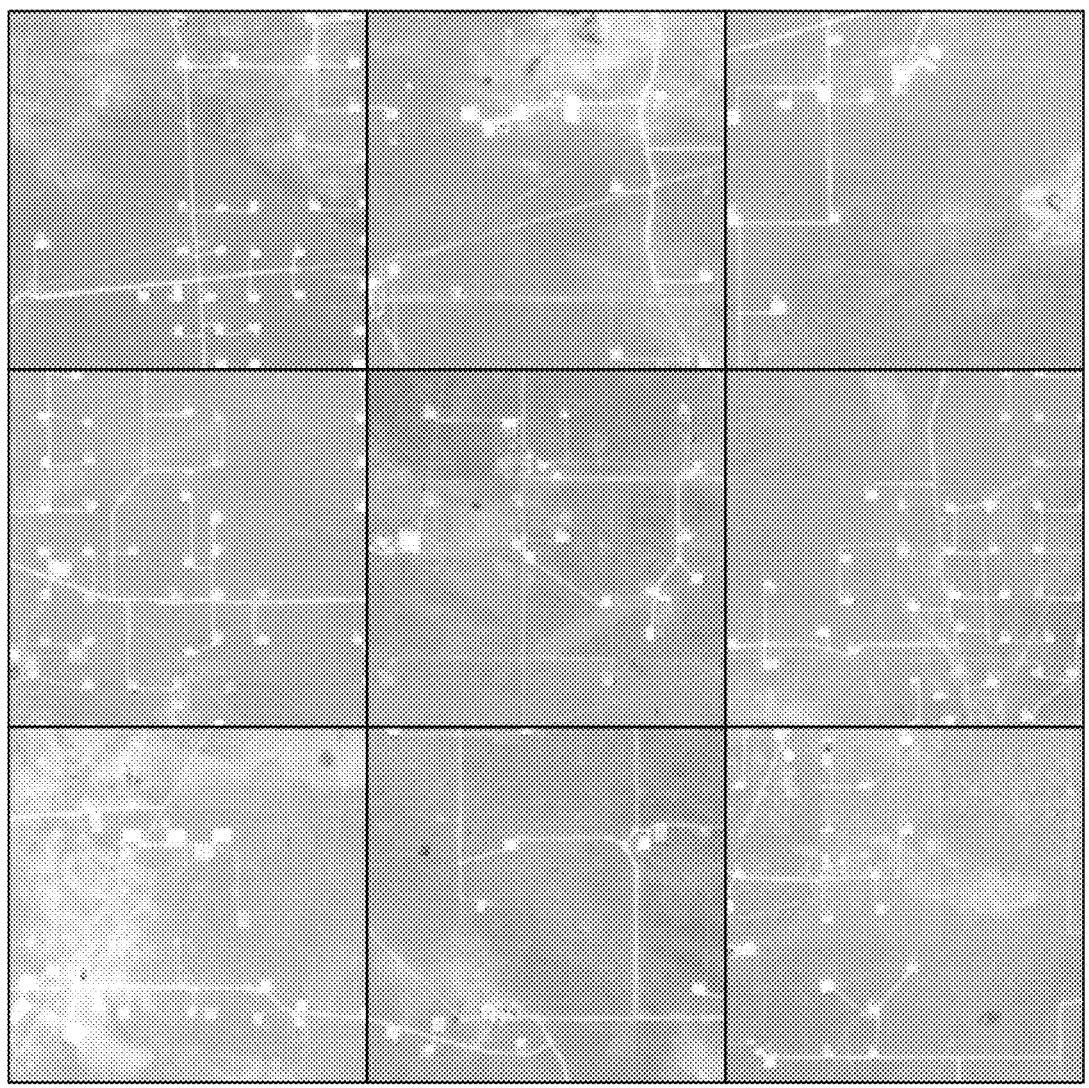
FIG. 13 illustrates an example embodiment of results associated with oil derricks.

FIG. 13 illustrates an example embodiment of results associated with oil derricks.

Figure 14:
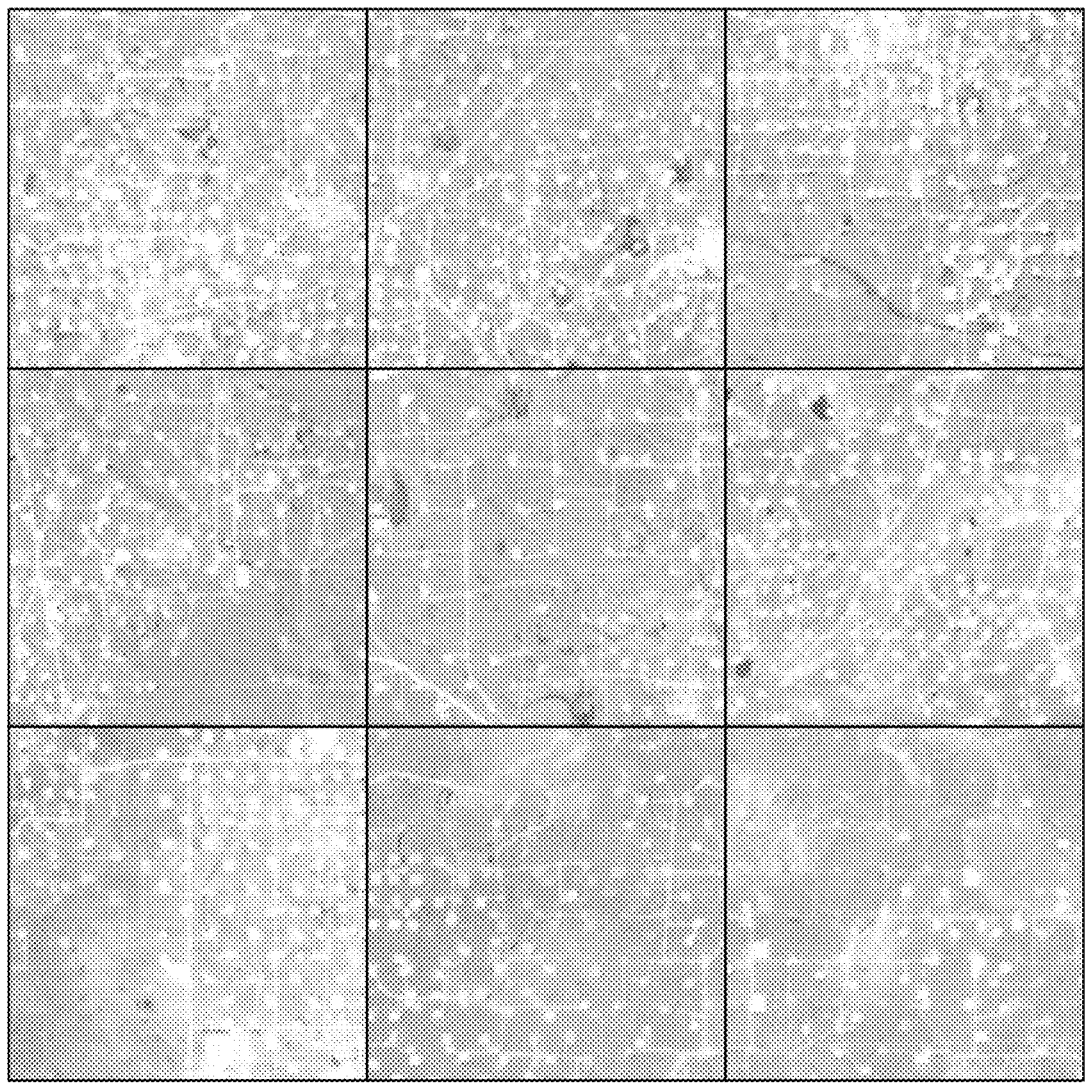
FIG. 14 illustrates an example embodiment of results associated with high-density oil derricks.

FIG. 14 illustrates an example embodiment of results associated with high-density oil derricks.

Figure 15:
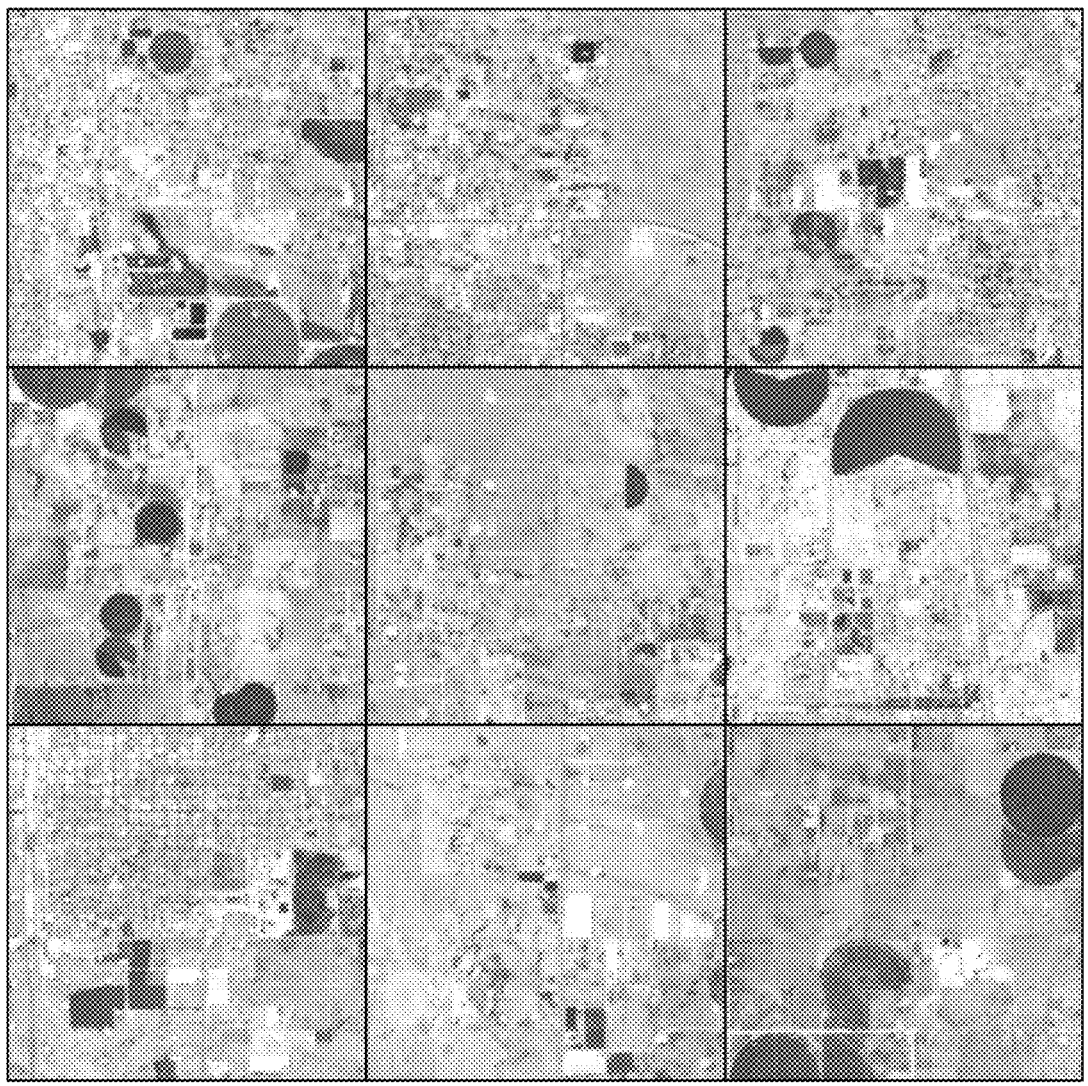
FIG. 15 illustrates an example embodiment of results associated with agriculture near cities.

FIG. 15 illustrates an example embodiment of results associated with agriculture near cities.

In some embodiments, the images shown in FIGS. 7-15 are generated using an out-of-the-box net that is trained on "normal" imagery, without fine-tuning.

Example Next Steps

In various embodiments, the above example baseline may be improved along various dimensions, examples of which are listed below:

100×-1000× more data (Global Landsat or CONUS NAIP)

better/improved, satellite imagery-specific features (e.g., unsupervised;

supervised on OSM)

faster search (binary codes)

search interface

Binary Codes

In some embodiments, the example images of FIG. 7-14 find visual similarity according to a measure such as the Euclidean distance in the 2048-dimensional feature space. In some embodiments, when scaling to a larger number of images (e.g., on the order of billions of images), compression may be performed to a (short) binary code (e.g., as described above), which may be easier to store and easier to search through.

As one example, 64-bit (and 256-bit) binary codes may be generated using, for example, the following two example techniques:

1. Autoencoder—In some embodiments, an autoencoder is trained in TensorFlow.

In some embodiments, the encoding layer has 64 nodes with rectified linear (relu) activation. In some embodiments, this layer is binarized based on zero/non-zero activation.

2. PCA (principal component analysis)—In some embodiments, the top 64 principal components are obtained, the 2048-dimensional feature vectors are projected onto them, and binarized, for example, on positive/negative coefficients.

In some embodiments, nearest neighbors are found using Hamming distance (e.g., the number of bits that differ) on the binary codes.

Example Results

In some embodiments, using the example techniques described above, retrieved neighbors using 64-bit codes may be comparable to using 256-bit codes, with retrieved neighbors using 256-bit codes comparable to using the original feature space.

Described below in conjunction with FIGS. 16A-16C and FIGS. 17A-17B are examples that used the autoencoder 64-bit codes. In some embodiments, the query image is in the top left, followed by the top 8 neighbors.

Good Examples

Figure 16A:
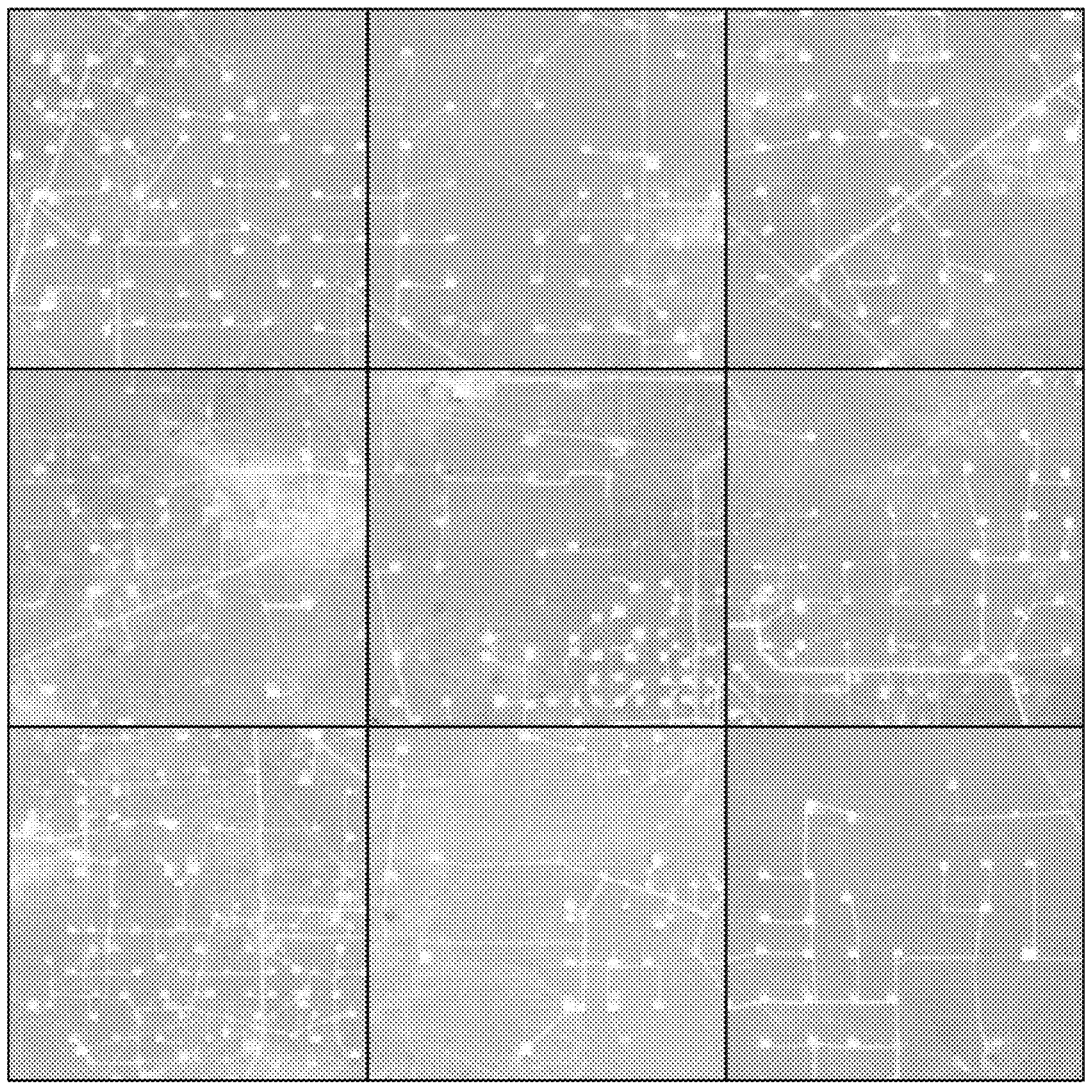
FIGS. 16A-16C illustrate example embodiments of results.
Figure 16B:
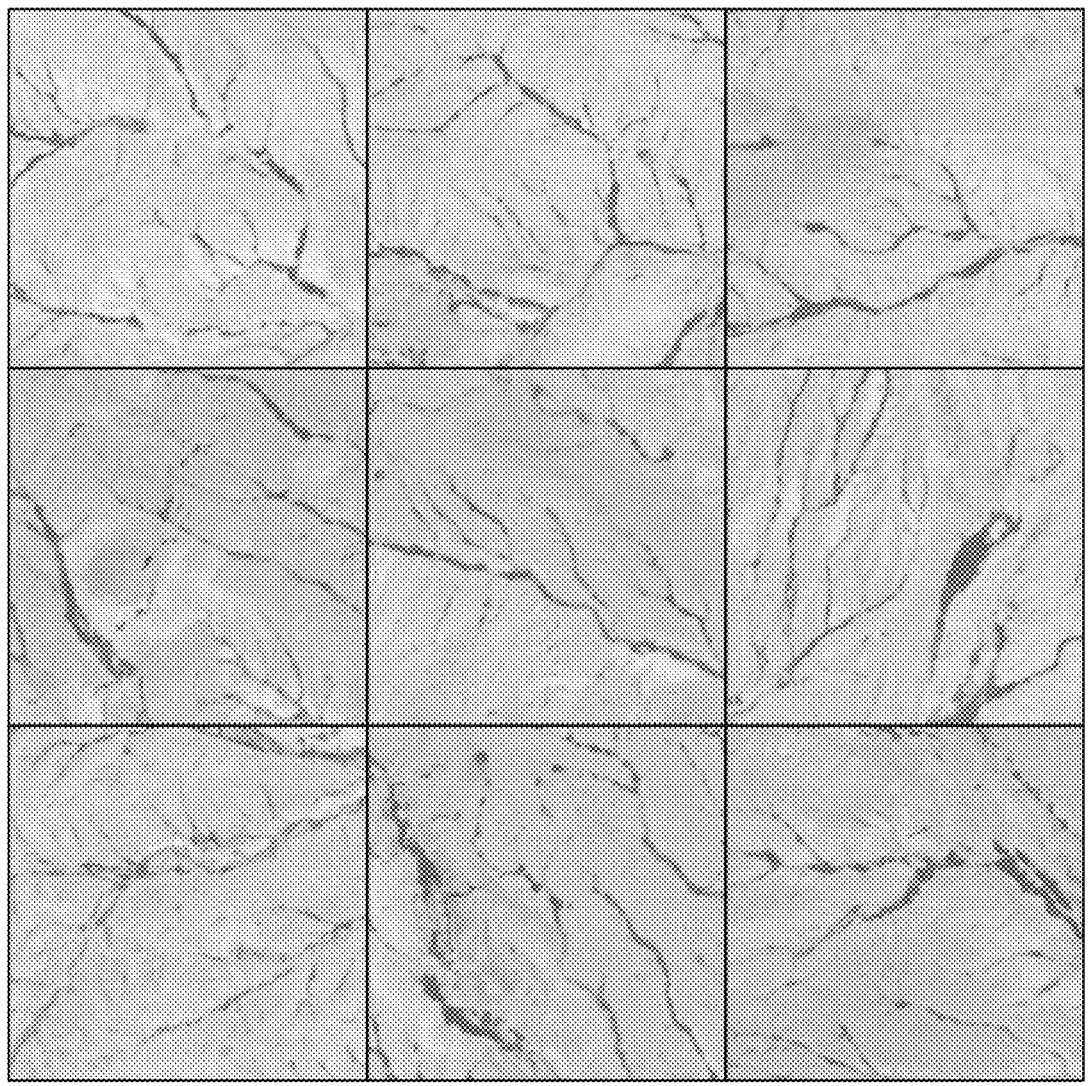
Figure 16C:
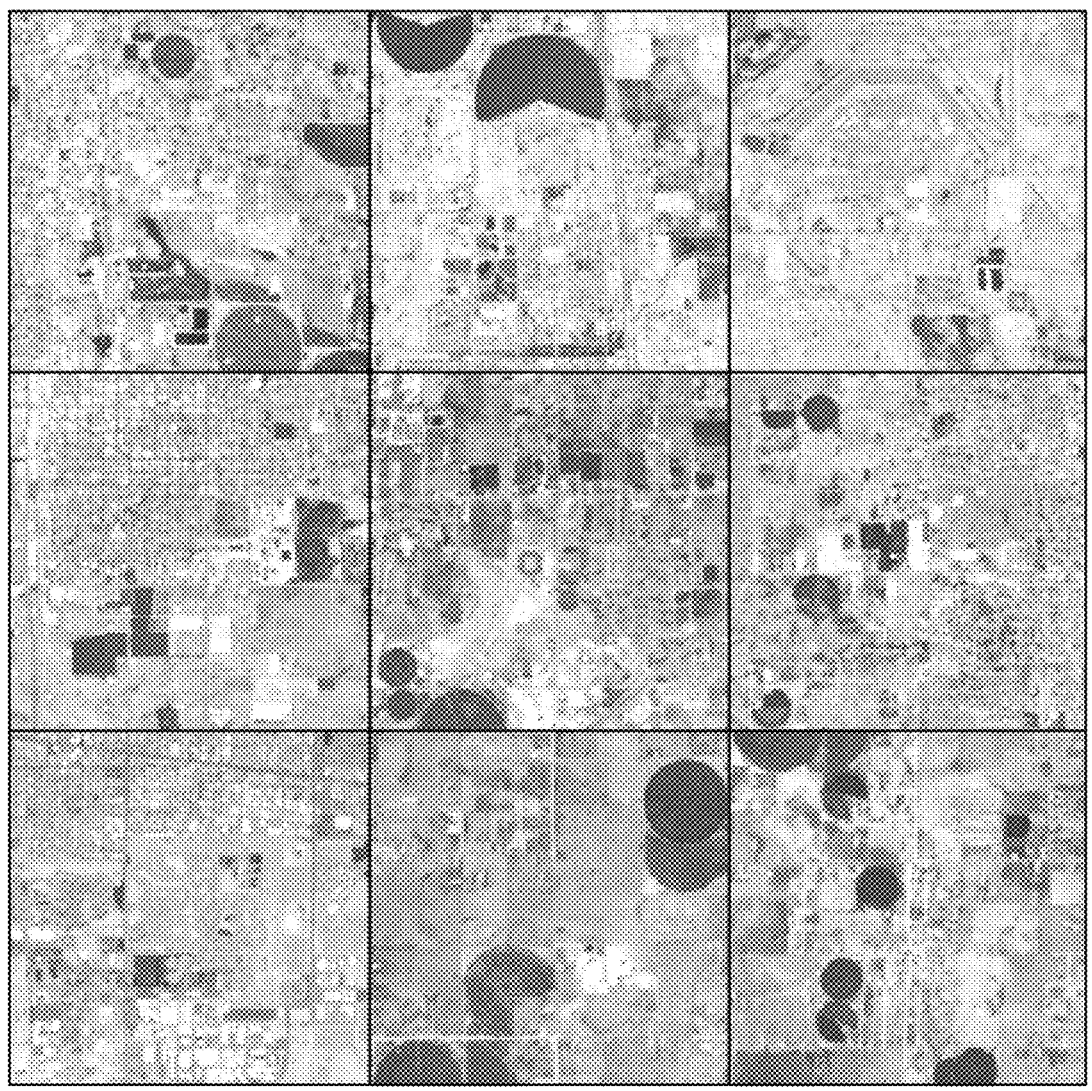

FIGS. 16A-16C illustrate example embodiments of "good" results (e.g., close visual neighbors).

Not-so-Good Examples

Figure 17A:
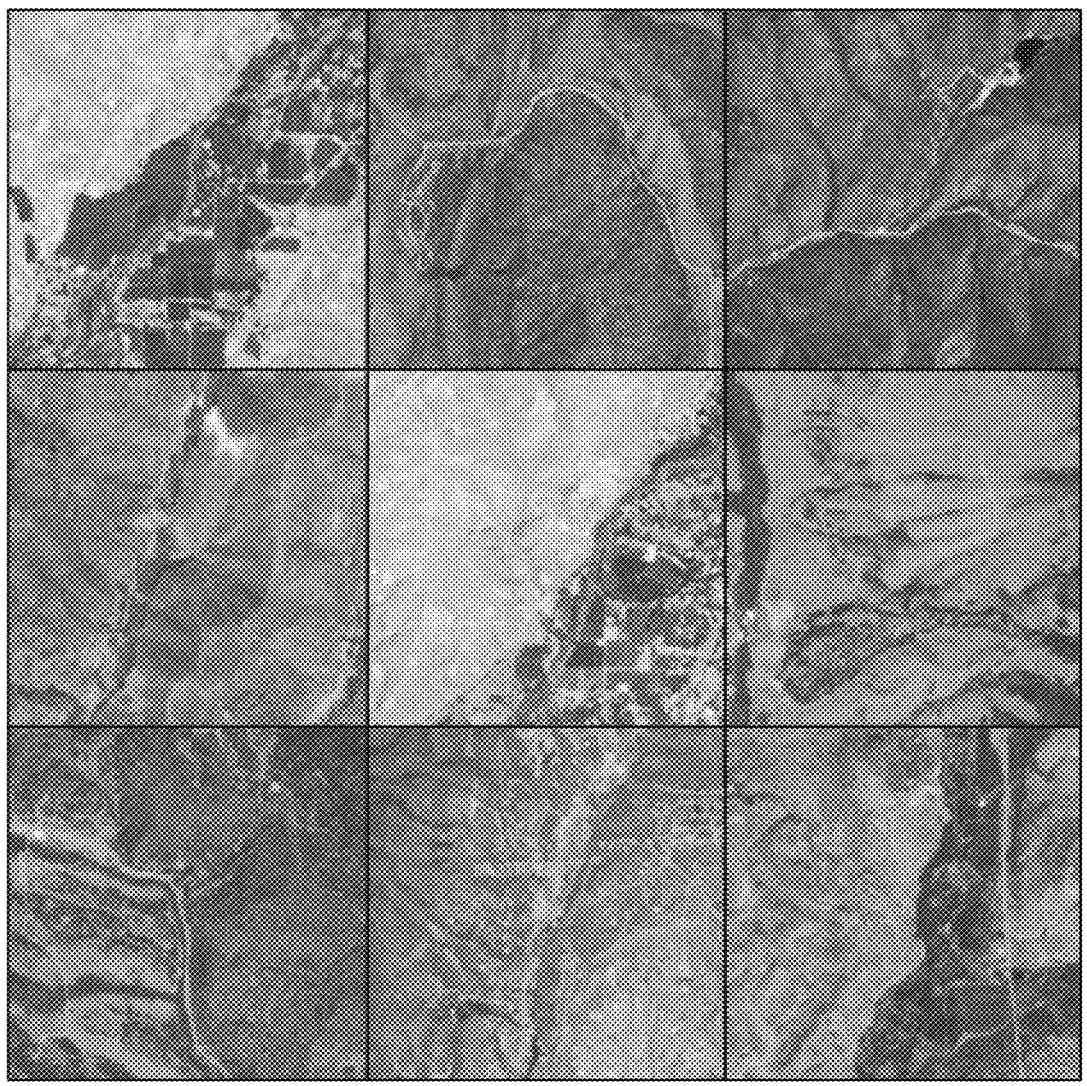
FIGS. 17A-17B illustrate example embodiments of results.
Figure 17B:
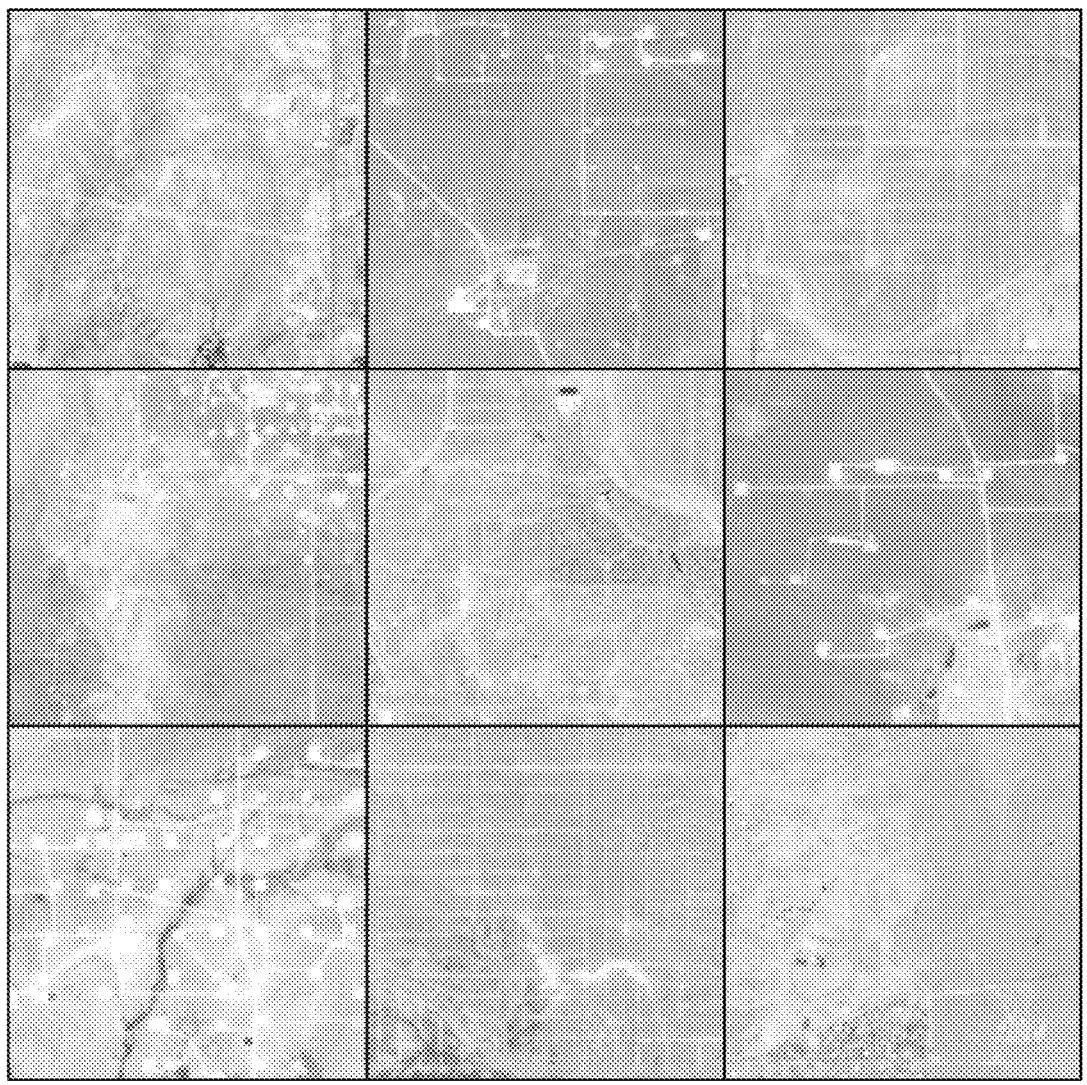

FIGS. 17A-17B illustrate example embodiments of "not-so-good" results (e.g., results that are not as visually close/similar).

Example of Defining the Encoding Function Ahead of Time

In some embodiments, the encoding process includes unsupervised learning on the set of feature vectors. In some embodiments, this may be challenging for "large" sets of images, and to address such challenges, in some embodiments, the encoding is performed in a two-stage process. In some embodiments, first, full feature vectors are created and saved on a small subset (e.g., 1% of all images). In some embodiments, these images are used to define the encoding function. In some embodiments, all images are then processed, saving only the binary codes.

Example Summary

In some embodiments, short binary codes (e.g., ~100 bits) may be capable of encoding a majority of the information present in the example 2048 feature vectors (e.g., 100,000 bits). In some embodiments, qualitatively, they may perform slightly worse than the original feature space. In some embodiments, the encoding function is created using a subset of the images of interest, where the full set is then processed.

Example Distributed Generation of Visual Features

Two Example Notes:

1. Fast then Slow—In some embodiments, fast visual neighbor search may be used to define a set of images on which more expensive computations, such as object detection, are performed. An example of TensorFlow object detection code may be found at https://github.com/Russel1191/TensorBox.

2. Rotated and Mirror Images—In some embodiments, features are generated by pushing an image through a convnet (convolutional net). In some embodiments, if objects of interest are mostly rotation-invariant and parity-invariant, pushing through all eight rotated-by-right-angle and/or mirror-image copies of the image may be performed. In some embodiments, this may lead to a richer and more robust feature vector. In some embodiments, the resulting features are concatenated, which may make storage and search 8× harder, or, in other embodiments, the resulting features are average, keeping storage and search 1×, but compute still 8× harder.

Feature Invariance

Example details regarding feature invariance to rotation and parity are described. In some embodiments, the features are pulled out at a particular level of a net (e.g., penultimate layer).

In one example embodiment, the net that is used may be trained on a dataset such as Imagenet. In some embodiments, in the limit that the dataset is rotation and parity invariant (and infinitely large), the features should be invariant. However, at least rotation symmetry may be broken, since most photographs have a preferred "up" direction. An example for quantifying how invariant the net is to rotations and flips is described below.

First, this space is characterized. For illustrative purposes, in this example, there are 512 dimensions and all distances are L2.

FIG. 18 illustrates an example embodiment of a histogram of feature distances (e.g., the feature distances between 100 images):

typical feature vector norm: ~11
typical distance between different images: ~8
typical nearest neighbor distance: ~6

In some embodiments, the below describes the distance between different (translated, rotated, or flipped) versions of the same images.

translate by 1 pixel in one direction (2×): 1.6
flip LR (2×): 4.2
flip UD (2×): 4.8
rotate (4×): 5.8
flip and rotate (8×): 6.0

In this example, the features are not invariant to rotating or flipping; they move away from the original feature vector by a distance (~5) that is comparable to the separation between distinct image vectors (~8). As shown in this example, the features move a relatively large amount (1.6) even after translating the image by only one pixel. This may be due to dimensionality, where the high-dimensional space is large.

In some embodiments translating/rotating/flipping the image does not completely eliminate the similarity with the original image; in some embodiments, the new image may, with a high likelihood, be the nearest neighbor to the original image since, as shown in the above examples, the typical nearest neighbor distance is ~6 and rotating/flipping moved the vector by <~6.

Further Details Regarding Invariance:

In some embodiments, the features that are extracted may not be invariant to rotations or flips; they may move by a distance comparable to the typical distance between distinct feature vectors.

In some embodiments, the features are "weakly invariant" to rotations and flips, where the resulting image may (with some likelihood) be closer to the original image than any of the other images.

In some embodiments, concatenated or averaged features from 8× rotated/flipped images may be used to produce a more robust feature vector.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
one or more processors configured to:
receive, via a user interface, a user selection of a location on a rendered map, the location corresponding to a latitude and a longitude;
obtain an identifier of a query tile corresponding to the location;
use the identifier to obtain a query feature vector associated with the query tile;
perform a lookup of a lookup table at least in part by using a key derived from the query feature vector;
based at least in part on the lookup of the lookup table using the key derived from the query feature vector, obtain a list comprising a plurality of identifiers corresponding to the key, wherein identifiers included in the list comprise identifiers of images tiles that have feature vectors that, when processed using a function, result in derivation of the same key;
use the list of identifiers obtained based at least in part on the lookup of the lookup table to obtain a set of corresponding candidate feature vectors;
based at least in part on a determination of distances between the query feature vector and at least some of the candidate feature vectors, select a tile corresponding to a candidate feature vector in the set of candidate feature vectors; and
provide the selected tile as output; and
a memory coupled to the one or more processors and configured to provide the one or more processors with instructions.

2. The system of claim 1, wherein the query feature vector comprises a representation of visual information associated with the query tile.

3. The system of claim 1, wherein the query feature vector comprises a binary code, and wherein determining a distance between the query feature vector and a given candidate feature vector comprises determining a hamming distance.

4. The system of claim 1, wherein the query feature vector is generated at least in part by performing feature extraction on the query tile.

5. The system of claim 4, wherein the feature extraction is performed at least in part by using a neural network.

6. A system, comprising:
a processor configured to:
receive a set of raw aerial imagery;
determine, from the set of raw aerial imagery, a set of image tiles, wherein each image tile is associated with a corresponding set of raw spectral data;
determine, for the set of image tiles, a corresponding set of feature vectors, wherein determining a feature vector for a given image tile comprises determining, for the given image tile, a code string based at least in part on raw spectral data corresponding to the given image tile;
for each feature vector in the set of feature vectors, derive a key corresponding to a given feature vector;
access a lookup table using the derived key corresponding to the given feature vector; and
associate, with the derived key, an identifier of an image tile corresponding to the given feature vector at least in part by including the identifier of the image tile in a list of identifiers corresponding to the derived key, wherein identifiers included in the list comprise identifiers of images tiles that have feature vectors that, when processed using a function, result in derivation of the same key; and
a memory coupled to the processor and configured to provide the processor with instructions.

7. A method, comprising:
receiving, via a user interface, a user selection of a location on a rendered map, the location corresponding to a latitude and a longitude;
obtaining an identifier of a query tile corresponding to the location;
using the identifier to obtain a query feature vector associated with the query tile;
performing a lookup of a lookup table at least in part by using a key derived from the query feature vector;
based at least in part on the lookup of the lookup table using the key derived from the query feature vector, obtaining a list comprising a plurality of identifiers corresponding to the key, wherein identifiers included in the list comprise identifiers of images tiles that have feature vectors that, when processed using a function, result in derivation of the same key;
using the list of identifiers obtained based at least in part on the lookup of the lookup table to obtain a set of corresponding candidate feature vectors;
based at least in part on a determination of distances between the query feature vector and at least some of the candidate feature vectors, selecting a tile corresponding to a candidate feature vector in the set of candidate feature vectors; and
providing the selected tile as output.

8. The method of claim 7, wherein the query feature vector comprises a representation of visual information associated with the query tile.

9. The method of claim 7, wherein the query feature vector comprises a binary code, and wherein determining a distance between the query feature vector and a given candidate feature vector comprises determining a hamming distance.

10. The method of claim 7, wherein the query feature vector is generated at least in part by performing feature extraction on the query tile.

11. The method of claim 10, wherein the feature extraction is performed at least in part by using a neural network.

12. A method, comprising:
receiving a set of raw aerial imagery;
determining, from the set of raw aerial imagery, a set of image tiles, wherein each image tile is associated with a corresponding set of raw spectral data;
determining, for the set of image tiles, a corresponding set of feature vectors, wherein determining a feature vector for a given image tile comprises determining, for the given image tile, a code string based at least in part on raw spectral data corresponding to the given image tile;
for each feature vector in the set of feature vectors, deriving a key corresponding to a given feature vector;
accessing a lookup table using the derived key corresponding to the given feature vector; and
associating, with the derived key, an identifier of an image tile corresponding to the given feature vector at least in part by including the identifier of the image tile in a list of identifiers corresponding to the derived key, wherein identifiers included in the list comprise identifiers of images tiles that have feature vectors that, when processed using a function, result in derivation of the same key.

\* \* \* \* \*

UNITED STATES PATENT AND TRADEMARK OFFICE
CERTIFICATE OF CORRECTION

| | |
|---|---|
| PATENT NO. | : 11,354,352 B1 |
| APPLICATION NO. | : 16/285077 |
| DATED | : June 7, 2022 |
| INVENTOR(S) | : Ryan S. Keisler, Samuel W. Skillman and Michael S. Warren |

It is certified that error appears in the above-identified patent and that said Letters Patent is hereby corrected as shown below:

On the Title Page

In page 2, Column 2, item (56), other publications, cite no. 5, delete "http://www.terrapatem.com" and insert --http://www.terrapattern.com--, therefor.

Signed and Sealed this
Twenty-ninth Day of November, 2022

Katherine Kelly Vidal
*Director of the United States Patent and Trademark Office*